(12) United States Patent
Takayama et al.

(10) Patent No.: US 7,709,146 B2
(45) Date of Patent: May 4, 2010

(54) BIPOLAR BATTERY AND METHOD OF MANUFACTURING THE SAME

(75) Inventors: Gen Takayama, Yokohama (JP); Hajime Sato, Yokohama (JP); Kenji Hosaka, Yokosuka (JP); Kenji Hamada, Yokohama (JP); Teruo Segawa, Ayase (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 15 days.

(21) Appl. No.: 11/950,434

(22) Filed: Dec. 5, 2007

(65) Prior Publication Data

US 2008/0138706 A1 Jun. 12, 2008

(30) Foreign Application Priority Data

Dec. 8, 2006 (JP) ............................. 2006-332607
Sep. 19, 2007 (JP) ............................. 2007-242692

(51) Int. Cl.
*H01M 6/48* (2006.01)
*H01M 10/18* (2006.01)

(52) U.S. Cl. ..................................... 429/210

(58) Field of Classification Search .................. 429/52, 429/53, 54, 55, 210
See application file for complete search history.

(56) References Cited

U.S. PATENT DOCUMENTS 3,728,158 A 4/1973 Poe et al.
4,125,685 A 11/1978 Bloom et al.
5,004,655 A 4/1991 Symanski
5,916,515 A * 6/1999 Bryan et al. ............... 29/623.3
7,279,248 B2 * 10/2007 Fukuzawa et al. ........... 429/210
2004/0161667 A1 * 8/2004 Fukuzawa et al. ........... 429/210
2005/0136321 A1 * 6/2005 Bailey ......................... 429/72
2005/0260493 A1 11/2005 Frederiksson et al.

FOREIGN PATENT DOCUMENTS

| JP | HEI 11-204136 | | 7/1999 |
| JP | 2006 139994 | * | 1/2006 |
| JP | 2006 252882 | * | 9/2006 |
| JP | 2007-026730 A | | 2/2007 |
| WO | 03 085751 A2 | | 10/2003 |

* cited by examiner

*Primary Examiner*—Melvin C Mayes
*Assistant Examiner*—Bijay S Saha
(74) *Attorney, Agent, or Firm*—Young Basile

(57) ABSTRACT

Disclosed are a bipolar battery, a bipolar battery component and a method of manufacturing the same. The bipolar battery minimizes the occurrence of gas bubbles to provide superior battery performance. A battery element has a plurality of bipolar electrodes stacked upon one another while interposing separators therebetween. The bipolar electrode includes a collector formed with a cathode on one surface and an anode on the other surface. The component is a charging part with charging material disposed between collectors and separators to surround at least a periphery of the cathode and a periphery of the anode. An exhaust part is mounted to the charging part to exhaust a residual gas bubble from an inner space to outside of the inner space when stacking the bipolar electrodes.

17 Claims, 46 Drawing Sheets

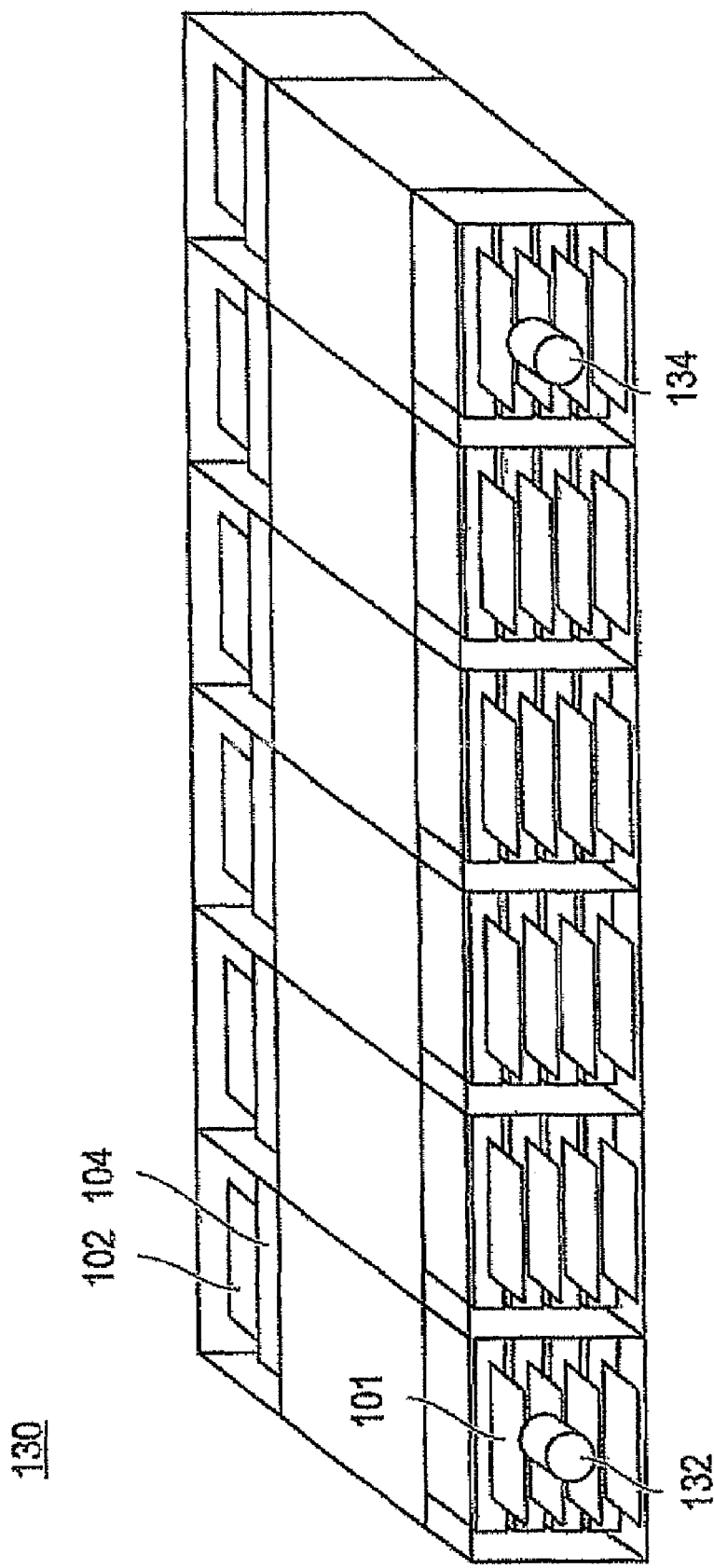

Forming an assembly
↓
Forming a bonded body
↓
Casing

FIG. 19
Setting an assembly
Stacking
Pressing
Forming a sealing layer
Forming an interface
Initial charging
Exhausting a bubble
Integrated stack 181 185 187 183 188
180

FIG. 27

Forming an electrode

↓

Arranging an electrolyte

↓

Arranging a sealing material

↓

Arranging a separator

↓

Assembly

FIG. 32

Setting an assembly
↓
Stacking
↓
Pressing
↓
Partial softening a sealing material
(forming an exhaust part)
↓
Forming an interface
↓
Initial charging
↓
Forming a sealing layer
↓
Integrated stack FIG. 36
Forming an electrode
Arranging an electrolyte
Arranging a first sealing material
(forming an exhaust part)
Arranging a separator
Arranging a second sealing material
(forming an exhaust part)
Assembly
FIG. 37
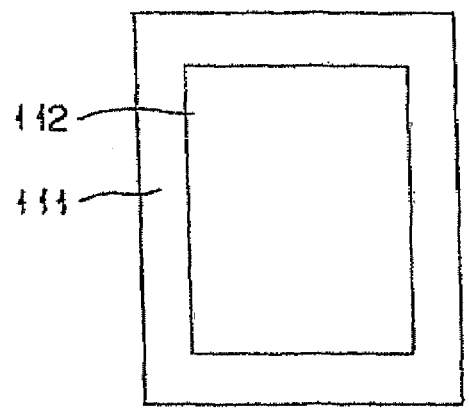

208

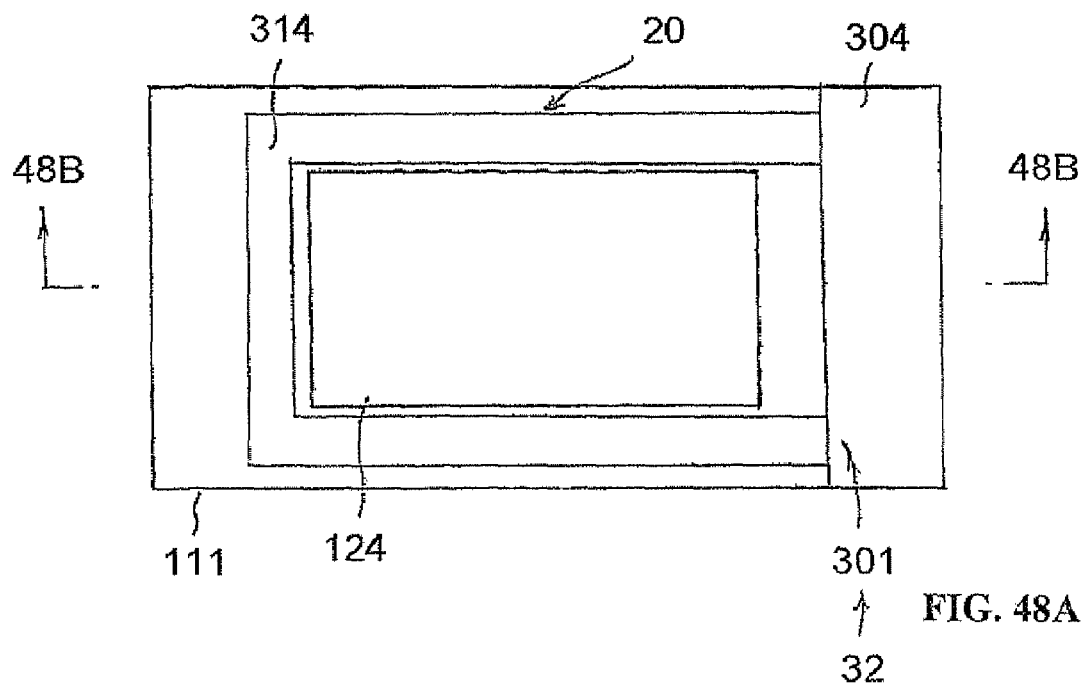
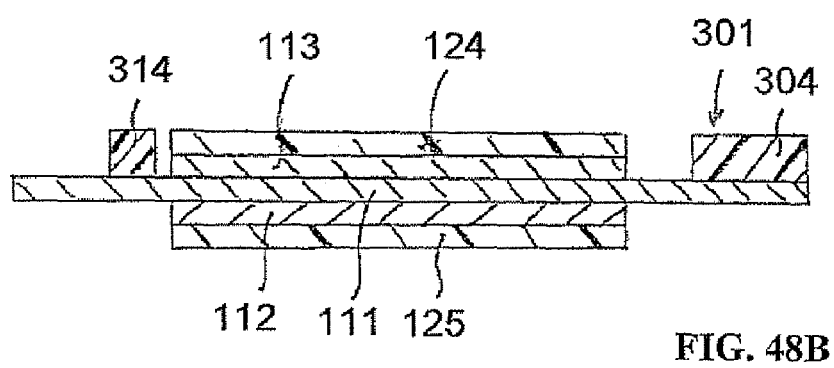
FIG. 48A
FIG. 48B

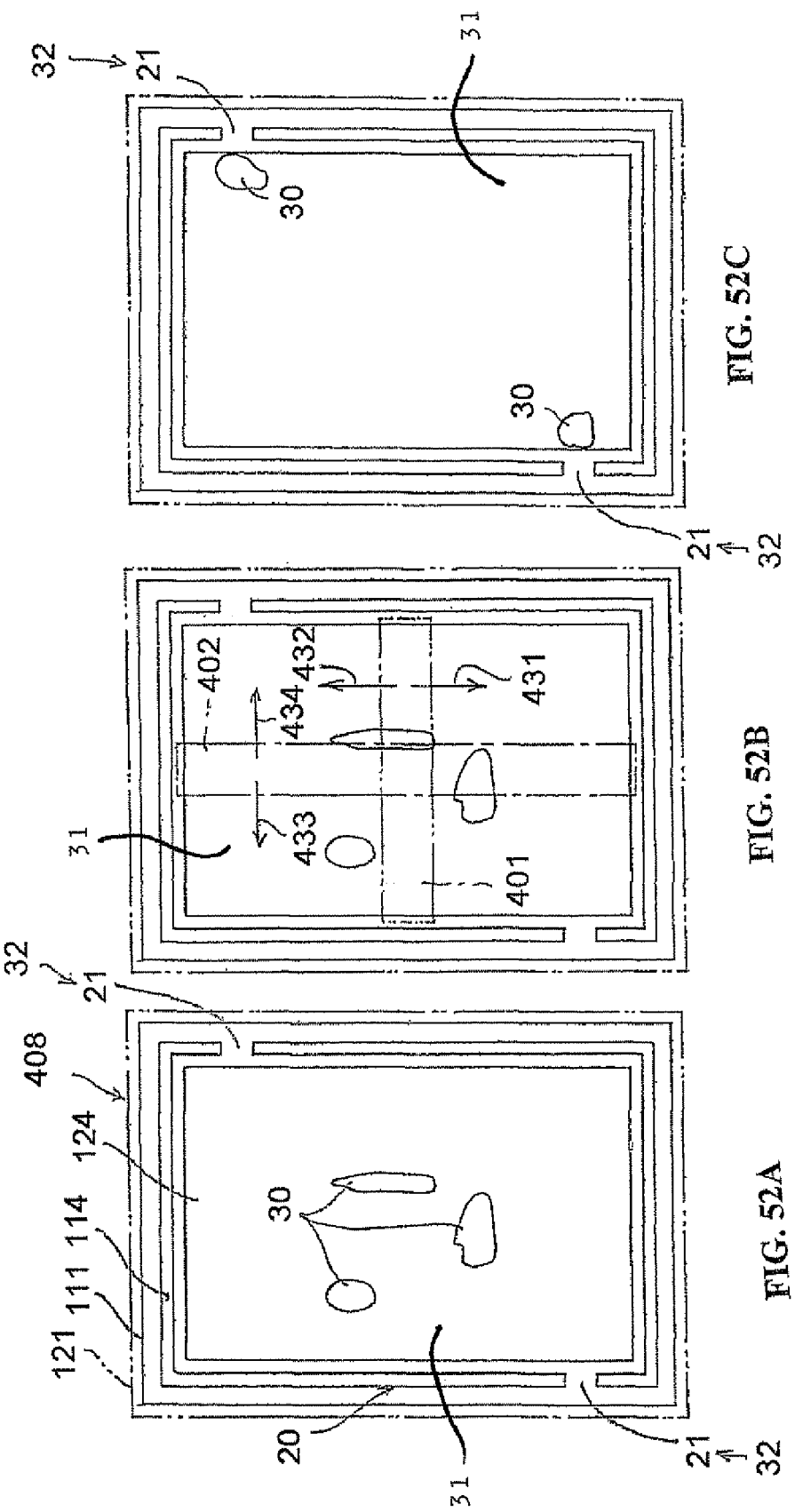

FIG. 56
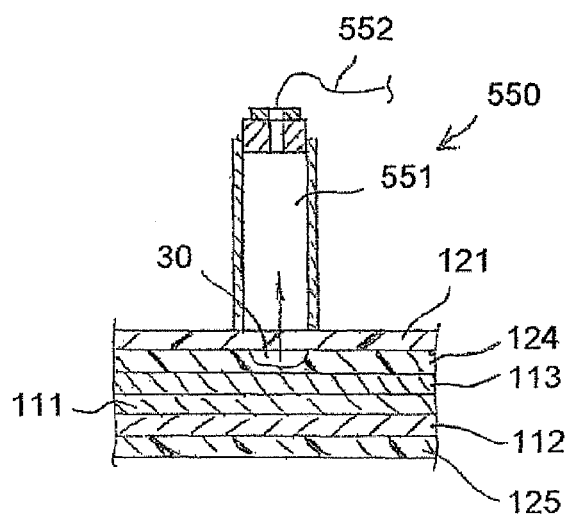
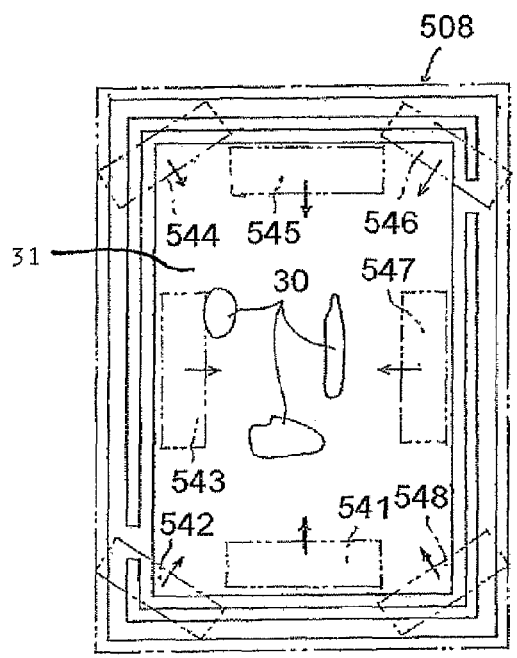
FIG. 57A
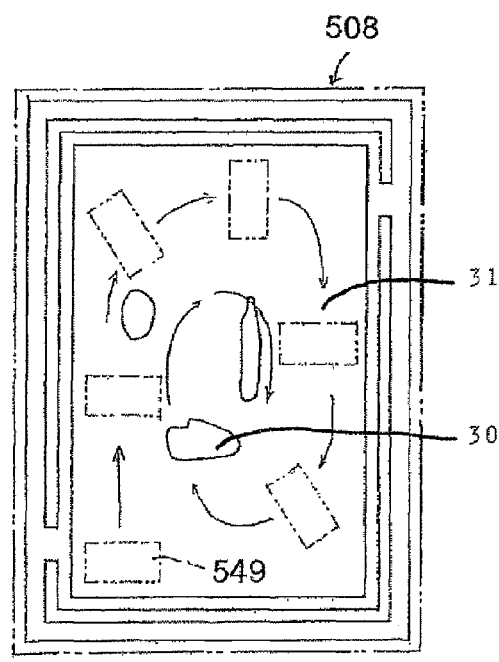
FIG. 57B

BIPOLAR BATTERY AND METHOD OF MANUFACTURING THE SAME

CROSS-REFERENCE TO RELATED APPLICATIONS

This application claims priority from Japanese Patent Application Serial Nos. JP2006-332607, filed Dec. 8, 2006, and JP2007-242692, filed Sep. 19, 2007, each of which is incorporated herein in its entirety by reference.

TECHNICAL FIELD

The present invention relates to a bipolar battery and a method of manufacturing the same.

BACKGROUND

Bipolar batteries are structured such that plural bipolar electrodes are stacked alternatively with electrolyte layers. Each bipolar electrode is configured such that a cathode is formed on one surface of a collector and an anode is formed on the opposite surface of the collector. For example, Japanese Laid-Open Patent Publication No. (Hei.) 11-204136 discloses a structure in which the plural bipolar electrodes as described above are stacked upon one another through separators penetrated by electrolyte. When stacking the bipolar electrode, however, a gas bubble may get trapped in a micro gap between the stacked portions. If the gas remains between the stacked portions, a dead space is generated through which an ion cannot permeate and an electron cannot move. Such a dead space is a factor for the deterioration of power.

BRIEF SUMMARY

Disclosed is a bipolar battery having superior battery performance by removing an introduced gas bubble, as well as a method of manufacturing the bipolar battery.

An embodiment of the bipolar battery of the invention comprises at least one battery element. The battery element comprises a plurality of bipolar electrodes and a plurality of separators alternately stacked upon one another. Each bipolar electrode comprises a collector with a cathode on one surface and an anode on an opposite surface and a charging part comprising a charging material disposed between the collector and the separator and configured to surround at least a periphery of the cathode and a periphery of the anode. An exhaust part is integral with the charging part and is configured to exhaust a gas bubble from an inner space surrounded by the collector, the separator and the charging part during stacking of the bipolar electrodes and the separators.

An embodiment of a method for manufacturing the bipolar battery comprises preparing a bipolar electrode by forming a cathode on one surface of a collector and forming an anode on a opposite surface of the collector. Next, a charging part is formed on the bipolar electrode by disposing a charging material between the collector and a separator to surround at least a periphery of the cathode and a periphery of the anode. An exhaust part is formed integral with the charging part and operable to exhaust a gas from an inner space surrounded by the collector, the separator and the charging part through the exhaust part during stacking. The bipolar electrodes are alternately stacked with the electrolyte layers while the gas is exhausted with the exhaust part during such stacking.

An embodiment of a component of a bipolar battery is disclosed, with the bipolar battery comprising at least one battery element with the component. Each battery element includes a plurality of bipolar electrodes and a plurality of separators alternately stacked upon one another. Each bipolar electrode includes a collector with a cathode on one surface and an anode on an opposite surface. The component comprises a charging material configured for disposal between the collector and the separator and configured to surround a periphery of the cathode and a periphery of the anode. An exhaust part is configured to exhaust a gas bubble from an inner space surrounded by the collector, the separator and the charging part during stacking of the bipolar electrodes and the separators.

BRIEF DESCRIPTION OF THE DRAWINGS

The description herein makes reference to the accompanying drawings wherein like reference numerals refer to like parts throughout the several views, and wherein:

FIG. 8 is a perspective view of a battery pack using the bipolar battery shown in FIG. 1;

FIG. 19 is a flow diagram of a process of forming a bonded body shown in FIG. 10;

FIG. 27 is a flow diagram of an assembly forming process in accordance with the third embodiment;

FIG. 32 is a flow diagram of a bonded body forming process in accordance with the fourth embodiment;

FIG. 36 is a flow diagram of an assembly forming process in accordance with the fifth embodiment;

FIG. 37 is a plan view explaining an electrode forming process shown in FIG. 36;

FIG. 48A is a plan view explaining a first sealing material arranging process shown in FIG. 44;

FIG. 48B is a sectional view taken along line 48B-48B in FIG. 48A;

FIGS. 52A to 52C are views illustrating a state in which a residual gas in an inner space moves toward an exhaust part in accordance with a seventh embodiment;

FIG. 56 is a sectional view illustrating a state in which the residual gas in the inner space is sucked by a suction member through a separator;

FIGS. 57A and 57B are views illustrating modified examples of moving the residual gas in the inner space toward the center portion and gathering the gas;

DETAILED DESCRIPTION OF EMBODIMENTS OF THE INVENTION

Embodiments of the invention disclosed herein are described with reference to the attached drawings.

Figure 3A:
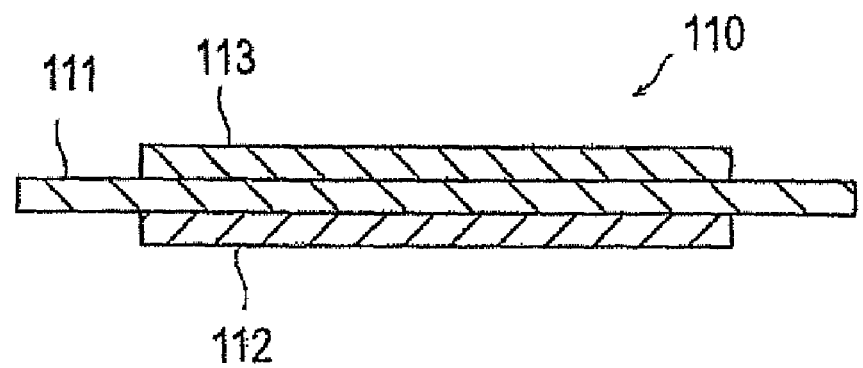
FIG. 3A is a sectional view illustrating a bipolar electrode.
Figure 3B:
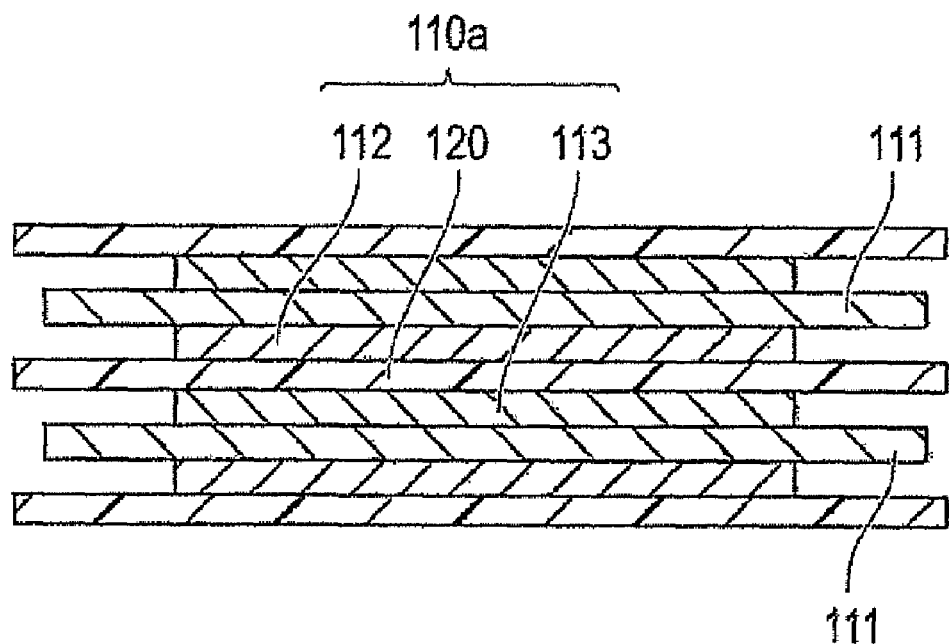
FIG. 3B is a sectional view illustrating a unit battery layer.
Figure 4A:
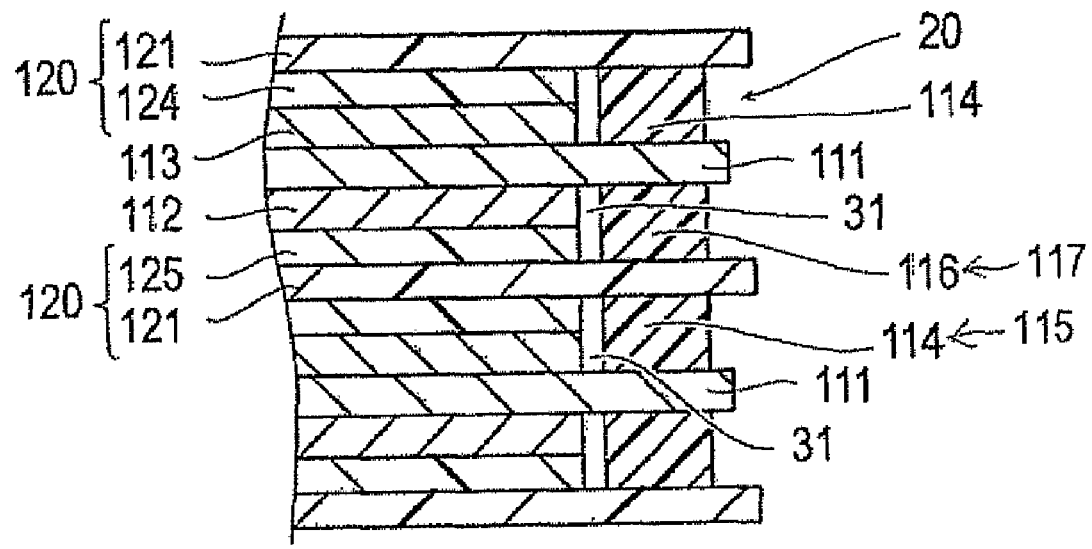
FIGS. 4A and 4B are sectional views illustrating an arrangement of charging materials of a charging part.
Figure 4B:
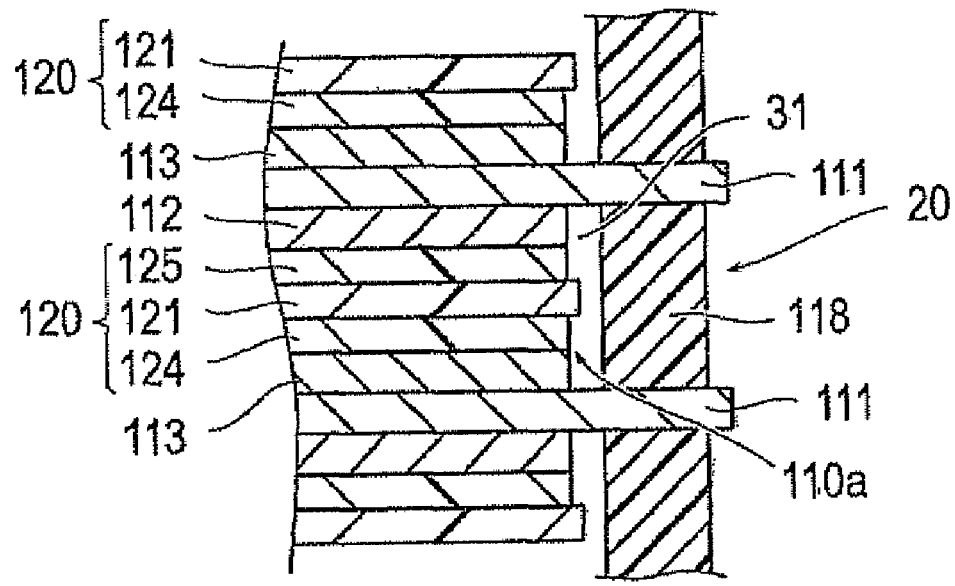
Figure 5:
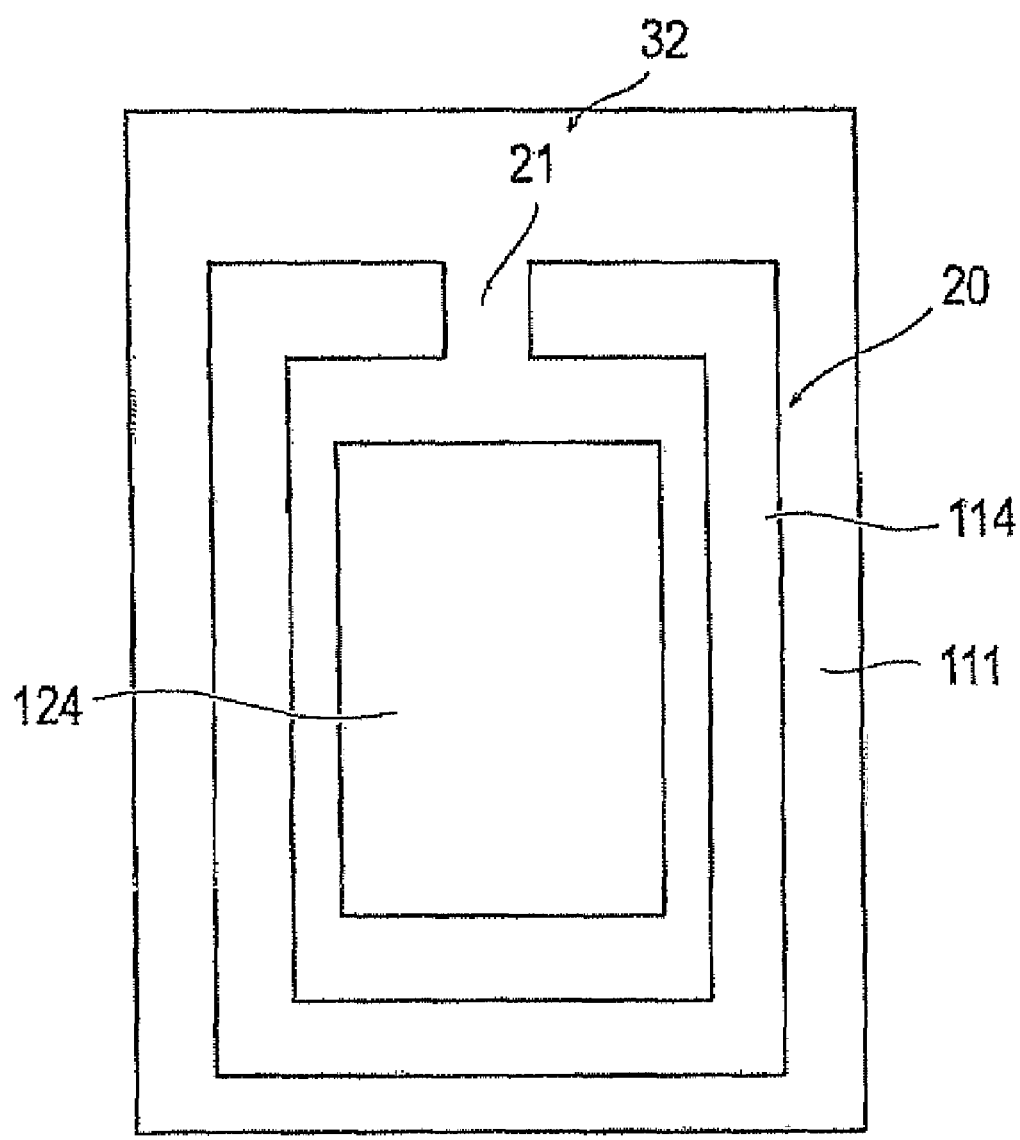
FIG. 5 is a plan view illustrating essential components of the bipolar battery in accordance with the first embodiment, wherein the charging part includes a gap portion.

A first embodiment is described initially with reference to FIGS. 1 to 9. A bipolar battery 10 according to the first embodiment includes a battery element 100 structured such that a plurality of bipolar electrodes 110 are stacked upon one another while interposing electrolyte layers 120 between the adjacent bipolar electrodes 110. Each bipolar electrode 110 is configured such that a cathode 113 is formed on one surface of a collector 111 and an anode 112 is formed on the opposite surface of the collector 111. A charging part 20 (shown in FIGS. 4A and 4B) includes charging materials 114 and 116 disposed in a space between the adjacent collectors 111 and surrounding at least a periphery of the cathode 113 and a periphery of the anode 112. Referring also to FIG. 5, an exhaust part 32 is mounted to a portion of the charging part 20 to exhaust a gas that remains in an inner space 31 surrounded by the charging materials 114 and 116 to the outside of the inner space 31 when stacking the bipolar electrodes 110. The charging materials 114 and 116 are configured to be a first sealing layer 115 and a second sealing layer 117 of the bipolar battery 10 shown in FIG. 2.

During manufacturing of the bipolar battery 10, the bipolar electrodes 110, the electrolyte layers 120 and the charging materials 114 and 116 are prepared. When stacking the bipolar electrodes 110 on the charging materials 114 and 116, the exhaust part 32 is formed to exhaust the residual gas from the inner space 31 formed when stacking to the outside of the inner space 31. This process completes the exhausting operation.

Figure 1:
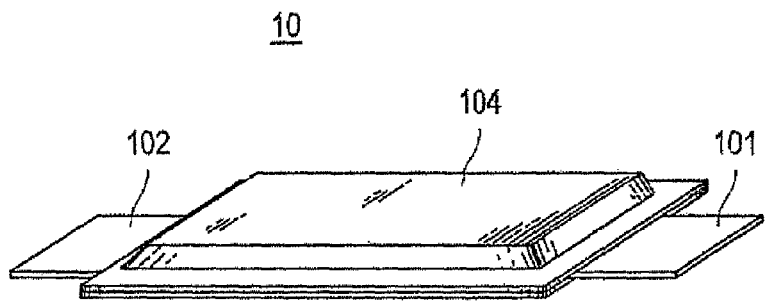
FIG. 1 is a perspective view illustrating a bipolar battery in accordance with a first embodiment of the invention.

The first embodiment is next described in detail. As shown in FIG. 1, the bipolar battery 10 is constructed such that the battery element 100 is housed in an exterior case 104 to protect the battery element from external shock or environmental deterioration.

Figure 2:
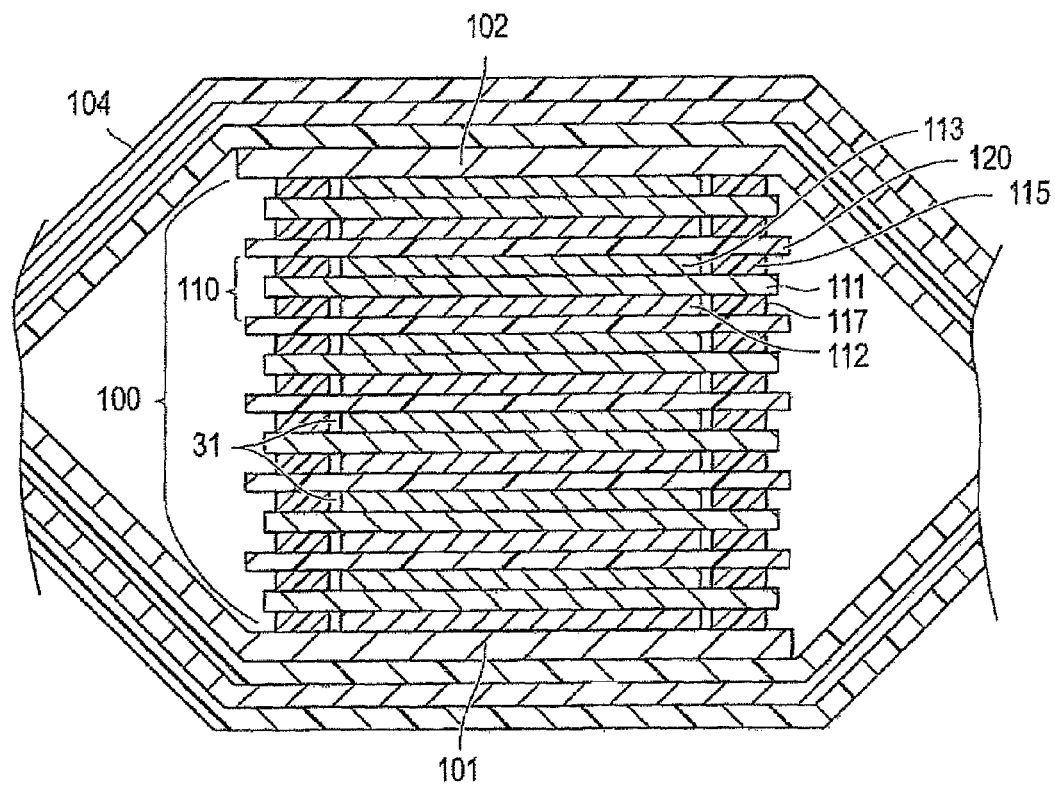
FIG. 2 is a sectional view illustrating components of the bipolar battery.

Referring to FIGS. 2 and 3A, each of the bipolar electrodes 110 is configured such that the cathode 113 is formed by attaching a cathode active material layer onto one surface of the collector 111. The anode 112 is formed by attaching an anode active material layer onto the opposite surface of the collector 111. Referring to FIG. 3B, a unit battery layer 110a is formed by the cathode 113, the electrolyte layer 120 and the anode 112. The unit battery layer 110a is fitted between two adjacent collectors 111. The number of unit battery layers 111a in a stack is determined by a required voltage.

Because the collector 111 passes an electron but blocks an ion, the collector 111 is also referred to as an ion barrier. The electrolyte layer 120 is also called an ion permeation layer. As shown in FIGS. 4A and 4B, the electrolyte layer 120 includes a porous separator 121 that segments the cathode 113 and the anode 112 and an electrolyte that permeates the separator 121. The electrolyte layer 120 further includes a layer of electrolytes 124 and 125 between the cathode 113 and separator 121 and the anode 112 and separator 121 for conducting an ion between the separator 121 and the cathode 113 or anode 112. The electrolyte is, for example, a gel polymer electrolyte.

Referring back to FIG. 2, an anode terminal plate 102 is disposed on the uppermost bipolar electrode 110 of the battery element 100, and a cathode terminal plate 101 is disposed under the lowermost bipolar electrode 110. The terminal plates 101 and 102 are high conductive members and cover at least the entire electrode projection surfaces of the outermost layers. The current extracting portions of the outermost layers have low resistance, thereby decreasing the resistance to the current extracting in the surface direction. Accordingly, the power of the battery is increased. The high conductive member includes, for example, aluminum, copper, titanium, nickel, stainless or alloy thereof.

The uppermost and lowermost layers of the battery element 100 are not limited to being a bipolar electrode 110. Alternatively, end poles, in which only the cathode active material layer or the anode active material layer is formed on one surface, may also be stacked.

Referring to FIGS. 4A and B, the charging part 20 is configured such that the charging materials surround at least the periphery of the cathode 113 and the periphery of the anode 112 in the space between the adjacent collectors 111.

The charging part 20 shown in FIG. 4A is dissected into two sections by the electrolyte layer 120. The charging materials 114 and 116 are disposed in the respective sectioned spaces. The charging material 114 is disposed in the space between the electrolyte layer 120 and the collector 111, surrounding the periphery of the cathode 113. Similarly, the charging material 116 is disposed to surround the periphery of the anode 112.

Another embodiment of the charging part 20 shown in FIG. 4B is configured such that a charging material 118 is disposed to surround all the periphery of the cathode 113, the electrolyte layer 120 and the anode 112 in the space between the adjacent collectors 111. In other words, the charging material 118 is disposed to surround the periphery of one unit battery layer 110a. These examples are not limiting as the arrangement of the charging materials is not restricted to any particular form.

If the electrolyte contained in the electrolyte layer 120 leaks out, then the unit battery layers 110a are electrically connected to each other. Thus, the bipolar battery 10 cannot work properly. Such a phenomenon is referred to as a liquid junction. When the electrolyte layer 120 includes a liquid-type or semi-solid gel-type electrolyte, a sealing material is used as the charging materials 114, 116 and 118 to prevent the liquid junction. Even when the electrolyte layer 120 contains a solid polymer electrolyte, the charging part 20 is mounted to prevent contact of the adjacent collectors 111 and short circuiting. These arrangements of the charging materials 114, 116 and 118 are shown in FIG. 4A or 4B.

In the first embodiment, a polymer gel electrolyte or an electrolytic solution is used as the electrolyte, necessitating the use of sealing material as the charging materials 114 and 116. The arrangement of the sealing materials 114 and 116 in the charging part 20 is as shown in FIG. 4A. In the following description, for convenience of explanation, the sealing material extending to surround the periphery of the cathode 113 is referred to as a first sealing material 114, while the sealing material extending to surround the periphery of the anode 112 is referred to as a second sealing material 116. Also, a first sealing layer 115 is formed by the first sealing material 114, and a second sealing layer 117 is formed by the second sealing material 116.

The sealing materials 114 and 116 are configured as one-liquid uncured epoxy resin. Other thermosetting resins (polypropylene or polyethylene) or thermoplastic resins can alternatively be employed. Further, it is preferable to adequately select a material having a desired sealing effect under the environment in which it will be used, depending on the type of application.

Figure 7A:
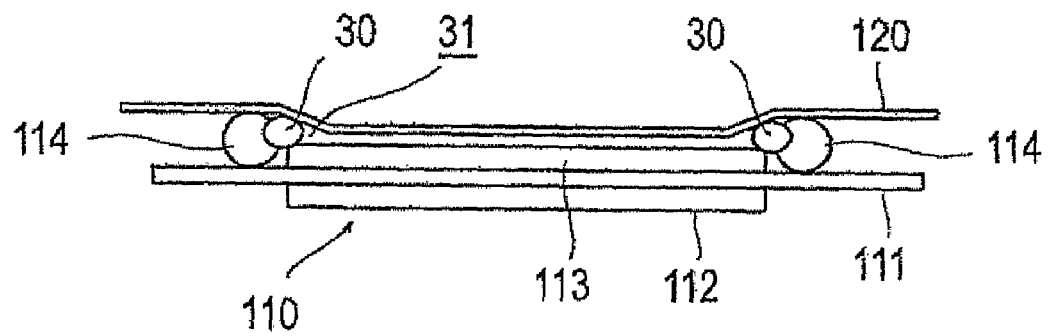
FIGS. 7A and 7B are sectional views illustrating a state in which a gas is introduced when alternately stacking the bipolar electrode and an electrolyte layer.
Figure 7B:
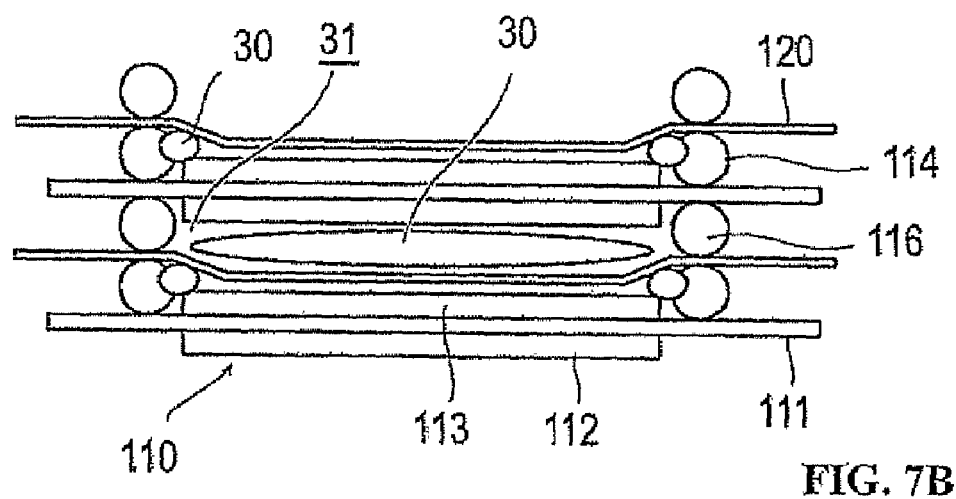

As shown in FIGS. 7A and 7B, when alternately stacking the bipolar electrodes 110 and the electrolyte layers 120, a gas bubble 30 is introduced. FIG. 7A shows how the gas 30 is introduced near the charging materials 114 and 116 when stacking the electrolyte layer 120 on the bipolar electrode 110. This is because the charging materials 114 and 116 are thicker than the electrode. As seen in FIG. 7B, when further stacking bipolar electrodes 110 on electrolyte layers 120, the gas bubble 30 is introduced between the upper bipolar electrode 110 and the lower electrolyte layer 120.

If the introduced gas bubble 30 is not removed, the battery power is deteriorated. The bubble may be removed, for example, by closely pulling the separator 121 in stacking. This is a complicated process. In order to simplify the manufacturing process of the bipolar battery 10 without the above complicated process, restraining the remaining gas 30 when stacking the bipolar electrodes 110 is desirable.

To address this, the bipolar battery 10 disclosed herein includes the exhaust part 32 shown in FIG. 5, which is formed at a portion of the charging part 20. When stacking the bipolar electrodes 110, the residual gas 30 in the inner space 31 surrounded by the charging materials 114 and 116 is exhausted to the outside through the exhaust part 32. The position, size and number of the exhaust part 32 can be adequately selected within a range that sufficiently achieves the exhausting performance.

Figure 6:
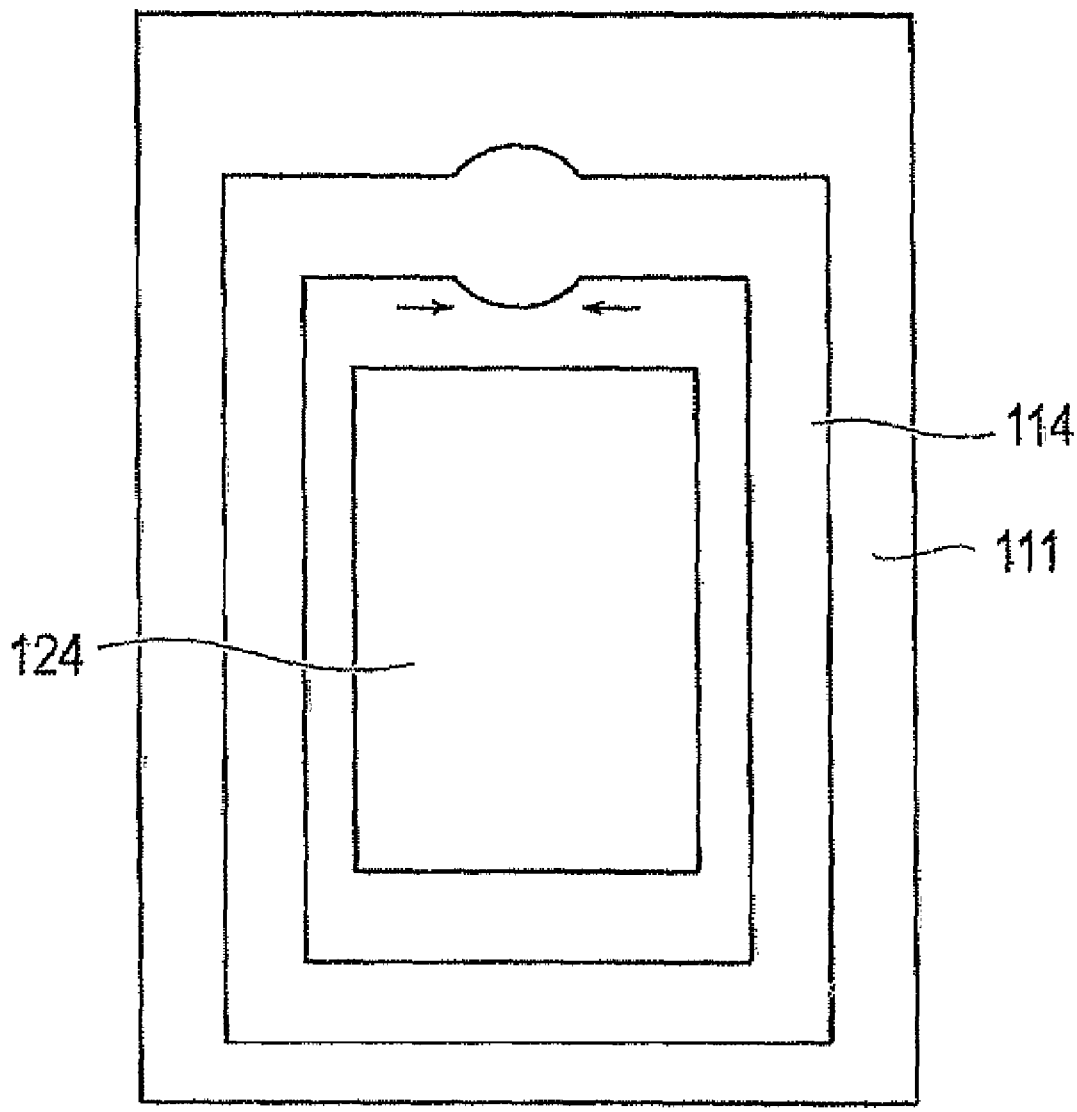
FIG. 6 is a plan view illustrating the blocking of the gap portion.

Referring to FIGS. 5 and 6, the charging part 20 of the first embodiment includes a gap portion 21, which permits the inner space 31 to communicate with the outside when stacking the bipolar electrodes 110 and is blocked by pressing the charging part 20 in a direction of stacking the bipolar electrodes 110 (hereinafter, referred to as a "stacking direction"). The exhaust part 32 of the first embodiment is configured as the gap portion 21. The exhausting operation of the exhaust part 32 is stopped by the charging part 20 being pressed and the gap portion 21 being blocked.

Although the gas bubble 30 is introduced when alternately stacking the bipolar electrodes 110 and the electrolyte layers 120 (shown in FIGS. 7A and 7B), the residual gas 30 in the inner space 31 is exhausted to the outside of the inner space 31 through the exhaust part 32, which is configured as the gap portion 21. The exhaust of the residual gas 30 in the inner space 31 is performed until the gap portion 21 is blocked by pressing the charging part 20 in the stacking direction, at which time the exhausting operation of the exhaust part 32 is stopped.

Because the remaining gas captured when stacking the bipolar electrodes 110 can be removed by the exhausting operation of the exhaust part 32, a bubble removing process, for example, of closely pulling the separator 121 in stacking, is unnecessary. Accordingly, a complicated process is eliminated. The manufacturing process of the bipolar battery 10 can be simplified.

Except for the particularly explained parts, the bipolar battery 10 can be made of well-known materials, which are used in a general lithium ion secondary battery. The collector 111, the anode active material layer, the cathode active material layer and the separator 121, which can be used in the bipolar battery 10 of the present invention, will be explained for reference.

The collector 111 is, for example, a stainless steel foil but is not limited thereto. The collector 111 may include an aluminum foil, a clad material of nickel and aluminum, a clad material of copper and aluminum or a plating material of a combination of the above metals.

The anode active material of the anode 112 is, for example, a hard carbon (a non-graphitized carbon material). The anode active material may alternatively include a graphite-based carbon material or a lithium-transition metallic composite oxide. The anode active material composed of carbon and the lithium-transition metallic composite oxide have particularly desirable capacity and power characteristics.

The cathode active material of the cathode 113 is, for example, $LiMn_2O_4$, although it is not particularly restricted thereto. The lithium-transition metallic composite oxide provides desirable capacity and power characteristics.

Thicknesses of the cathode 113 and the anode 112 are not particularly restricted and may be set depending on the application in which the battery is used. Depending on the application, power, energy or ion conductivity may be more critical.

The sealing materials 114 and 116 constituting the first and second sealing layers 115 and 117 are, for example, one-liquid uncured epoxy resin. However, the sealing materials 114 and 116 may include other thermosetting resins (polypropylene or polyethylene) or thermoplastic resins. Further, it is preferable to adequately select a material having a desired sealing effect under the environment in which it is used, depending on the type of application.

A material of the separator 121 which is a part of the electrolyte layer 120, is PE (polyethylene) having porosity through which the electrolyte can permeate. However, the material is not particularly restricted thereto. The separator 121 may include other polyolefins such as PP (polypropylene), a stack in a three-layer structure of PP/PE/PP, polyamide, polyimide, aramide or non-woven fabric. The non-woven fabric includes, for example, cotton, rayon, acetate, nylon and/or polyester.

A host polymer of the electrolyte is, for example, PVDF-HFP (copolymer of polyvinylidene fluoride and hexafluoropropylene) containing 10% of HFP (hexafluoropropylene) copolymer. However, the host polymer is not particularly restricted thereto and may include other polymers without lithium ion conductivity or polymers (solid polymer electrolyte) with ion conductivity. Other polymers without lithium ion conductivity include, for example, PAN (polyacrylonitile) or PMMA (polymethylmethacrylate). Polymers with ion conductivity include, for example, PEO (polyethylene oxide) or PPO (polypropylene oxide).

An electrolytic solution of the host polymer includes, for example, an organic solvent composed of PC (propylene carbonate) and EC (ethylene carbonate), and lithium salt ($LiPF_6$) as support salt. The organic solvent is not particularly restricted to PC and EC and may include other ring type carbonate classes, chain type carbonate classes such as dimethylcarbonate, and ether classes such as tetrahydrofuran. The lithium salt is not particularly restricted to $LiPF_6$ and may include other inorganic acid anion salts or organic acid anion salts such as $LiCF_3SO_3$.

As shown in FIGS. 1 and 2, the bipolar battery 10, housed in an exterior case 104, is in the form of a stack of battery elements 100. The exterior case 104 protects the battery elements from external shock or environmental deterioration. The terminal plates 101 and 102 made of a high conductive material are connected to the collectors 111 arranged at the outermost layers of the stack 100. The high conductive material includes, for example, aluminum, copper, titanium, nickel, stainless or an alloy thereof.

The terminal plates 101 and 102 extend to the outside of the exterior case 104 and serve as electrode tabs for extracting the current from the stack 100. Further, it is possible to extract the current from the stack 100 by arranging independently separate electrode tabs and connecting them to the terminal plates 101 and 102 directly or by using leads.

To reduce weight and thermal conductivity, the exterior case 104 is made of a sheet material such as a polymer-metal composite laminate film, which is formed by coating a metal, such as aluminum, stainless, nickel and copper or alloys thereof, with an insulator such as a polypropylene film. Further, the exterior case 104 is formed by partially or completely bonding an outer periphery of the case through thermal fusion.

Referring to FIG. 8, the bipolar battery 10 can be used independently, or alternatively used in the form of a battery pack 130. The battery pack 130 is formed by connecting the bipolar batteries 10 in serial or parallel. The battery pack 130 has conductive bars 132 and 134. The conductive bars 132 and 134 are connected to the terminal plates 101 and 102 extending from the interior of the bipolar batteries 10.

When forming the battery pack 130 by connecting the bipolar batteries 10, the capacity and voltage can be freely adjusted through the appropriate serialization or parallelization. A connecting method includes, for example, ultrasonic welding, thermal welding, laser welding, riveting, caulking or an electronic beam.

Figures 9, 10:
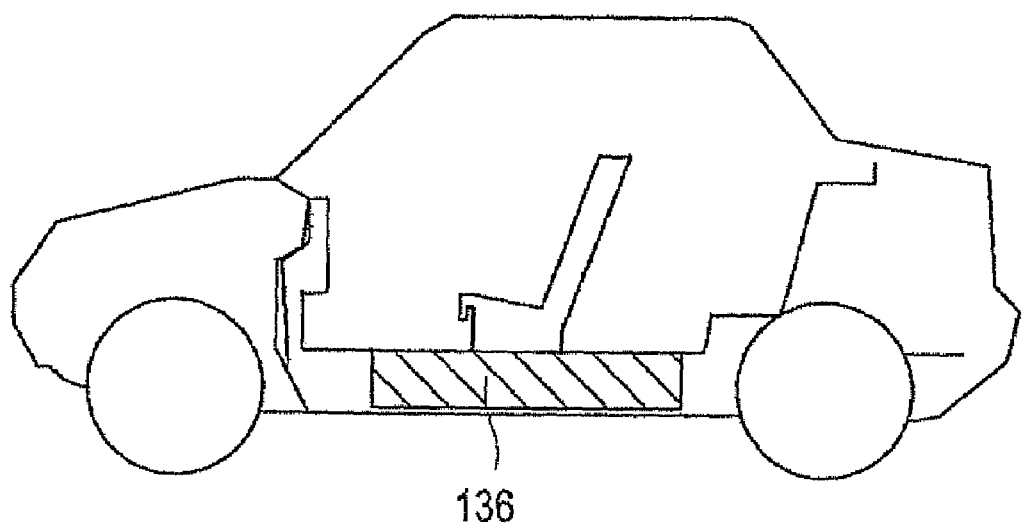
FIG. 9 is a schematic view of a vehicle in which the battery pack shown in FIG. 8 is mounted.
FIG. 10 is an overall flow diagram for explaining a method of manufacturing the bipolar battery in accordance with the first embodiment.

Referring to FIG. 9, by serializing and/or parallelizing and multi-connecting the battery packs 130 themselves, it is possible to provide a battery pack module (a large scale battery pack) 136 that can be mounted, for example, as a power source for driving a motor of a vehicle 138. The vehicle includes, for example, an electric vehicle, a hybrid electric vehicle or an electric train. The battery pack module 136 can include controls such as controlling charging in every bipolar battery 10 or every battery pack 130. Accordingly, it is possible to achieve functional improvements, such as an extension of a driving distance per charging at a time or an extension of a lifetime of a battery mounted on a vehicle.

Hereinafter, a method of manufacturing the bipolar battery 10 according to the first embodiment will be described.

FIG. 10 is a general flow diagram illustrating a method of manufacturing the bipolar battery 10 in accordance with the first embodiment.

The method of manufacturing the bipolar battery 10 of the first embodiment comprises forming an assembly 108 (shown in FIG. 18) in which the bipolar electrode 110, the electrolyte layer 120, the sealing materials 114 and 116 and the separator 121 are arranged. Next, the bonded body, or battery element 100, is formed by stacking the assemblies 108. Finally, the battery assembly 100 is cased within the exterior case 104.

Figure 11:
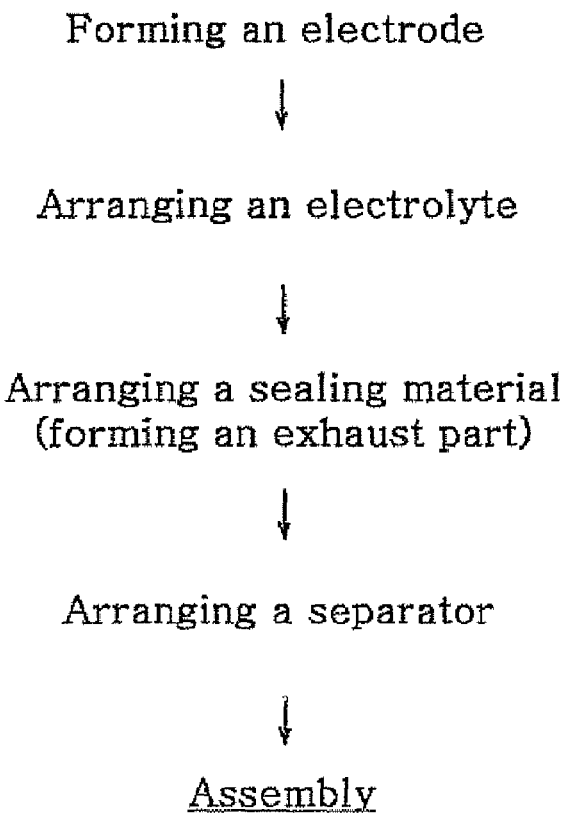
FIG. 11 is a flow diagram of a process of forming an assembly shown in FIG. 10.

The assembly process of FIG. 10 includes an electrode forming process, an electrolyte arranging process, a sealing material arranging (exhaust part forming) process and a separator arranging process, as shown in FIG. 11. FIGS. 12 to 18 further illustrate the steps of FIG. 11.

Referring to FIG. 11, in the electrode forming process a cathode slurry is first prepared. The cathode slurry is prepared to have a cathode active material of 85 wt %, a conductive auxiliary agent of 5 wt % and a binder of 10 wt %. The cathode slurry obtains a desired viscosity by adding a viscosity adjusting solvent therein. The cathode active material in this example is $LiMn_2O_4$. The conductive auxiliary agent is acetylene black. The binder is PVDF (polyvinylidene fluoride). The viscosity adjusting solvent is NMP (N-methyl-2-pyrolidone). The cathode slurry is coated on one side surface of the collector 111 made of a stainless steel foil. The conductive auxiliary agent, for example, may include carbon black or graphite. Also, the binder and the viscosity adjusting solvent are not restricted to PVDF and NMP.

Next, an anode slurry is prepared. The anode slurry is prepared, for example, to have an anode active material of 90 wt % and a binder of 10 wt %. The anode slurry obtains a desired viscosity by adding the viscosity adjusting solvent therein. The anode slurry is coated on the other side surface of the collector 111. The anode active material is hard carbon. The binder and the viscosity adjusting solvent are PVDF and NMP. The anode slurry is coated on the other side surface of the collector 111.

Figure 12:
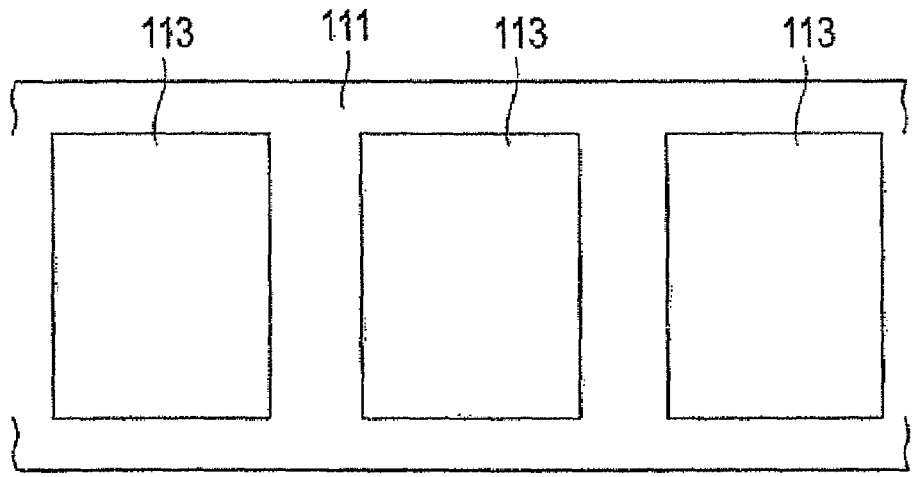
FIG. 12 is a plan view explaining the process of forming an electrode shown in FIG. 11.
Figure 13:
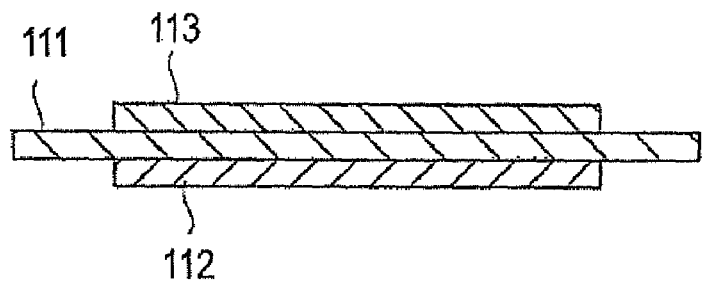
FIG. 13 is a sectional view explaining the process of forming the electrode shown in FIG. 11.

A coating film of the cathode slurry and a coating film of the anode slurry are dried, for example, by using a vacuum oven to form the cathode 113 composed of the cathode active material layer and the anode 112 composed of the anode active material layer as shown in FIGS. 12 and 13. At this time, NMP is removed by being volatilized.

The thicknesses of the cathode 113 and the anode 112 are not particularly restricted. They may be set depending on the battery application and emphasis on power or ion conductivity.

Figure 14:
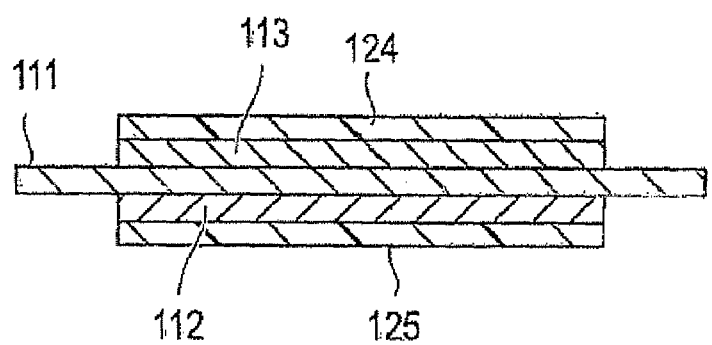
FIG. 14 is a sectional view explaining the process of arranging an electrolyte shown in FIG. 11.

In the electrolyte arranging process, the electrolytes 124 and 125 are coated on electrode portions of the cathode 113 and the anode 112, respectively, as shown in FIG. 14. The electrolytes 124 and 125 are prepared to have electrolytic solution of 90 wt % and host polymer of 10 wt %. The electrolytes 124 and 125 obtain a viscosity suitable for coating by adding a viscosity adjusting solvent therein.

The electrolytic solution includes an organic solvent composed of PC (propylene carbonate) and EC (ethylene carbonate), and lithium salt ($LiPF_6$) as a support salt. The concentration of the lithium salt is, for example, 1M.

The host polymer is, for example, PVDF-HFP (copolymer of polyvinylidene fluoride and hexafluoropropylene) containing 10% of HFP (hexafluoropropylene) copolymer. The viscosity adjusting solvent is DMC (dimethyl carbonate) in this exemplary embodiment. However, the viscosity adjusting solvent is not restricted to DMC.

In the sealing material arranging process (which also forms the exhaust part), the sealing materials 114 and 116 are coated away from the gap portion 21. Further, the exhaust part 32 is formed by the gap portion 21. The first and second sealing materials 114 and 116 extend discontinuously around the peripheries of the cathode 113 and the anode 112. Also, the cut-shaped gap portion 21 is formed at a portion where the first and second sealing materials 114 and 116 are not disposed.

The coating of the first sealing material 114 is now described. The second sealing material 116 is coated identically to the first sealing material 114.

Figure 15:
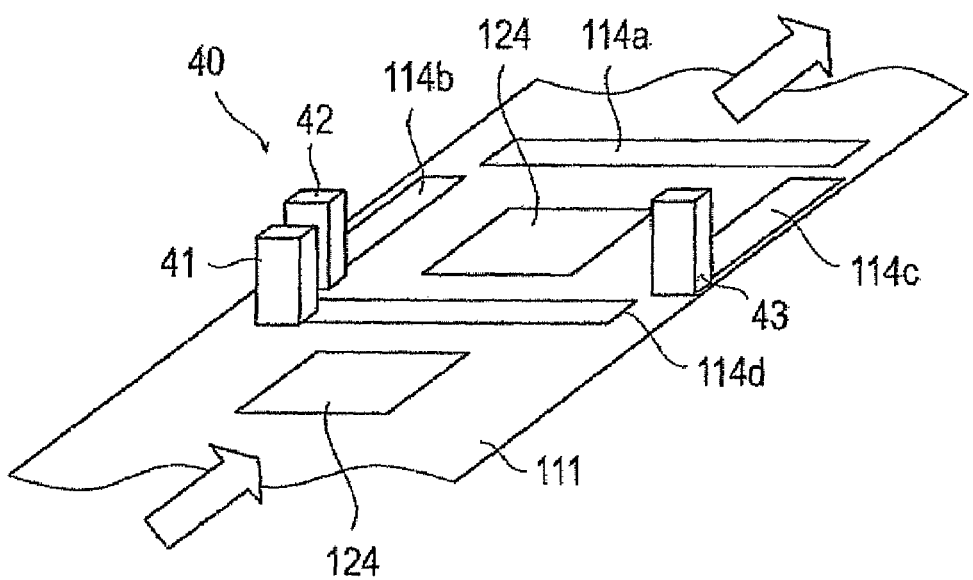
FIG. 15 is a perspective view illustrating a coating device for use in the process of arranging sealing materials as shown in FIG. 11 and coating the sealing materials as charging materials.

Referring to FIG. 15, the coating device 40 used in the sealing material arranging process includes coating heads 41, 42 and 43 capable of coating the sealing material 114 and stopping the coating operation. By moving the coating heads 41, 42 and 43 relative to the collector 111, the gap portion 21 is formed between the sealing materials 114, which are coated in different directions. The coating device 40 further includes a conveying mechanism such as a roller to successively convey the collector 111 in a longitudinal direction.

The first coating head 41 of the coating device 40 is mounted movably along a direction perpendicular to the longitudinal direction in which the collector 111 is conveyed. Further, the second and third coating heads 42 and 43 are mounted on both end portions in the perpendicular direction. If the collector 111 is conveyed to a predetermined position, then the conveyance of the collector 111 is stopped, and the first coating head 41 moves. Accordingly, as shown by the reference numeral 114a in FIG. 16, the sealing material 114 is coated in the perpendicular direction. Subsequently, the coating operation of the first coating head 41 is stopped, the conveyance of the collector 111 is started, and the coating operation of the second and third coating heads 42 and 43 is started. If the collector 111 is conveyed by a predetermined distance, then the conveyance of the collector 111 and the coating operation of the second and third coating heads 42 and 43 are stopped. Accordingly, as shown by the reference numerals 114b and 114c, the sealing material 114 is coated in the longitudinal direction. Then, the first coating head 41 moves again. As shown by the reference numeral 114d in FIG. 16, the sealing material 114 is coated in the perpendicular direction. As a result, the gap portions 21 are formed at four positions between the sealing materials 114, which are coated in the two different directions.

When the sealing materials 114 are coated without forming the gap, the sealing materials 114 are overlapped on corner portions. Thus, the thickness of the sealing materials 114 is not uniform due to the overlapped portions, thereby causing the deterioration of the sealing performance. In this embodiment, since the sealing materials 114 are not overlapped on the corner portions, deterioration of the sealing performance is prevented.

By fixing the positions of the respective coating heads 41, 42 and 43 and moving the collector 111 in two directions, the sealing materials 114 can be coated while forming the gap portions 21. Further, the exhaust parts 32 can be formed by the gap portions 21.

The sealing materials 114 and 116 are coated on both surfaces of the collector 111. First, the first sealing material 114 is arranged so as to extend around an outer periphery of the cathode-side surface of the collector 111, i.e., the exposed portion of the collector 111, and to extend around the cathode 113 (refer to FIG. 16).

Next, the second sealing material 116 is arranged so as to extend around the outer periphery of the anode-side surface of the collector 111, i.e., the exposed portion of the collector 111, and to extend around the anode 112. At this time, the arrangement position of the second sealing material 116 is determined such that the second sealing material 116 opposes (overlaps with) the first sealing material 114 (shown in FIG. 17). The first and second sealing materials 114 and 116 are charging materials made from one-liquid uncured epoxy resin.

Figure 16:
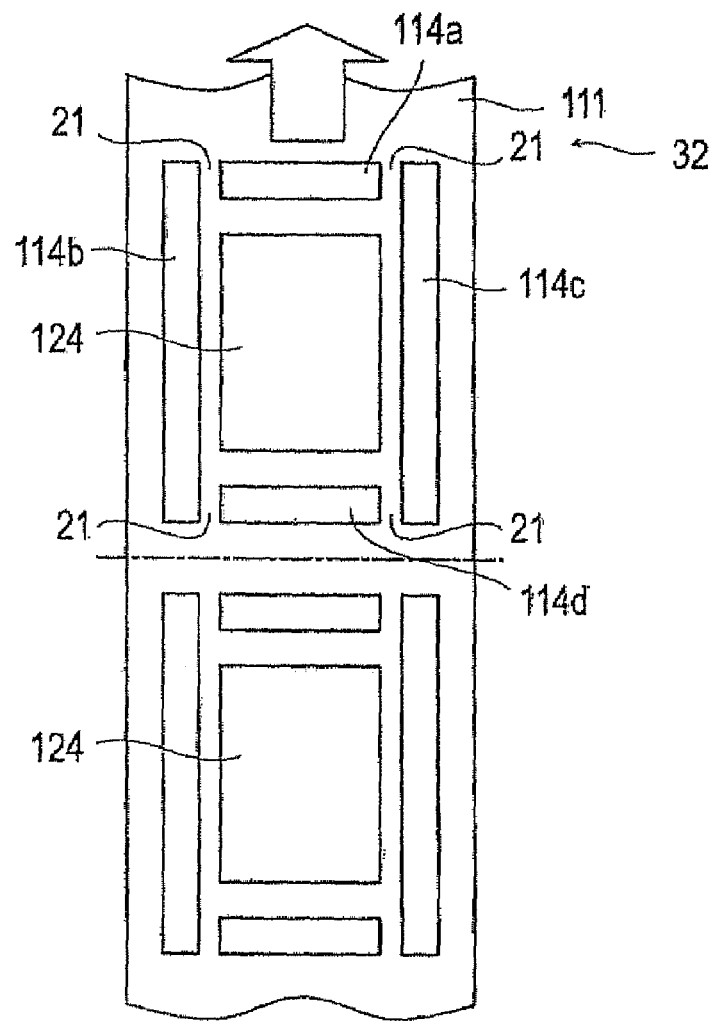
FIG. 16 is a plan view explaining the process of arranging the sealing materials (forming the exhaust part) shown in FIG. 11.
Figure 17:
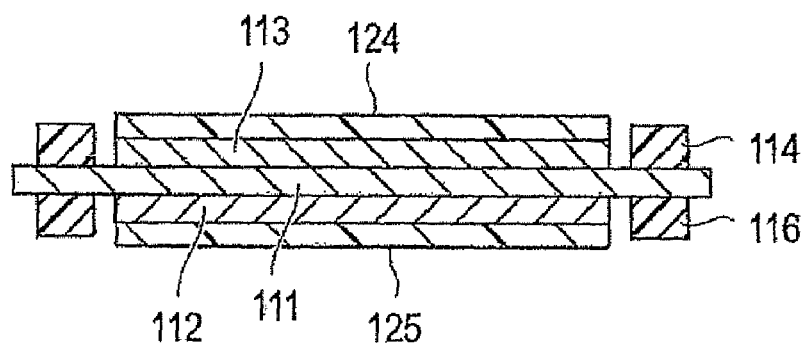
FIG. 17 is a sectional view illustrating the arrangement of the sealing materials shown in FIG. 11.

When the process of coating the sealing material 116 is terminated, the long collector 111 is cut at a portion shown by a dashed dotted line in FIG. 16.

In the sealing material arranging process, the thickness of the first sealing material 114 is set to be less than a total thickness of the cathode 113 and the electrolyte 124 in some embodiments. Also, the thickness of the second sealing material 116 can be similarly set to be less than a total thickness of the anode 112 and the electrolyte 125. Because the separator 121 contacts a center portion on which the electrolytes 124 and 125 are arranged prior to contacting the first and second sealing materials 114 and 116 arranged on the outer periphery, it is possible to remove the bubble from the inner portion surrounded by the first and second sealing materials 114 and 116.

Figure 18:
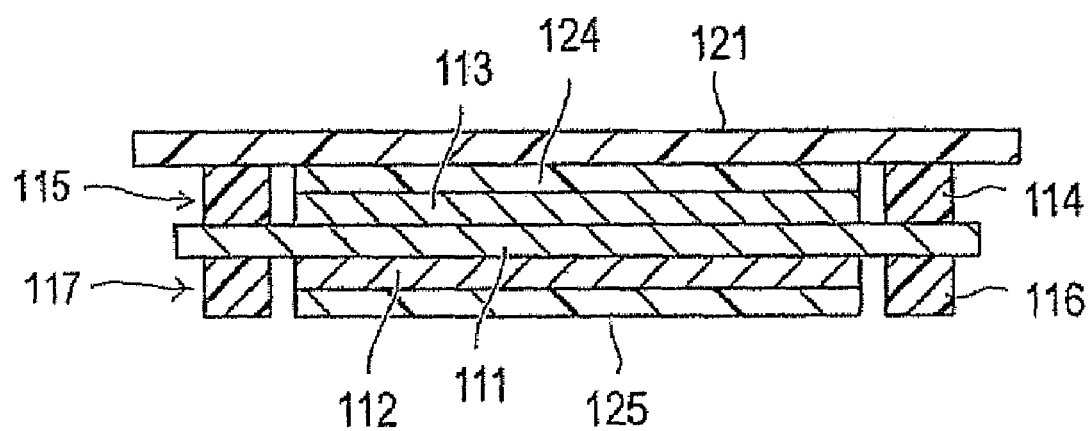
FIG. 18 is a sectional view of the arrangement of a separator shown in FIG. 11.

In the separator arranging process, the separator 121 is arranged to entirely cover the cathode-side surface of the collector 111 as shown in FIG. 18. Accordingly, the assembly 108 of the bipolar electrode 110, the electrolytes 124 and 125, the sealing materials 114 and 116 and the separator 121 is formed. The separator 121 is made from porous PE.

By stacking the assemblies 108, the charging part 20 is formed such that the charging materials 114 and 116 are arranged so as to surround the periphery of the cathode 113 and the periphery of the anode 112 in the space between the collector 111 and the electrolyte layer 120.

FIG. 19 illustrates the bonded body forming process, which includes an assembly setting process, a stacking process, a pressing process, a sealing layer forming process, an interface forming process, an initial charging process and a bubble exhausting process. FIGS. 20 to 24 are views further illustrating the process of FIG. 19.

Figure 20:
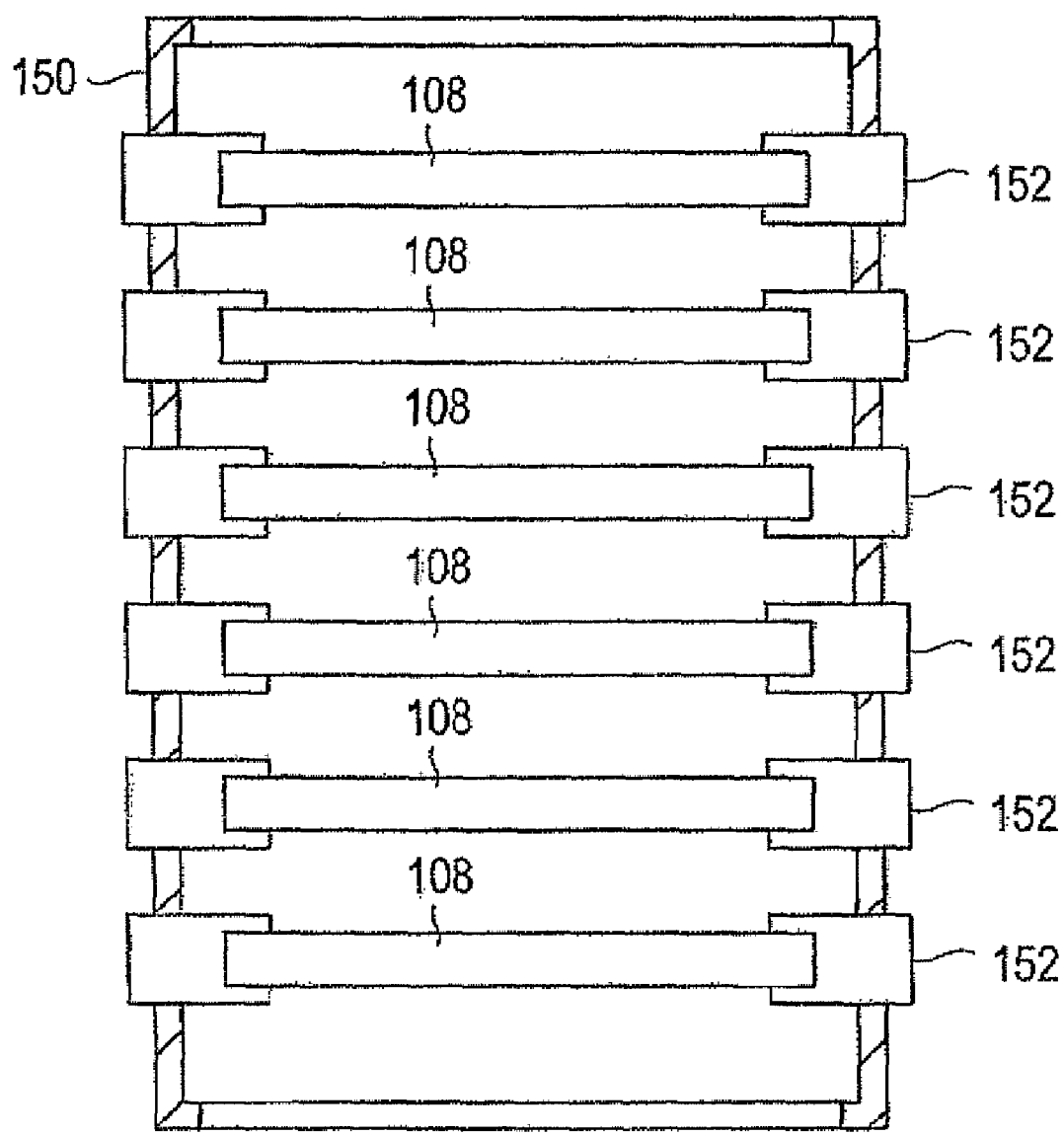
FIG. 20 is a sectional view of an assembly shown in FIG. 19.

In the assembly setting process, a plurality of assemblies 108 are sequentially set in a magazine 150 as shown in FIG. 20. To avoid any interference when setting the assembly 108, the magazine 150 has a clamp mechanism 152 formed in a frame shape and capable of gripping the outer peripheral portion of the assembly 108. The clamp mechanism 152 is arranged in a stacking direction with an interspacing so that the assemblies 108 do not contact each other. The stacking direction is a direction perpendicular to a surface direction of the assembly 108. The clamp mechanism 152 is configured, for example, to have an elastic member such as a spring. It is further configured to maintain a tensile force on the assembly 108 based on an elastic force. This prevents the generation of corrugation.

Figure 21:
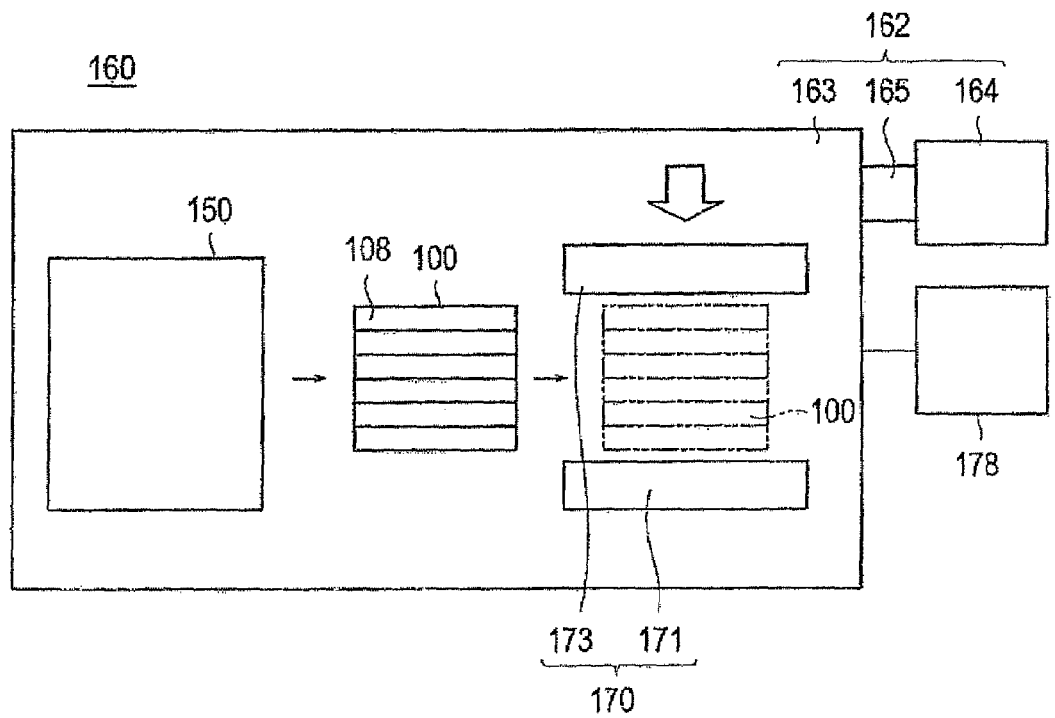
FIG. 21 is a schematic view explaining the stacking process and a pressing process shown in FIG. 19.

In the assembly stacking process, the magazine 150 is disposed inside a vacuum treatment device 160, and the battery element 100 of the assembly 108 is formed under the vacuum condition as shown in FIG. 21. The vacuum is in the range of 0.2 to $0.5 \times 10^5$ Pa, for example. The stacking process includes the air exhausting process. When forming the battery element 100, the residual gas 30 in the inner space 31 surrounded by the first and second sealing materials 114 and 116 is exhausted to the outside of the inner space 31 through the gap portion 21. Because it is under a vacuum, the introduction of the bubble into the stacking interface of the electrode and the electrolyte layer 120 is less likely.

The method of forming the battery element 100 is certainly not limited to this description. For example, the battery element 100 may be formed by controlling the clamp mechanism 152 for holding the assembly 108 while moving the magazine 150 toward a cradle, and also by sequentially releasing the assembly 108 when contacting the cradle.

The vacuum treatment device 160 includes a vacuuming means 162, a pressing means 170 and a controller 178 as shown in FIG. 21. The controller 178 is, for example, a microcomputer including a random access memory (RAM), a read-only memory (ROM) and a central processing unit (CPU) in addition to various input and output connections. Generally, the control functions described herein for the controller 178 are functional components of one or more software programs stored in ROM and are performed by execution by the CPU.

The vacuuming means 162 has a vacuum chamber 163, a vacuum pump 164 and a piping system 165. The vacuum chamber 163 has a cover part that is able to be opened and/or detached and a fixed base part on which the magazine 150 and the pressing means 170 are disposed. The vacuum pump 164 is, for example, a centrifugal type, and is used to form an inner portion of the vacuum chamber 163 in a vacuum state. The piping system 165 is used to connect the vacuum pump 164 and the vacuum chamber 163, and a leak valve (not shown) is disposed therein.

The pressing means 170 has a base plate 171 and a press plate 173 that are disposed to be close to yet spaced apart from each other The controller 178 is used to control the movement or pressing force of the press plate 173. A sheet shaped elastic body may be disposed on the base plate 171 and the press plate 173.

The pressing process includes the air exhausting process and a gap blocking process. In the pressing process, the battery element 100 is pressed in a direction of stacking the bipolar electrodes 110 by the press plate and the base plate 171 while maintaining a vacuum state (shown in FIG. 21). At this time, the charging part 20 in the battery element 100, in which the first and second sealing materials 114 and 116 are disposed, is pressed. The pressing occurs, for example, under 1 to $2 \times 10^6$ Pa.

In the initial stage of the pressing process, the residual air in the inner space 31 surrounded by the first and second sealing materials 114 and 116 is exhausted through the gap portion 21. As the pressing process is further performed, the first and second sealing materials 114 and 116 positioned near the gap portion 21 move toward the gap portion 21 and cover the gap portion 21 to block the gap portion 21, thereby stopping the exhausting operation. In other words, by blocking the gap portion 21 by pressing the charging part 20, the operation of the exhaust part 32 is stopped. By the pressing of the charging part 20, the first and second sealing materials 114 and 116 have predetermined thicknesses. In such a case, until the gap portion 21 is blocked by pressing the charging part 20 in the stacking direction, it is possible to exhaust the residual gas 30 in the inner space 31 to the outside of the inner space 31 through the gap portion 21. The remaining bubble in the electrode part is more reduced.

Accordingly, the generation of the dead space, through which the ion cannot permeate and the electron cannot move, is restrained. Because the movement of the ion is not interrupted and a battery resistance is not increased, a higher power density can be achieved.

Figure 22:
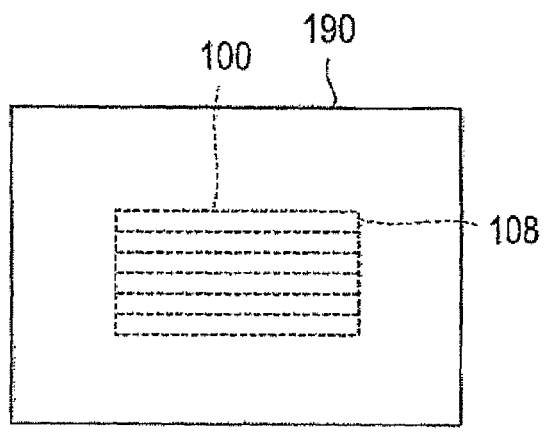
FIG. 22 is a schematic view explaining formation of a sealing layer shown in FIG. 19.

In the sealing layer forming process shown in FIG. 22, since the battery element 100 is arranged in an oven 190 and heated, the first and second sealing materials 114 and 116 in the battery element 100 are thermally cured to form the first and second sealing layers 115 and 117. The heating occurs at a temperature of, for example, 80° C. A method of heating the battery element 100 is not particularly restricted to one using the oven.

Lithium secondary batteries dislike moisture. However, since the first and second sealing layers 115 and 117 are made from resin, the introduction of moisture cannot be avoided. To this end, the desired thicknesses of the first and second sealing materials 114 and 116 in the pressing process are set to reduce the invading moisture by minimizing the thicknesses of the first and second sealing layers 115 and 117 contacting the outer atmosphere. Alternatively, thermoplastic resin may be applied to the first and second sealing materials 114 and 116. The first and second sealing materials 114 and 116 are plasticized by heating, thereby forming the first and second sealing layers 115 and 117.

Figure 23:
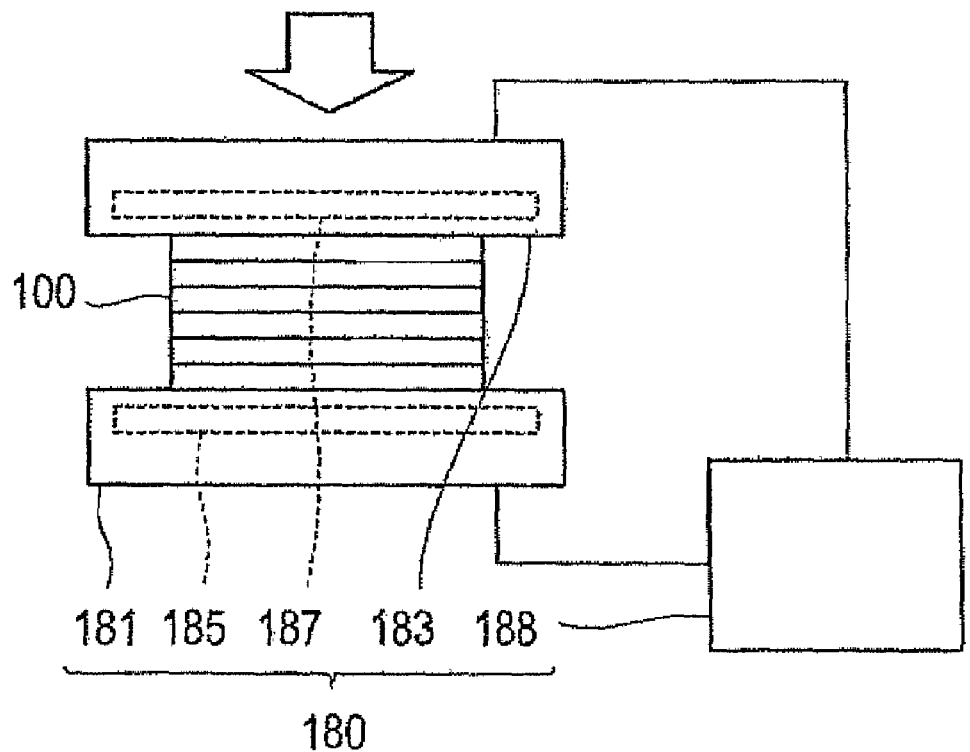
FIG. 23 is a schematic view explaining formation of an interface shown in FIG. 19.

In the interface forming process, since the battery element 100 is arranged in a pressing means 180 and is pressed while being heated, the electrolytes 124 and 125 penetrate into the separator 121 in the battery element 100, and a gel interface is formed thereon as in FIG. 23. The heating and pressing occur at a temperature and pressure of, for example, 80° C. and 1 to $2 \times 10^6$ Pa, respectively. The assemblies 108 are stacked, and the battery element 100 is integrated into the assembly unit.

As shown in FIG. 23, the pressing means 180 includes a base plate 181 and a press plate 183 arranged so as to be close to and spaced apart from each other, a lower heating means 185, an upper heating means 187 and a controller 188. The controller 188, like the controller 178, can be a microcomputer. The lower heating means 185 and the upper heating means 187 have a resistance heating element, for example, and are disposed inside the base plate 181 and the press plate 183 so as to be used to increase the temperature of the plates. The controller 188 is used to control the movement and pressing force of the press plate 183. The controller 188 is also used to control the temperature of the lower heating means 185 and the upper heating means 187.

One of the lower heating means 185 and the upper heating means 187 may be omitted. Alternatively, the lower heating means 185 and the upper heating means 187 may be disposed at the outside of the base plate 181 and the press plate 183. Again, a sheet shaped elastic body may be disposed on the base plate 181 and the press plate 183.

Figure 24:
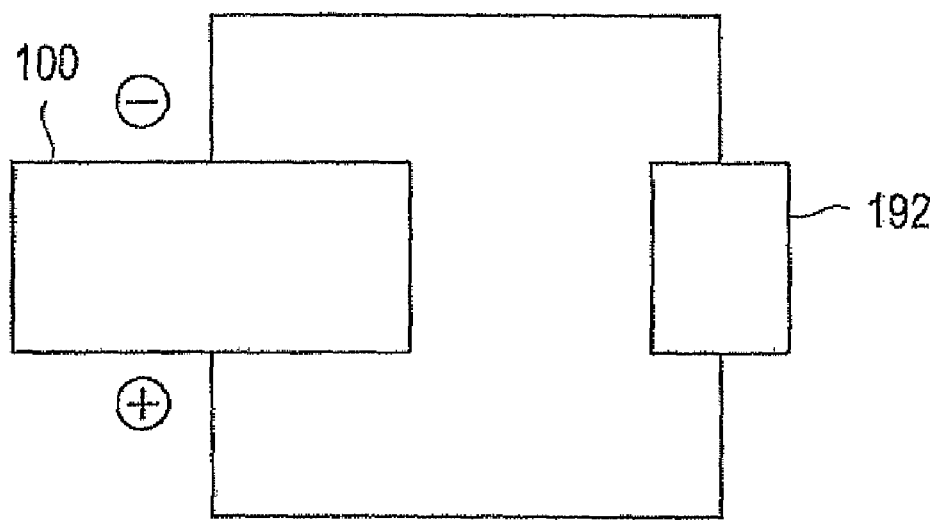
FIG. 24 is a schematic view explaining an initial charging process shown in FIG. 19.

In the initial charging process shown in FIG. 24, a first charging operation is performed by a charging/discharging device 192 electrically connected to the battery element 100, and a bubble is generated. The initial charging condition is, for example, a capacity base approximately calculated from a coating weight of the cathode 113, i.e., 4 hours at 21 V-0.5 C.

In the bubble exhausting process, the bubble positioned at a center portion of the battery element 100 is moved to the outer periphery and is then removed, for example, by pressing a roller to the surface of the battery element 100. Therefore, it is possible to improve the power density of the battery.

In the casing process step of FIG. 10, the battery element 100 is integrated into the assembly unit and housed in the exterior case 104 (shown in FIG. 2), thereby manufacturing the bipolar battery 10 of the first embodiment. The exterior case 104 is formed by arranging the battery element 100 between two exterior sheet materials and bonding the outer peripheries of the exterior materials. The exterior materials are a polymer-metal composite laminate film coated with an insulator such as a polypropylene film and are bonded by applying thermal fusion.

It is possible to achieve the higher capacity and/or higher power of the bipolar battery 10 by further stacking plural battery elements 100 upon one another and housing the same in the exterior case 104. Optionally, it is possible to perform the stacking process and the pressing process under atmospheric pressure, or to perform the sealing layer forming process and the interface forming process under a vacuum.

By properly selecting the electrolytes 124 and 125 and the first and second sealing materials 114 and 116, the sealing layer forming process and the interface forming process are integrated. The hardening of the first and second sealing materials 114 and 116 and the completion of the electrolyte layer 120 are performed simultaneously. This shortens the manufacturing process. A process of mounting a tab (lead wire) for monitoring a potential of each bipolar unit battery of the battery element 100 may be added between the sealing layer forming process and the interface forming process.

As described above, the first embodiment of the invention provides a bipolar battery 10 without a trapped gas bubble and a manufacturing method for such a battery.

Since the polymer gel electrolyte is a thermoplastic type in which the electrolytic solution is retained in a polymer framework, liquid leakage is prevented. Accordingly, a liquid junction is prevented, thereby producing a bipolar battery 10 with increased reliability. The polymer gel electrolyte is not restricted to the thermoplastic type and may be applied with the thermosetting type. Also, in such a case, liquid leakage is prevented by hardening the electrolyte layer 120 by pressing under heating to thereby prevent a liquid junction.

The surface pressure in the pressing process and the interface forming process is not restricted to 1 to $2 \times 10^6$ Pa. It may be appropriately established by considering the material properties such as the strength of the materials of the battery element 100. Also, the heating temperature in the sealing layer forming process is not restricted to 80° C. The heating temperature can be set to be in the range of 60° C. to 150° C. by considering the material properties, such as the heat resistance of the electrolytic solution or the hardening temperature of the first sealing material 114 (first sealing layer 115) and the second sealing material 116 (second sealing layer 117).

The electrolytes 124 and 125 are not restricted to the gel polymer class and may include the electrolytic solution class. In such a case, in the electrolyte arranging process the electrolytic solution is coated onto the electrode portions of the cathode 113 and the anode 112, for example, by using micropipette, and permeates therein (shown in FIG. 14).

The electrolytic solution includes an organic solvent composed of PC (propylene carbonate) and EC (ethylene carbonate), a lithium salt ($LiPF_6$) as a support salt and a small quantity of surfactant. The concentration of the lithium salt is, for example, 1M.

The organic solvent is not particularly restricted to PC and EC and may include other ring type carbonate classes, chain type carbonate classes such as dimethyl carbonate or ether classes such as tetrahydrofuran. The lithium salt is not particularly restricted to $LiPF_6$ and may include other inorganic acid anion salts or organic acid anion salts such as $LiCF_3SO_3$.

Figure 25A:
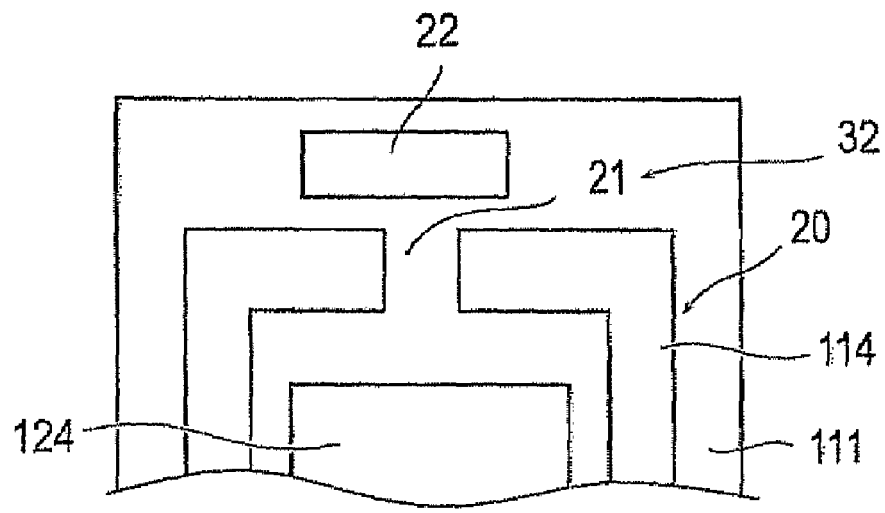
FIGS. 25A and 25B are plan views illustrating a charging part in accordance with a second embodiment, in which material storage parts are arranged while opposing a gap portion.
Figure 25B:
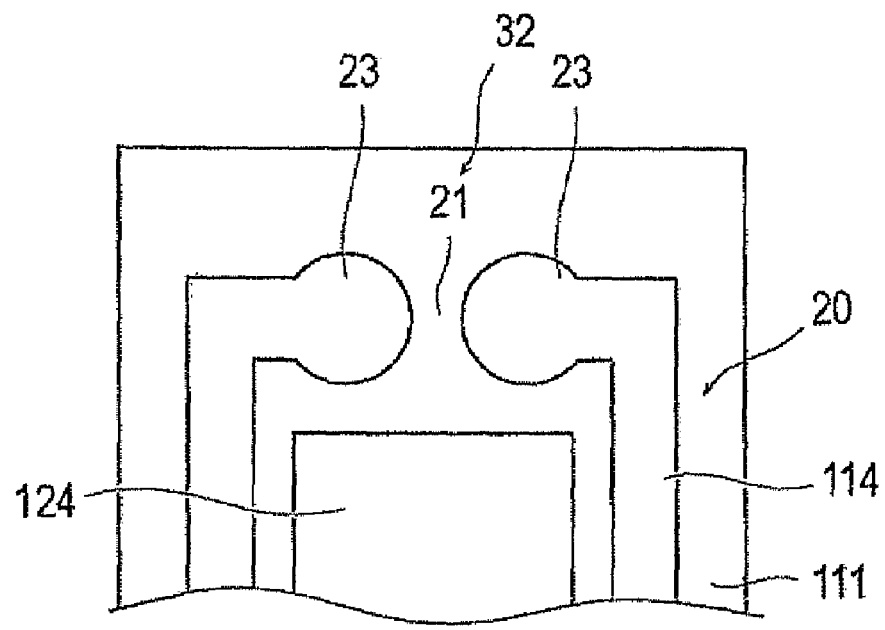

FIGS. 25A and 25B are plan views illustrating the charging part 20 in accordance with a second embodiment of the bipolar battery, wherein material storage parts 22 and 23 are arranged opposing the gap portion 21.

The second embodiment differs from the first embodiment in that the material storage parts 22 and 23 storing the material supplied to the gap portion 21 are provided. In the second embodiment, the charging part 20 is provided with the material storage parts 22 and 23, which store the material supplied to the gap portion 21. The material storage parts 22 and 23 are arranged opposing the gap portion 21. The material storage part 22 shown in FIG. 25A has a rectangular shape and is disposed at a slight distance from ends of the coated sealing materials 114 while opposing the gap portion 21. The material storage parts 23 shown in FIG. 25B have a substantially circular shape and are arranged integrally with the ends of the coated sealing materials 114 so as to form the gap portion 21. Any shape of the material storage part increases the amount of the sealing materials 114, thereby improving the mobility of the sealing materials 114. When the material storage part has a shape as in FIG. 25B, the width of the gap portion 21 is narrow, making it easier to block the gap portion 21. This is identically applied to the sealing materials 116. The material storage parts 22 and 23 are formed in the sealing material arranging process.

In the pressing process, when pressing the charging part 20 in the stacking direction, the material stored in the material storage parts 22 and 23 is pressed into the gap portion 21 to block the gap portion 21. Similar to the first embodiment, the exhausting operation of the exhaust part 32 is stopped when the gap portion 21 is blocked.

A third embodiment is configured such that the exhaust part 32 constitutes an uncured part 24 rather than the gap portion 21 of the first and second embodiments. The third embodiment is described with reference to FIGS. 26 to 30.

Figure 26:
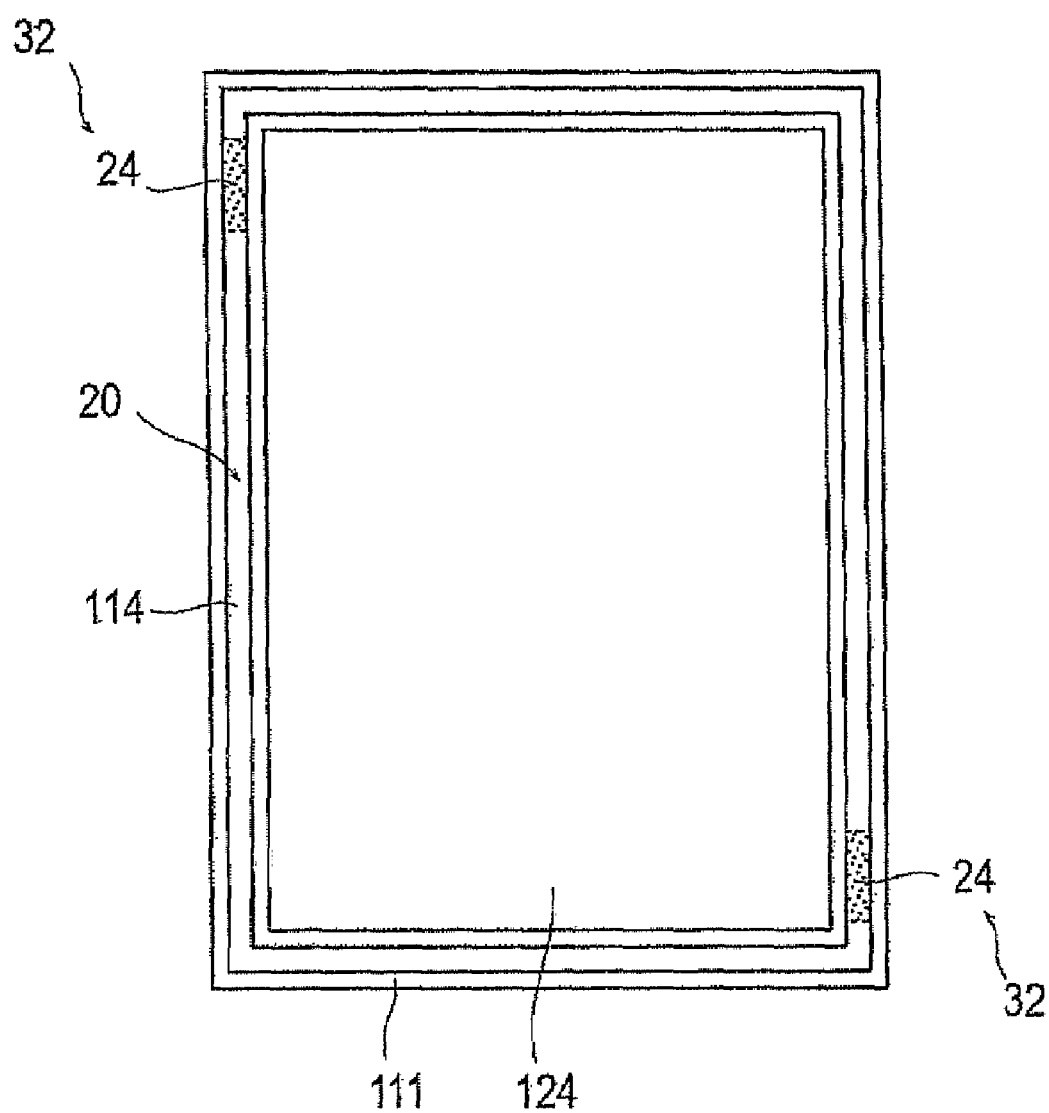
FIG. 26 is a plan view illustrating essential components of a bipolar battery in accordance with a third embodiment, wherein a charging part includes an uncured part.

Referring to FIG. 26, the sealing materials 114 and 116 used as the charging material of the third embodiment are thermosets. The charging part 20 includes the uncured part 24, which permits the inner space 31 to communicate with the outside when stacking the bipolar electrodes 110. The uncured part 24 is then hardened after exhausting the residual gas 30 from the inner space 31. A micro gap exists in the material itself of the uncured part 24, or between the uncured part 24 of the exhaust part 32 and the separator 121. The exhausting operation of the exhaust part 32 is complete when the uncured part 24 is hardened.

The thermosetting charging materials 114 and 116 may be made from common epoxy resin. Although the gas is introduced when alternately stacking the bipolar electrodes 110 and the electrolyte layers 120, the residual gas in the inner space 31 is exhausted to the outside of the inner space 31 through the micro gap existing in the uncured part 24 of the exhaust part 32. When the uncured part 24 is hardened, the exhausting operation of the exhaust part 32 ceases. Because the gas trapped when stacking the bipolar electrodes 110 can be removed by the exhausting operation of the exhaust part 32, closely pulling the separator 121 during stacking is unnecessary. Accordingly, this complicated process is eliminated, and the manufacturing process of the bipolar battery 10 is simplified.

Referring to FIG. 27, the assembly forming process according to the third embodiment includes an electrode forming process, an electrolyte arranging process, a sealing material arranging process and a separator arranging process.

In the sealing material arranging process, the sealing materials 114 and 116 are coated without a gap so as to extend continuously around the cathode 113 and the anode 112. The procedures of the other processes are the same as the first embodiment.

Figure 28:
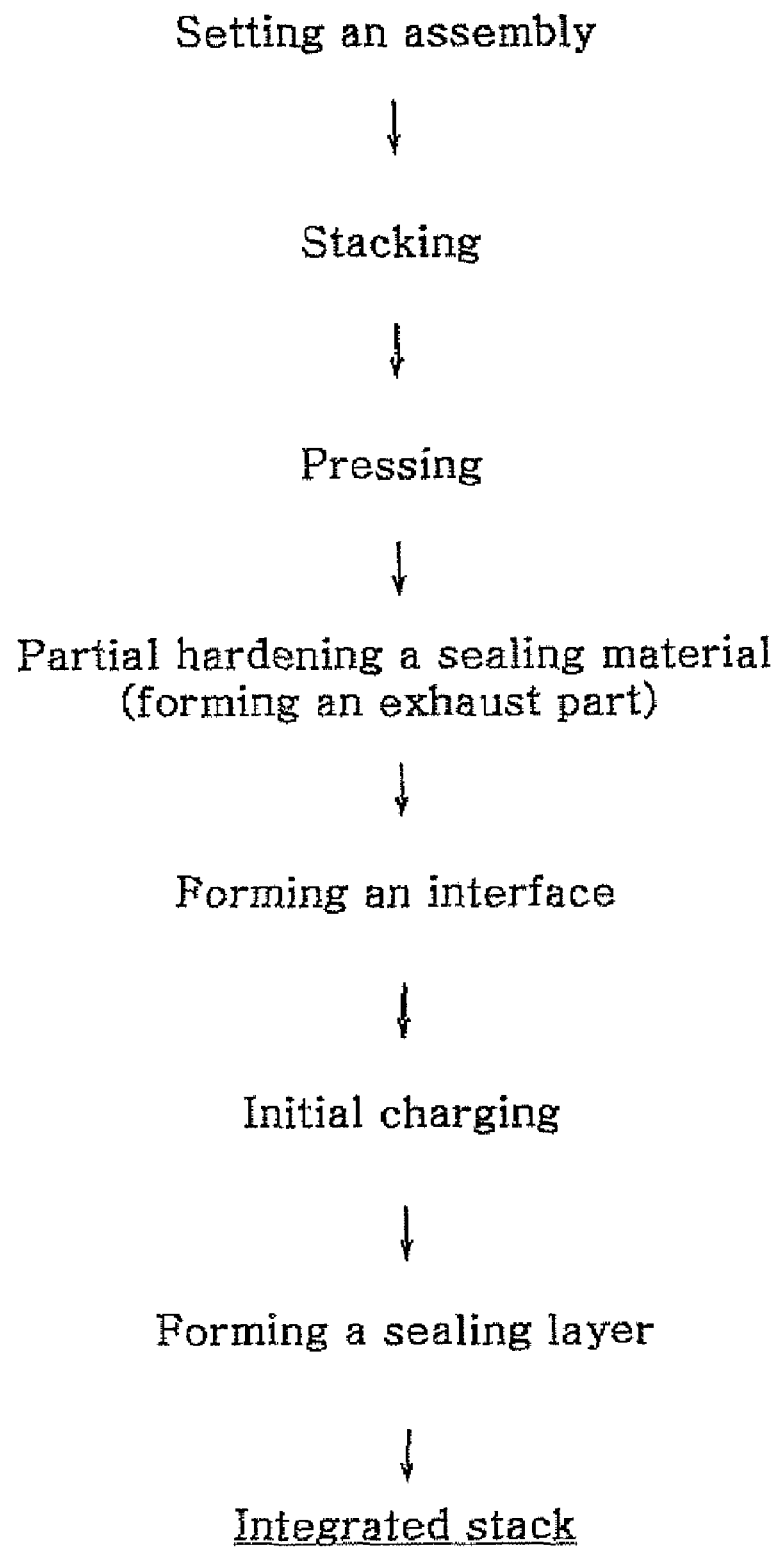
FIG. 28 is a flow diagram of a bonded body forming process in accordance with the third embodiment.

Referring to FIG. 28, the bonded body forming process according to the third embodiment includes an assembly setting process, a stacking process, a pressing process, a sealing material partial hardening process, an interface forming process, an initial charging process and a sealing layer forming process. The procedures of the assembly setting process and the stacking process are the same as the first embodiment. Also, because the sealing materials 114 and 116 are not provided with the gap portion 21, the gas is not exhausted through the gap portion 21 in the stacking process.

The pressing process includes the air exhausting process. In the pressing process, the battery element 100 is pressed in the stacking direction of the bipolar electrodes 110 by the press plate 173 and the base plate 171 while maintaining a vacuum state. By doing so, the residual gas in the inner space 31 surrounded by the first and second sealing materials 114 and 116 is exhausted through the sealing materials 114 and 116 themselves, which are not hardened, or through the micro gap between the sealing materials 114 and 116, the collector 111 and the electrolyte layer 120.

In the sealing material partial hardening process, the uncured part 24 is formed without thermal hardening of the sealing materials 114 and 116 while pressing the battery element 100 in the stacking direction. The exhaust part 32 is formed by the uncured part 24. Setting the uncured part 24 by only a part of the sealing materials is beneficial to promptly perform the process of stopping the exhausting operation of the exhaust part 32 and maintain a bubble removed state in the following sealing layer forming process. The sealing material partial hardening process includes the air exhausting process. When forming the battery element 100, the residual gas in the inner space 31 surrounded by the first and second sealing materials 114 and 116 is exhausted to the outside through the uncured part 24, thereby removing the bubble from the electrode part. Similarly to the first embodiment, the dead space through which the ion cannot permeate and the electron cannot move is not generated, battery resistance is not increased, and high power density can be achieved. The procedures of the interface forming process and the initial charging process are the same as the first embodiment.

The sealing layer forming process includes the air exhausting process. The sealing materials 114 and 116 of the uncured part 24 are heated while pressing the battery element 100 in the stacking direction. By doing so, the gas generated by the initial charging is exhausted to the outside through the exhaust part 32. The first and second sealing materials 114 and 116 are thermally hardened, thereby forming the first and second sealing layers 115 and 117. The bubble exhausting process of the first embodiment, i.e., the process of closely pulling the bubble located at the center portion of the stack 100 after the initial charging by using the roller and moving the bubble to the outer peripheral portion can be eliminated. The exhausting operation of the exhaust part 32 is stopped by thermal hardening the sealing materials 114 and 116 of the uncured part 24. A bipolar battery 10 with the improved power density of the battery can be obtained.

In the sealing material partial hardening process and the sealing layer forming process, the method of heating the sealing materials 114 and 116 is certainly not limited. For example, an induction heating method shown in FIG. 29 or a laser heating method shown in FIG. 30 can be employed. Alternatively, a method of hardening by heating moisture contained in the thermosetting resin using a microwave can be employed.

Figure 29:
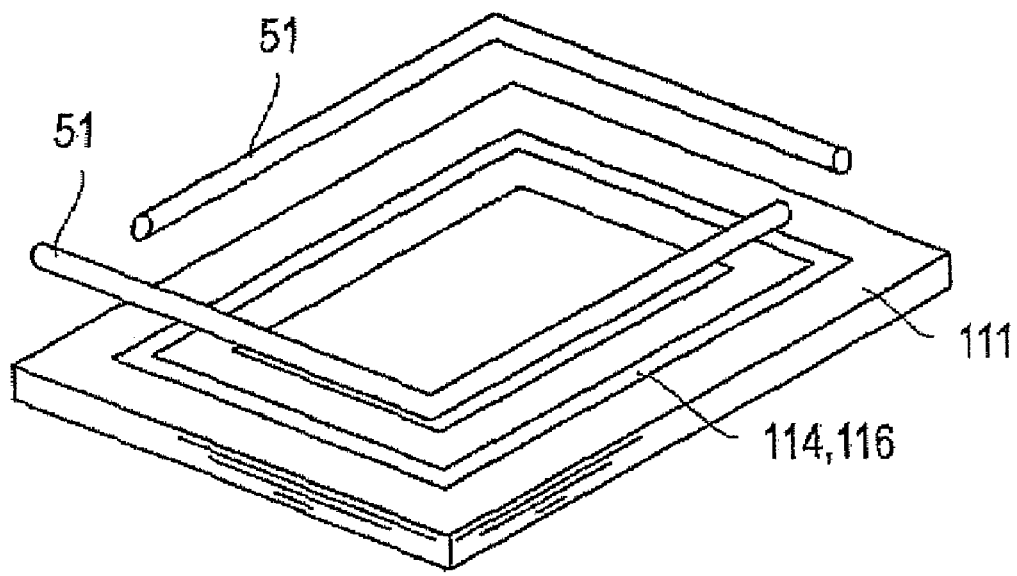
FIG. 29 is a view illustrating heating of charging materials by induction heating.

Referring to the induction heating method shown in FIG. 29, there are provided induction heating coils 51 arranged to correspond with the sealing materials 114 and 116. A high frequency current generating device (not shown) applies high frequency current to the induction heating coils 51. The sealing materials 114 and 116 are made of thermosetting resin, e.g., common epoxy resin, mixed with a magnetic material. For example, the plain set AE-300 (available from Ajinomoto-Fine-Techno Co., Inc.), which is a one-liquid thermosetting adhesive, can be used. A variable magnetic field is generated by applying high frequency current to the induction heating coils 51, generating an induction eddy current by the variable magnetic field at the sealing materials 114 and 116. The introduced magnetic material emits Joule heat by the eddy current, and the sealing materials 114 and 116 are heated to be thermally hardened. Since the sealing materials 114 and 116 can be heated by the concentrated induction heating, the heating of the ambient components can be avoided. Particle size of the introduced magnetic material does not deteriorate electric insulating properties of the sealing materials 114 and 116 by the induction heating.

Figure 30:
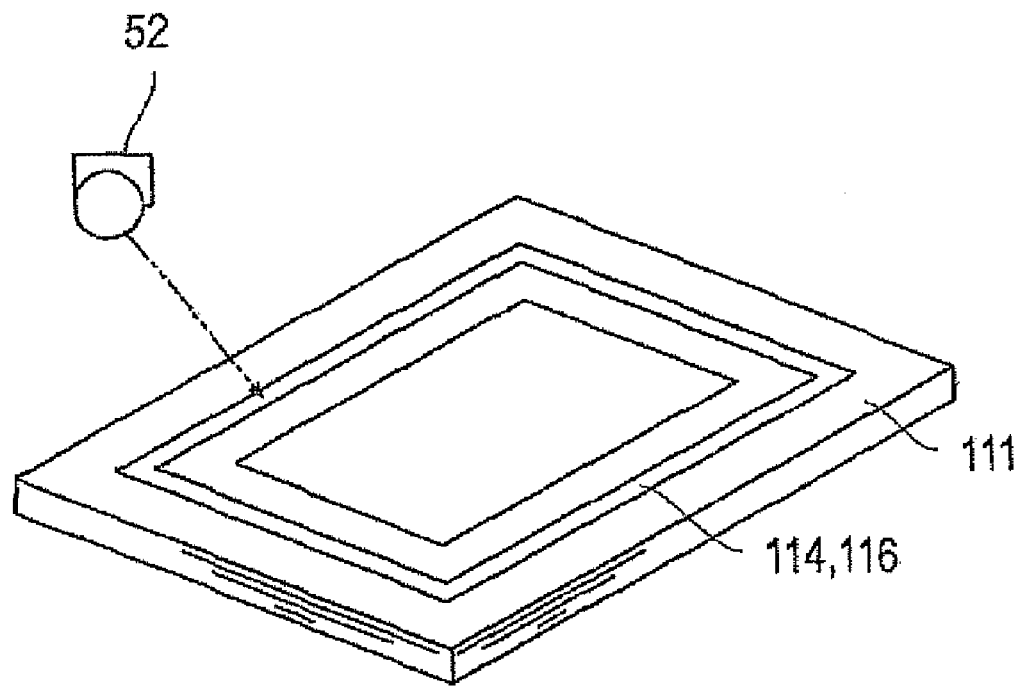
FIG. 30 is a view illustrating heating of the charging materials by laser heating.

Referring to the laser heating method shown in FIG. 30, a laser irradiation device 52 is provided to irradiate a laser to the sealing materials 114 and 116. A robot (not shown) moves the laser irradiation device 52 along a predetermined trajectory. The sealing materials 114 and 116 are made from thermosetting resin, e.g., common epoxy resin. While tracing the sealing materials 114 and 116, the robot moves the laser irradiation device 52 so that the laser beam irradiated from the laser irradiation device 52 is transmitted to the sealing materials 114 and 116. By doing so, the heated sealing materials 114 and 116 are thermally hardened. Since the sealing materials 114 and 116 are heated by the concentrated laser heating, heating of ambient components can be avoided.

Figure 31:
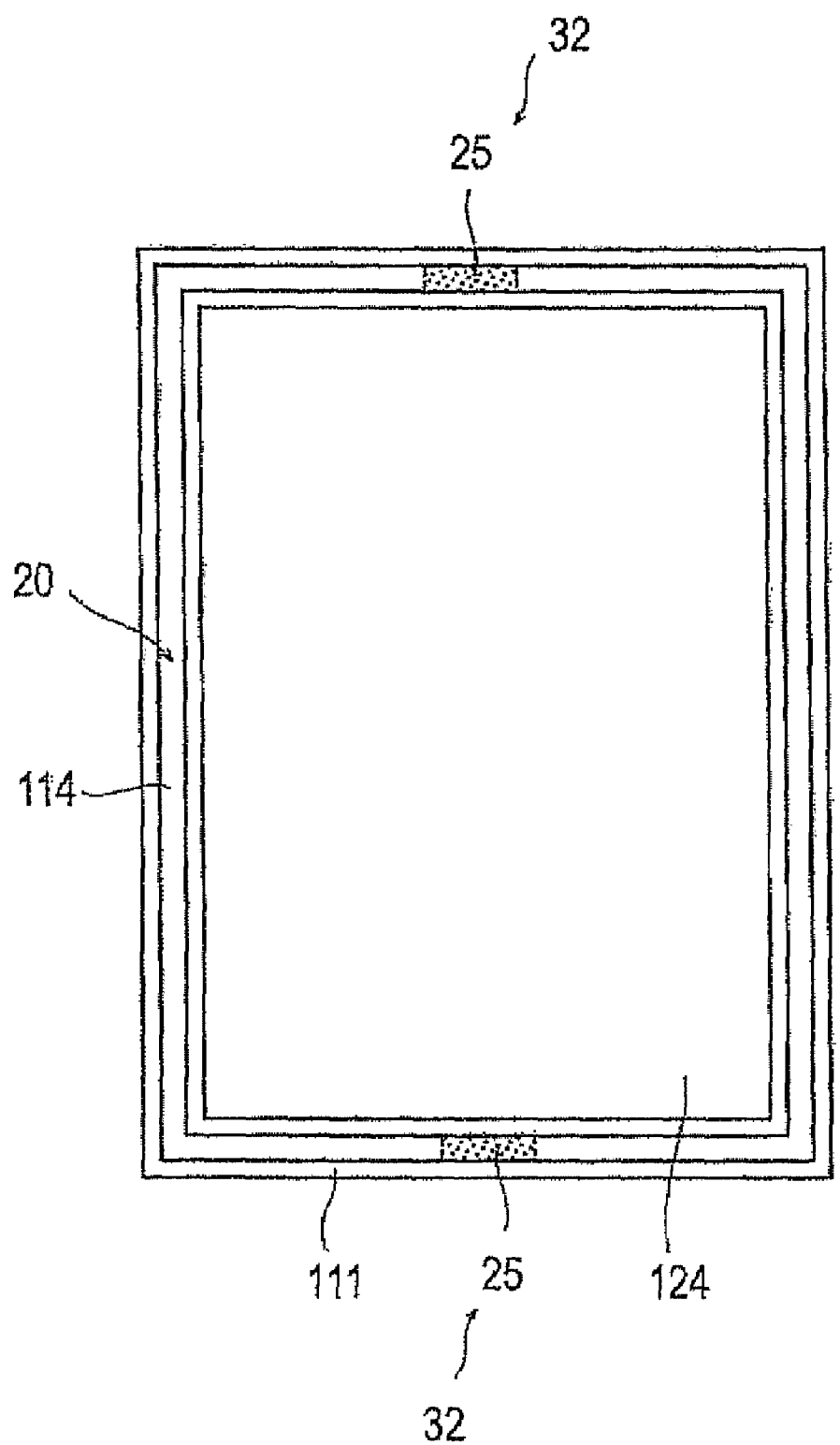
FIG. 31 is a plan view illustrating components of a bipolar battery in accordance with a fourth embodiment, wherein a charging part includes a softened part.

FIG. 31 is a plan view illustrating components of the bipolar battery 10 in accordance with a fourth embodiment, wherein the charging part 20 includes a softened part 25. FIG. 32 is a flow diagram of the bonded body forming process in accordance with the fourth embodiment.

The fourth embodiment is configured such that the softened part 25 constitutes the exhaust part 32, rather than the gap portion 21 of the first and second embodiments and the uncured part 24 of the third embodiment constituting the exhaust part.

Referring to FIG. 31, the sealing materials 114 and 116 of the charging material of the fourth embodiment are thermoplastic. The charging part 20 includes the softened part 25, which permits the inner space 31 to communicate with the outside when stacking the bipolar electrodes 110. The softened part 25 is then hardened after exhausting the residual gas to the outside.

A micro gap exists in the material itself of the softened part 25, or between the softened part 25 and the separator 121. The exhausting operation of the exhaust part 32 is complete when the softened part 25 is hardened. The thermoplastic charging materials 114 and 116 may be made from common silicone based resin, urethane based resin or acryliro-nitrile butadiene styrene resin (ABS resin).

Since remaining gas when stacking the bipolar electrodes 110 can be restrained by the exhausting operation of the exhaust part 32, closely pulling the separator 121 in stacking is unnecessary. Accordingly, a complicated process is eliminated, and the manufacturing process of the bipolar battery 10 can be simplified.

Similar to the third embodiment, the assembly forming process according to the fourth embodiment includes an electrode forming process, an electrolyte arranging process, a sealing material arranging process and a separator arranging process as shown in FIG. 27. In the sealing material arranging process, the sealing materials 114 and 116 are coated without a gap so as to extend continuously around the cathode 113 and the anode 112.

Referring to FIG. 32, the bonded body forming process according to the fourth embodiment includes an assembly setting process, a stacking process, a pressing process, a sealing material partial softening (exhaust part forming) process, an interface forming process, an initial charging process and a sealing layer forming process. The procedures of the assembly setting process and the stacking process are the same as the first embodiment. Also, because the sealing materials 114 and 116 are not provided with the gap portion 21, the gas is not exhausted through the gap portion 21 in the stacking process.

The pressing process includes the air exhausting process. In the pressing process, the battery element 100 is pressed in the stacking direction of the bipolar electrodes 110 by the press plate 173 and the base plate 171 while maintaining a vacuum state. By doing so, the residual gas in the inner space 31 surrounded by the first and second sealing materials 114 and 116 is exhausted through the sealing materials 114 and 116 themselves, which are not hardened, or through the micro gap between the sealing materials 114 and 116, the collector 111 and the electrolyte layer 120.

In the sealing material partial softening process, while pressing the battery element 100 in the stacking direction, the entire sealing materials 114 and 116 are hardened at a hardening temperature. Then, a part of the sealing materials 114 and 116 is heated at a temperature that softens them to form the softened part 25, which performs as the exhaust part 32. By setting the softened part 25 using only a part of the sealing materials, prompt performance of the process of stopping the exhausting operation of the exhaust part 32 and for maintaining a bubble removed state in the following sealing layer forming process is possible.

The sealing material partial softening process includes the air exhausting process. When forming the battery element 100, the residual gas in the inner space 31 surrounded by the first and second sealing materials 114 and 116 is exhausted to the outside through the softened part 25, thereby removing the bubble from the electrode part. The sealing materials 114 and 116 of the softened part 25 are re-hardened at the hardening temperature while pressing the battery element 100 in the stacking direction, thereby forming the first and second sealing layers 115 and 117.

Accordingly, the dead space through which the ion cannot permeate and the electron cannot move is not generated, and the battery resistance is not increased. This achieves a high power density. The procedures of the interface forming process and the initial charging process are the same as the first embodiment.

The bubble exhausting process of the first embodiment, i.e., the process of closely pulling the bubble located at the center portion of the stack 100 after the initial charging by using the roller and moving the bubble to the outer peripheral portion, can be eliminated. The exhausting operation of the exhaust part 32 is stopped by hardening the sealing materials 114 and 116 of the softened part 25.

In the fourth embodiment, after exhausting the gas 30 generated by the initial charging to the outside through the exhaust part 32, the sealing materials 114 and 116 of the softened part 25 are hardened. Accordingly, similar to the third embodiment, the remaining gas generated by the initial charging is better reduced. As a result, the introduction of the gas is further restrained, and a bipolar battery 10 with improved power density is obtained.

In the sealing material partial softening process and the sealing layer forming process, the method of heating the sealing materials 114 and 116 is certainly not limited. For example, the induction heating method shown in FIG. 29 or the laser heating method shown in FIG. 30 can be employed. According to the above heating method, since the sealing materials 114 and 116 can be heated in a concentrated manner, the heating of ambient components is avoided. A method of softening by heating moisture contained in the thermoplastic resin using a microwave can also be employed.

Figure 33:
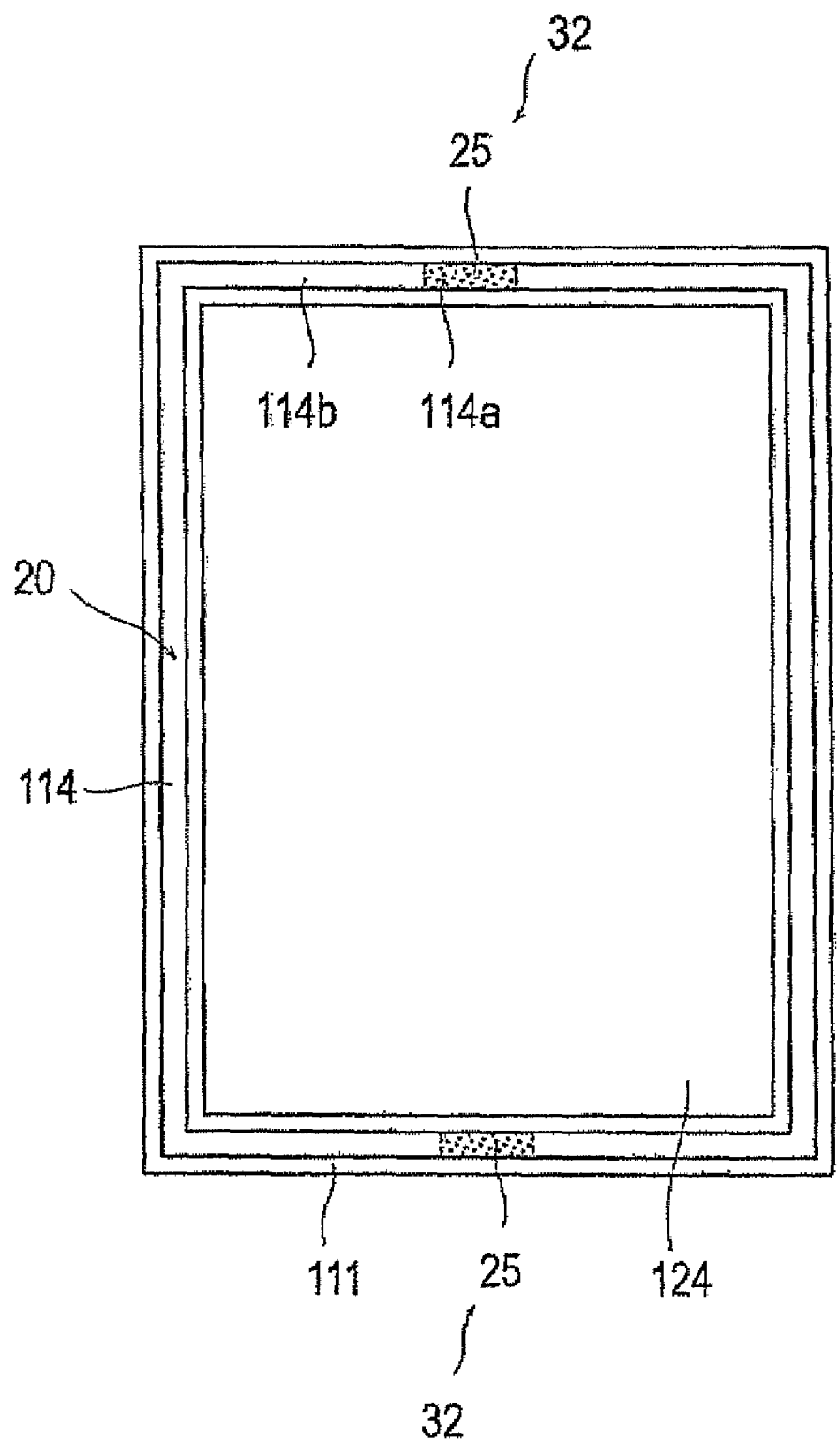
FIG. 33 is a plan view illustrating components of a bipolar battery in accordance with a modified example of the fourth embodiment.

FIG. 33 is a plan view illustrating components of the bipolar battery 10 in accordance with a modified example of the fourth embodiment.

In the fourth embodiment, the entire sealing materials 114 and 116 are formed by the thermoplastic resin or the thermoplastic adhesive. Further, the exhaust part 32 is configured as the softened part 25, which is formed by partially heating the sealing materials 114 and 116. However, the embodiment is not limited thereto. As shown in FIG. 33, a thermoplastic resin 114a is coated onto only a portion to form the exhaust part 32, and a thermosetting resin 114b is coated onto the remaining portion. The exhaust part 32 may be configured as the softened part 25, which is formed by heating only a portion coated with the thermoplastic resin 114a.

Figure 34A:
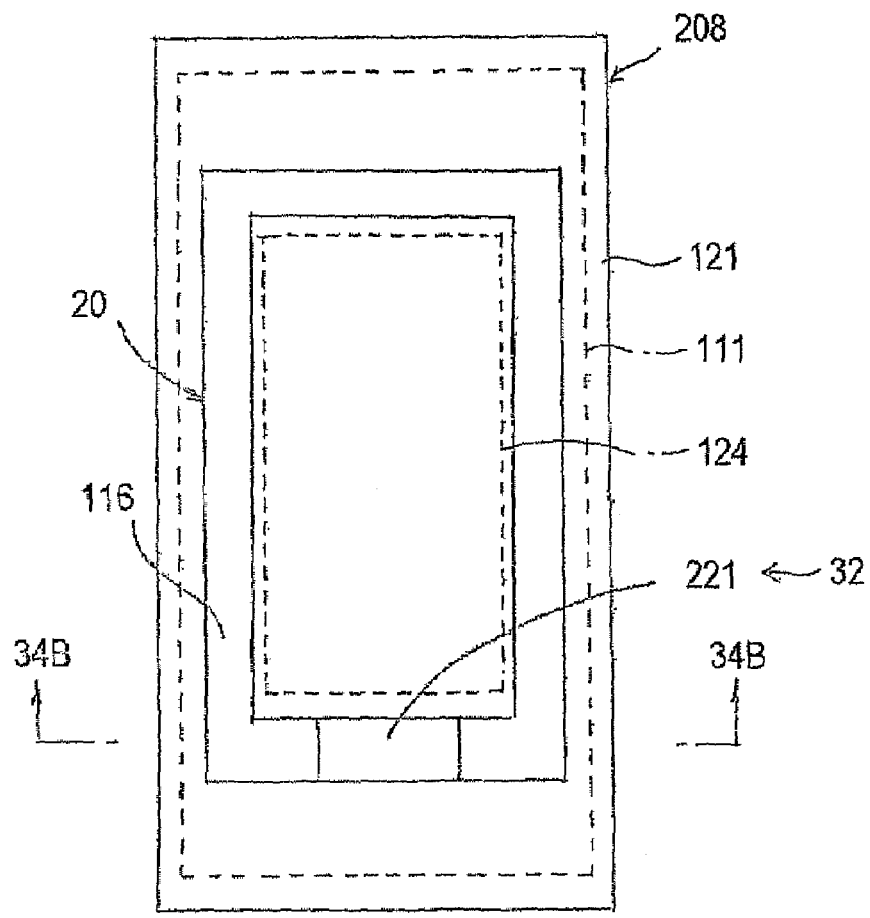
FIG. 34A is a plan view illustrating components of a bipolar battery in accordance with a fifth embodiment, wherein a charging part includes a gap portion.
Figure 34B:
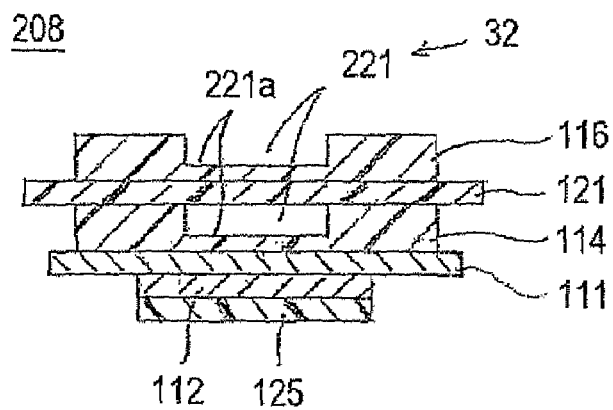
FIG. 34B is a sectional view taken along line 34B-34B in FIG. 34A.

A fifth embodiment is depicted in FIGS. 34A and 34B, with further reference to FIGS. 35 to 41. Similar to the first embodiment, the first embodiment is configured such that the charging part 20 includes a gap portion 221 constituting the exhaust part 32. The fifth embodiment is different from the first embodiment in terms of a shape of the gap portion 221, as seen in FIG. 34, and a structure of the assembly 208 shown in FIGS. 34 and 41.

The gap portion 221 has a shape such that the gap portion 221 permits the inner space 31 to communicate with the outside when stacking the bipolar electrodes 110 and is blocked by pressing the charging part 20 in the stacking direction of the bipolar electrodes 110. In the first embodiment, the first and second sealing materials 114, 116 are cut in a manner so that the gap portion 21 is formed between the coated ends. In contrast, the fifth embodiment is configured such that the gap portions 221 are formed at the first and second sealing materials 114 and 116 without being cut in the above manner. Referring to FIGS. 34A and 34B, each of the first and second sealing materials 114 and 116 is formed with a low height portion 221a, which is lower in height in a thickness direction than the other portions. The gap portion 221 is configured as the low height portion 221a.

Similar to the first embodiment, in the pressing process the gap portion 221 is blocked by pressing the charging part 20 in the direction of stacking the bipolar electrodes 111, thereby stopping the exhausting operation of the exhaust part 32.

Figure 35:
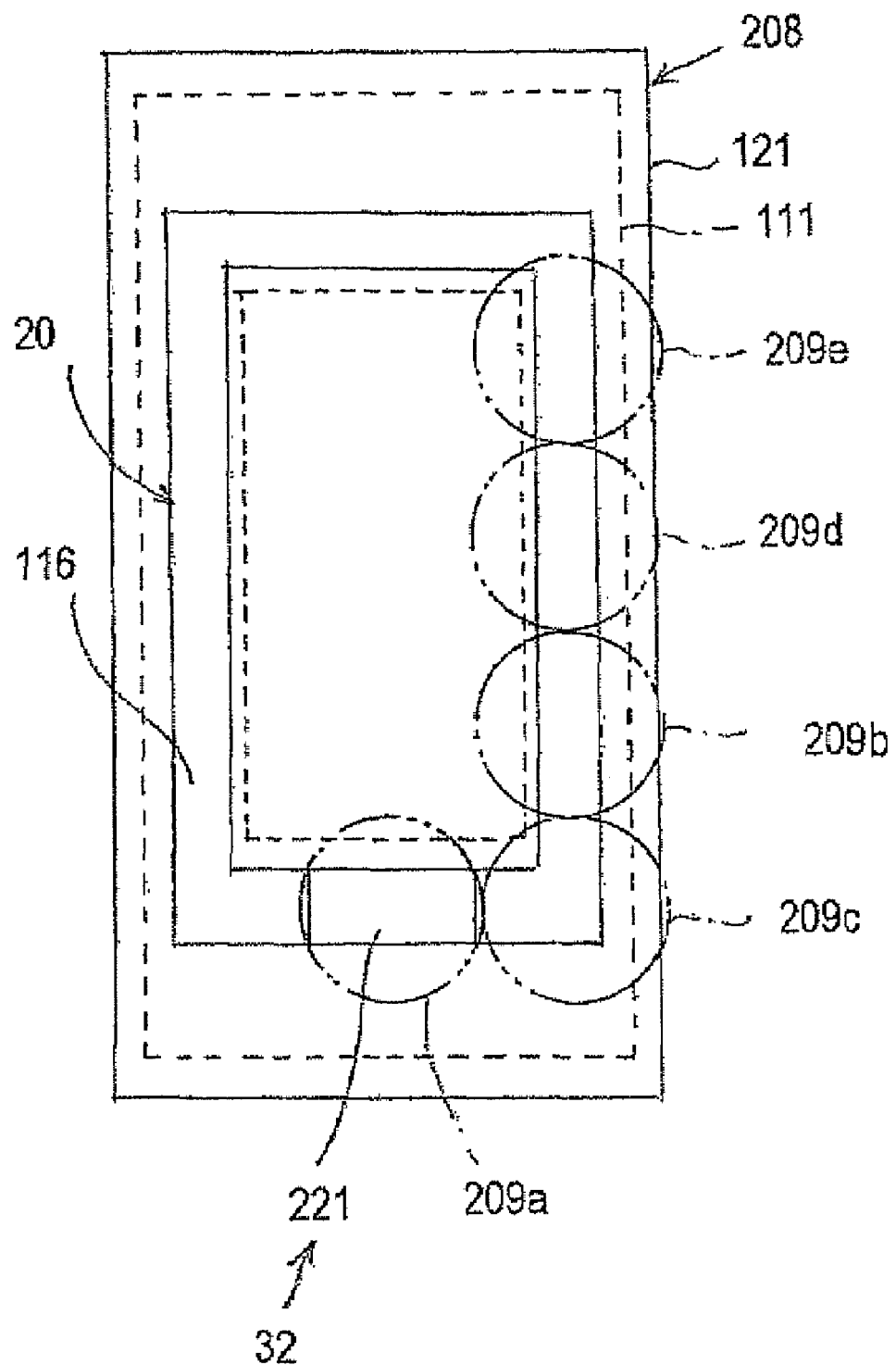
FIG. 35 is a view conceptually illustrating a position of an exhaust part.

Referring to FIG. 35, in the fifth embodiment the positions of the assemblies 208 are misaligned so as to form the gap portions 221. Accordingly, when stacking the plural assemblies 208, the gap portions 221 comprising the exhaust parts 32 are arranged such that the positions are misaligned when seen from the stacking direction of the bipolar electrodes 110. In FIG. 35, the position of the exhaust part 32 in the uppermost assembly 208 is shown by a region 209a, the position of the exhaust part 32 in the assembly 208 underneath the uppermost assembly 208 is shown by a region 209b, and the positions of the exhaust parts 32 in the following underlying assemblies 208 are shown in sequence by regions 209c, 209d and 209e, FIG. 35 illustrates conceptually only the positions of the exhaust parts 32 when stacking five assemblies 208 for convenience of understanding. In a practical implementation of a bipolar battery, generally more assemblies 208 are stacked.

When seen from the stacking direction of the bipolar electrodes 110, the exhaust parts 32 are arranged so as to be evenly distributed in a rectangular frame shape rather than concentrated in one position. Accordingly, when pressing the stacked assemblies 208 in the stacking direction, the respective charging parts 20 are pressed more uniformly, and the gap portion 221 in each assembly 208 is securely blocked. The exhausting operation of the exhaust part 32 is stopped more securely. In addition, the thickness of the battery element 100 as the assembly unit is uniform.

In one assembly 208 shown in FIG. 34B, the gap portion 221 formed at the first sealing material 114 and the gap portion 221 formed at the second sealing material 116 are disposed at the same position when seen from the stacking direction of the bipolar electrodes 110. However, in one assembly 208, the gap portion 221 of the first sealing material 114 and the gap portion 221 of the second sealing material 116 may be formed such that the positions are misaligned.

Similar to the first embodiment, the method of manufacturing the bipolar battery 10 according to the fifth embodiment includes an assembly forming process, a bonded body forming process and a casing process previously described in FIG. 10.

Referring to FIG. 36, the assembly forming process according to the fifth embodiment includes an electrode forming process, an electrolyte arranging process, a first sealing material arranging (exhaust part forming) process, a separator arranging process and a second sealing material arranging (exhaust part forming) process.

The fifth embodiment uses the collector 111, which has been cut in a rectangular shape in advance. This is different from the first embodiment which uses the long collector 111, is, the procedure of the electrode forming process is the same as the first embodiment, except that the rectangle shaped collector 111 shown in FIG. 37 is used.

In the electrolyte arranging process, in order to coat the electrolytes 124 and 125, the collector 111 formed with the cathode 113 and the anode 112 on both surfaces is installed on a loading board such that the anode-formed surface becomes an upper surface on which the electrolyte 125 is coated. Thereafter, a protective film is adhered on to the coated electrolyte 125, and the bipolar electrode 110 is inverted. By providing the protective film, even if the bipolar electrode 110 is inverted, the collector can be installed on the loading board such that the surface coated with the electrolyte becomes a lower surface. The protective film is made from resin such as polyethylene. Then, the electrolyte 124 is coated onto the cathode 113, which becomes the upper surface after inversion. The material of the electrolytes 124 and 125 is the same as the first embodiment.

Figure 38:
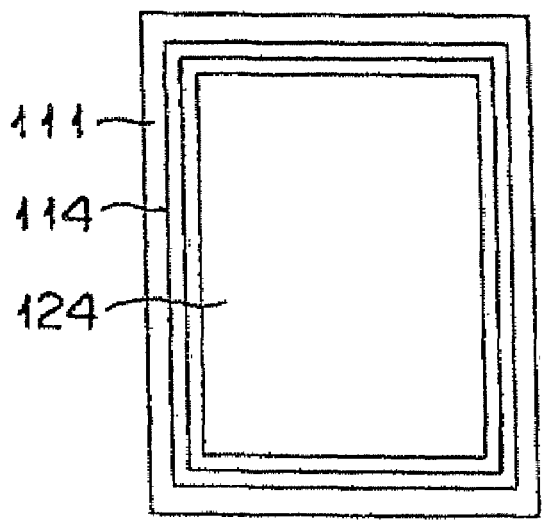
FIG. 38 is a plan view explaining a first sealing material arranging (exhaust part forming) process shown in FIG. 36.
Figure 39:
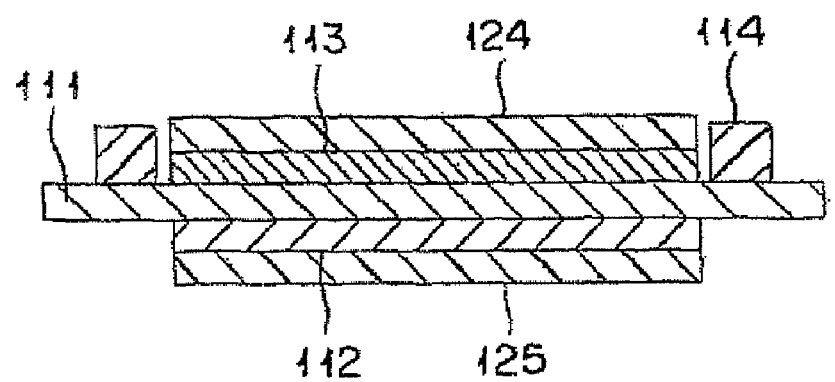
FIG. 39 is a sectional view explaining the first sealing material arranging (exhaust part forming) process shown in FIG. 36.

In the first sealing material arranging process, the first sealing material 114 as the charging material extends around the outer periphery of the cathode-side surface of the collector 111, i.e., the exposed portion of the collector 111, and extends around the cathode 113 (shown in FIGS. 38 and 39). For the arrangement of the first sealing material 114, a coating method using a dispenser is applied, for example. By decreasing the coating amount of the first sealing material, the first sealing material 114 is formed as the gap portion 221 with the low height portion 221a lower in height than the other portions similarly to that shown in FIG. 34B.

Figure 40:
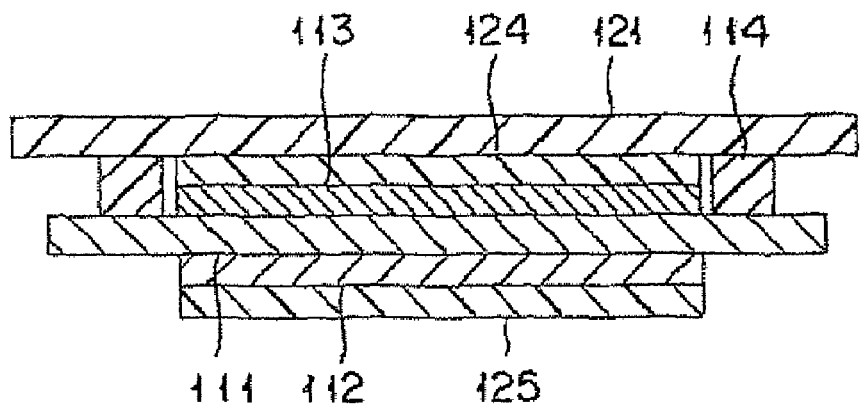
FIG. 40 is a sectional view explaining a separator arranging process shown in FIG. 36.

In the separator arranging process, the separator 121 is arranged to cover the entire cathode-side surface of the collector 111 as shown in FIG. 40. The separator 121 is overlapped with the electrolyte 124 and the first sealing material 114. The separator 121 is made from porous PE.

Figure 41:
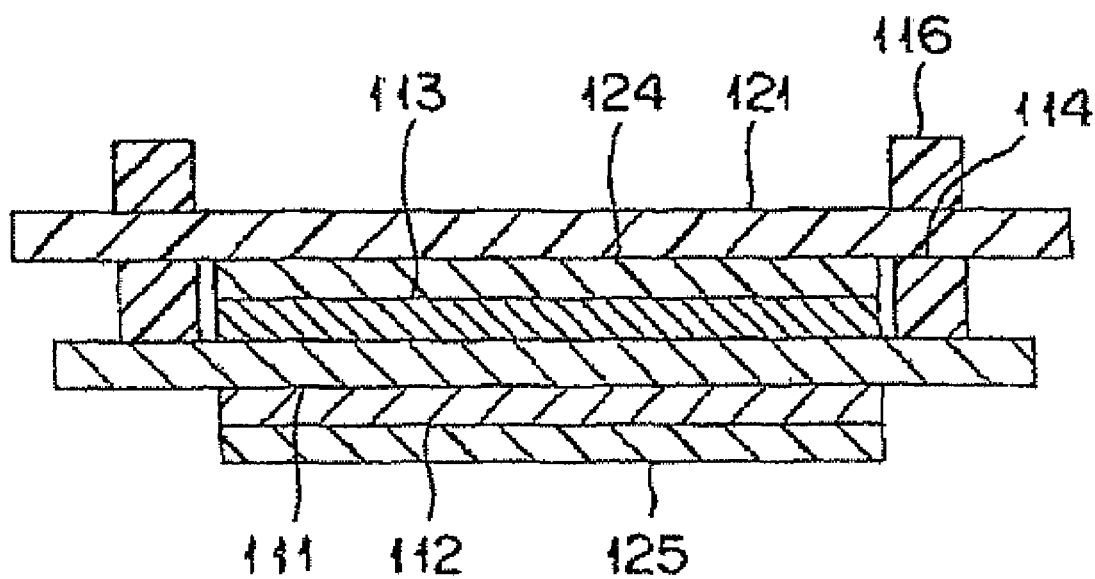
FIG. 41 is a sectional view explaining a second sealing material arranging (exhaust part forming) process shown in FIG. 36.

In the second sealing material arranging process, the second sealing material 116 is arranged on a side of the separator 121 opposite to the side contacted with the first sealing material 114 as shown in FIG. 41. At this time, the position of the second sealing material 116 is provided so as to oppose the position of the first sealing material 114. For the arrangement of the second sealing material 116, a coating method using a dispenser is applied, for example. By decreasing the coating amount of the second sealing material, the second sealing material 116 is formed with the low height portion 221a that is lower in height in the thickness direction than the other portions. The low height portion comprises the gap portion 221 such as shown in FIG. 34B.

As a result, the assembly 208 is formed wherein the electrolyte 125 is disposed on one side of the bipolar electrode 110, while the electrolyte 124, the first and second sealing materials 114 and 116 and the separator 121 are disposed on the other side of the bipolar electrode 110.

When forming the other assemblies 208, the gap portions 221 are formed such that the positions are misaligned, as in FIG. 35. During arrangement of the first and second sealing materials 114 and 116, the misalignment of the gap portions 221 is controlled by timing decreases in the coating quantity.

Similar to the first embodiment, the bonded body forming process according to the fifth embodiment includes an assembly setting process, a stacking process, a pressing process, a sealing layer forming process, an interface forming process, an initial charging process and a bubble exhausting process as shown in FIG. 19. The assembly setting process of the fifth embodiment is slightly different from that of the first embodiment, while the other processes of the fifth embodiment are the same as those of the first embodiment. Thus, only the assembly setting process is explained hereinafter.

Figure 42:
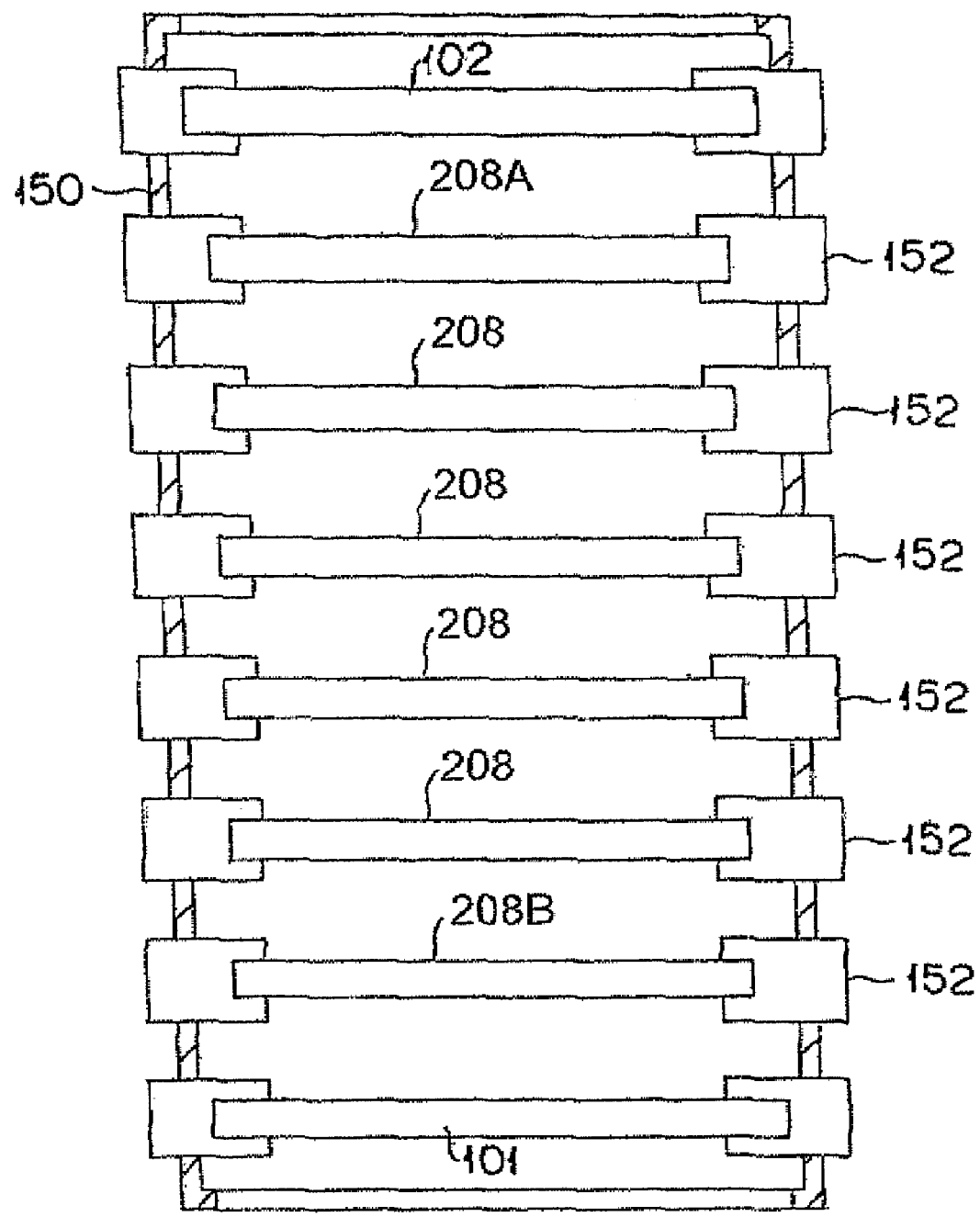
FIG. 42 is a sectional view explaining an assembly setting process in accordance with the fifth embodiment.

FIG. 42 is a sectional view explaining the assembly setting process in accordance with the fifth embodiment. In this process, a plurality of assemblies 208 are sequentially set in a magazine 150. At this time, the protective film is removed from the assembly 208. The uppermost assembly 208A is configured such that only the first sealing material 114 is mounted on the bipolar electrode 110. The lowermost assembly 208B is configured such that the sealing material is also mounted on the anode 112 side of the assembly 208. A terminal plate 102 is disposed above the assembly 208A, and a terminal plate 101 is disposed below the assembly 208B. The construction of the magazine 150 or the clamp mechanism 152 is the same as the first embodiment.

The misalignment of the exhaust parts 32 when seen from the stacking direction of the bipolar electrodes 110 is not restricted to this configuration. Such a construction can be identically applied to the uncured part 24 comprising the exhaust part 32 of the third embodiment and the softened part 25 comprising the exhaust part 32 of the fourth embodiment. By arranging the exhaust parts 32 such that the positions are misaligned, the respective charging parts 20 can be pressed more uniformly. Accordingly, the thickness of the battery element 100 is uniform.

The sixth embodiment is different from the first to fifth embodiment in that the exhaust part 32 is configured as a hot-melt adhesive part 301. The sixth embodiment is described with reference to FIGS. 43A to 50B.

Figure 43A:
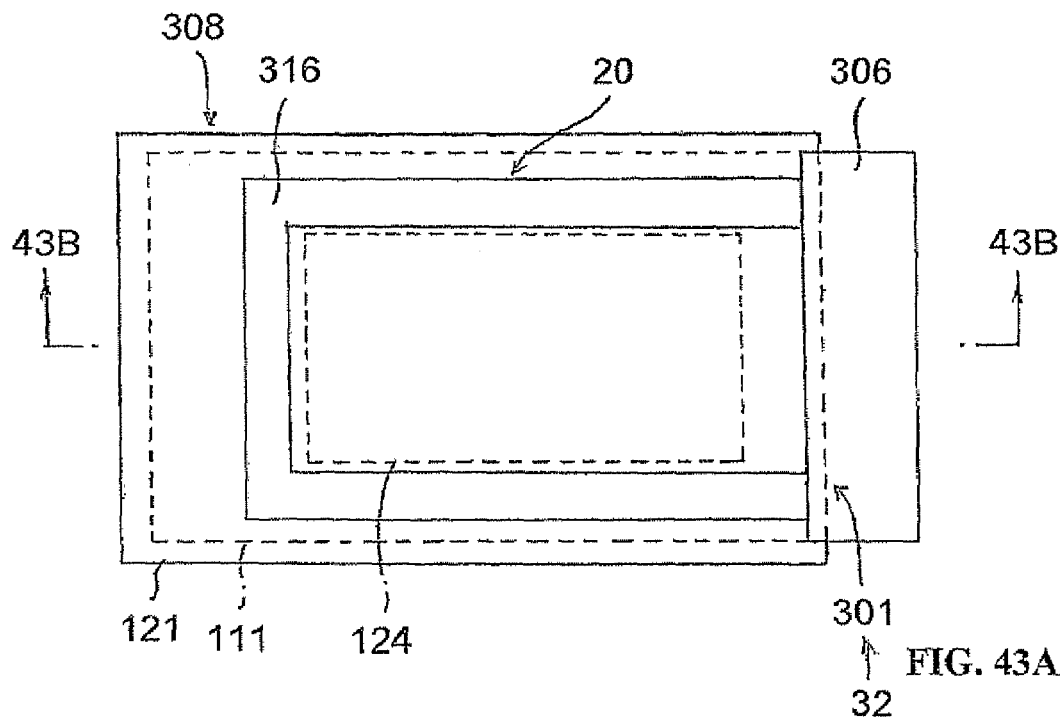
FIG. 43A is a plan view illustrating components of a bipolar battery in accordance with a sixth embodiment, wherein a charging part includes a hot-melt adhesive part.
Figure 43B:
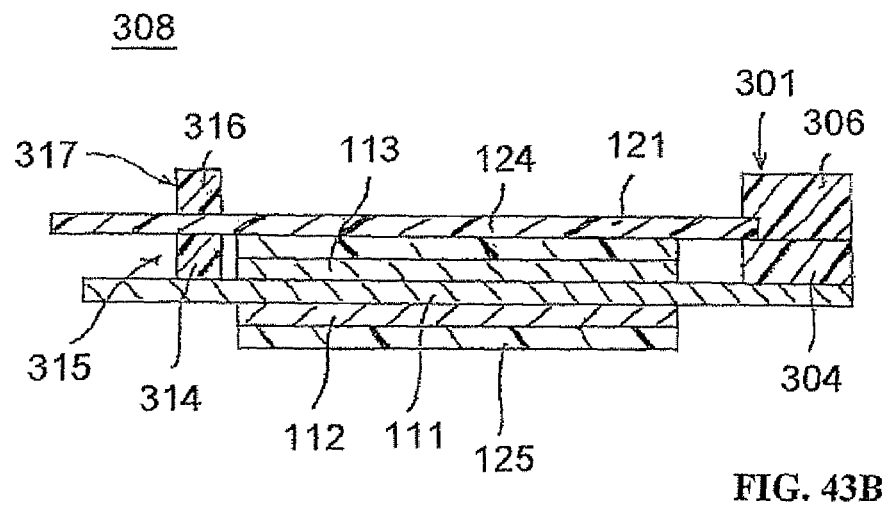
FIG. 43B is a sectional view taken along line 43B-43B in FIG. 43A.

Referring to FIGS. 43A and 43B, the charging material of the sixth embodiment has a hot-melt adhesive function wherein the charging material is not adhesive until it is treated. The hot-melt adhesive part 301 of the charging part 20 permits the inner space 31 to communicate with the outside when stacking the bipolar electrodes 110 and is then hardened after exhausting is complete. A micro gap exists in the material itself of the hot-melt adhesive part 301, or between the hot-melt adhesive part 301 and the separator 121. The exhaust part 32 of the sixth embodiment is constituted by the hot-melt adhesive part 301. The exhausting operation of the exhaust part 32 is stopped when the hot-melt adhesive part 301 is hardened.

As the charging material having the hot-melt adhesive function, a common hot-melt adhesive may be used. The hot-melt adhesive is a solid adhesive, e.g., a polyester class, a modified olefin class, etc., which mainly contains thermoplastic resin and does not include an organic solvent. The hot-melt adhesive is coated by being heated to be molten and is solidified by being cooled, thereby completing the adhesive treatment between the components. The hot-melt adhesive does not have adhesiveness before the adhesive treatment. A softening temperature of the hot-melt adhesive (e.g., a room temperature setting hot-melt adhesive) is 150° C. In the sixth embodiment, a portion of the charging part 20 is configured as the hot-melt adhesive part 301. Hot-melt adhesives 304 and 306 are coated onto only the portions forming the hot-melt adhesive part 301, while the other coating substances 314 and 316 are coated onto the other portions. As the other coating substances, for example, a sealing material formed by thermoplastic resin or a thermoplastic adhesive may be used. As the thermoplastic substance, a common silicone based resin, a urethane based resin or an acryliro-nitrile butadiene styrene resin (ABS resin) may be used.

The collector 111 is coated with the hot-melt adhesive 304 in advance before forming the cathode 113 and the anode 112. The hot-melt adhesive 304 is coated on a right edge of the collector 111 in FIG. 43B. To surround the periphery of the cathode 113 with the hot-melt adhesive 304, the sealing material 314 is coated onto upper, left and lower portions of the cathode 113 in FIG. 43A. To surround the periphery of the anode 112 with the hot-melt adhesive 306, the sealing material 316 is coated onto upper, left and lower portions of the anode 112 in FIG. 43A. A right edge of the separator 121 in the drawing is overlapped on the hot-melt adhesive 304. Because the hot-melt adhesives 304 and 306 do not have adhesiveness before the adhesive treatment, a micro gap exists between the hot-melt adhesive and the separator 121 overlapped on the hot-melt adhesive.

After being coated, the hot-melt adhesives 304 and 306 are hardened at room temperature. Then, the bipolar electrode 110 and the electrolyte layer 120 are stacked. In the pressing process performed after stacking, the hot-melt adhesives 304 and 306 are heated to be molten and bond the components, that is, the collector 111 and the separator 121, or the collectors 111 to each other. A film type hot-melt member, wherein a hot-melt adhesive is coated on a base part, may be used. However, this embodiment employs the method of directly coating the hot-melt adhesives 304 and 306. Because the film-type hot-melt member has a relatively large thickness, the direct coating of the hot-melt adhesives 304 and 306 decreases a thickness of the assembly 308 as the sub-assembly unit. As a result, a thickness of the battery element 100 is decreased.

In the description of the sixth embodiment, for convenience of explanation, the hot-melt adhesive 304 and the sealing material 314, which extend to surround the periphery of the cathode 113, are respectively referred to as a first hot-melt adhesive 304 and a first sealing material 314. The hot-melt adhesive 306 and the sealing material 316, which extend to surround the periphery of the anode 112, are respectively referred to as a second hot-melt adhesive 306 and a second sealing material 316. Also, the sealing layer formed by the first hot-melt adhesive 304 and the first sealing material 314 is referred to as a first sealing layer 315, and the sealing layer formed by the second hot-melt adhesive 306 and the second sealing material 316 is referred to as a second sealing layer 317.

Although the gas is introduced when alternately stacking the bipolar electrodes 110 and the electrolyte layers 120, the residual gas in the inner space 31 is exhausted to the outside through the micro gap existing in the hot-melt adhesive part 301 (that is, the exhaust part 32 in this embodiment). When the hot-melt adhesive part 301 is hardened, the exhausting operation of the exhaust part 32 is complete. A complicated bubble removing process, such as closely pulling the separator 121 in stacking, is unnecessary and the manufacturing process of the bipolar battery 10 is simplified.

Figure 44:
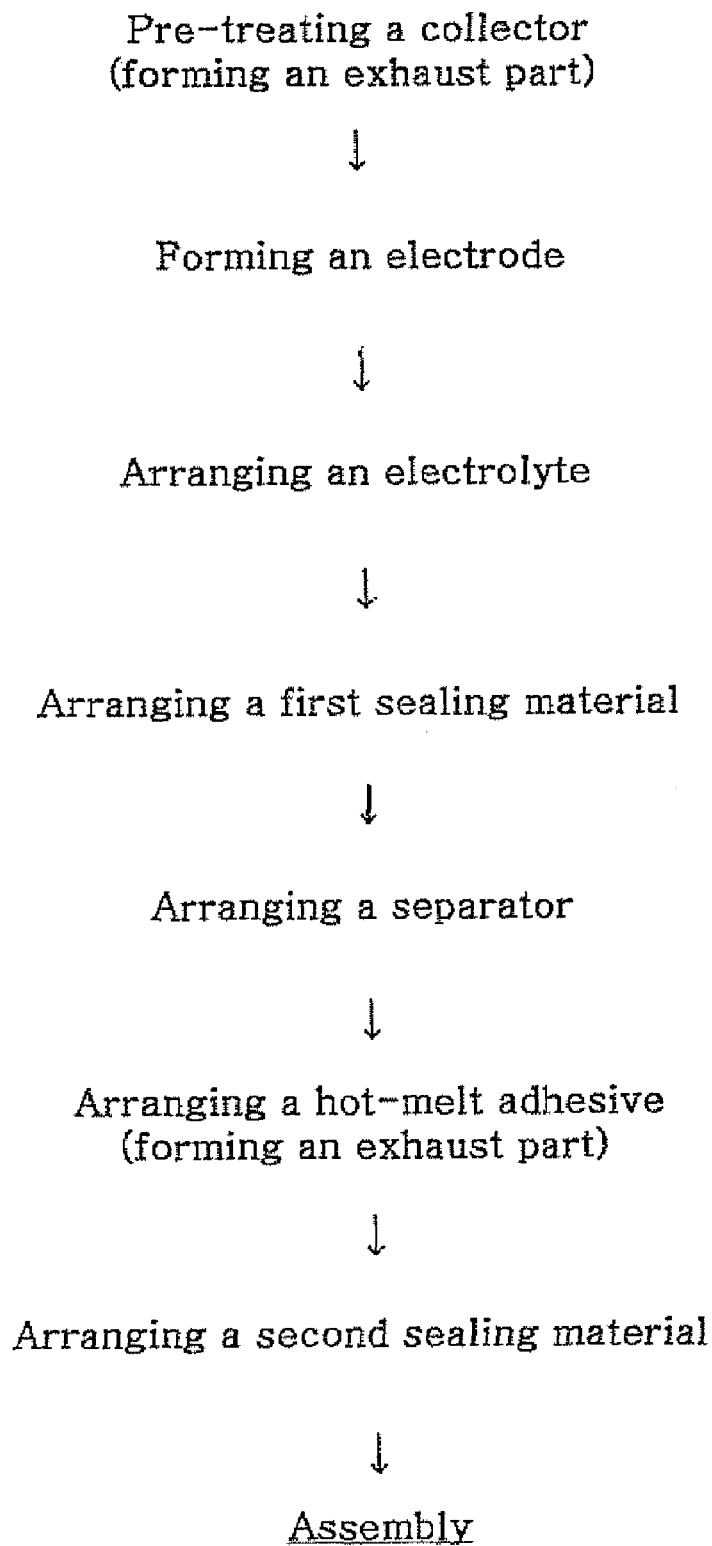
FIG. 44 is a flow diagram of an assembly forming process in accordance with the sixth embodiment.
Figure 45A:
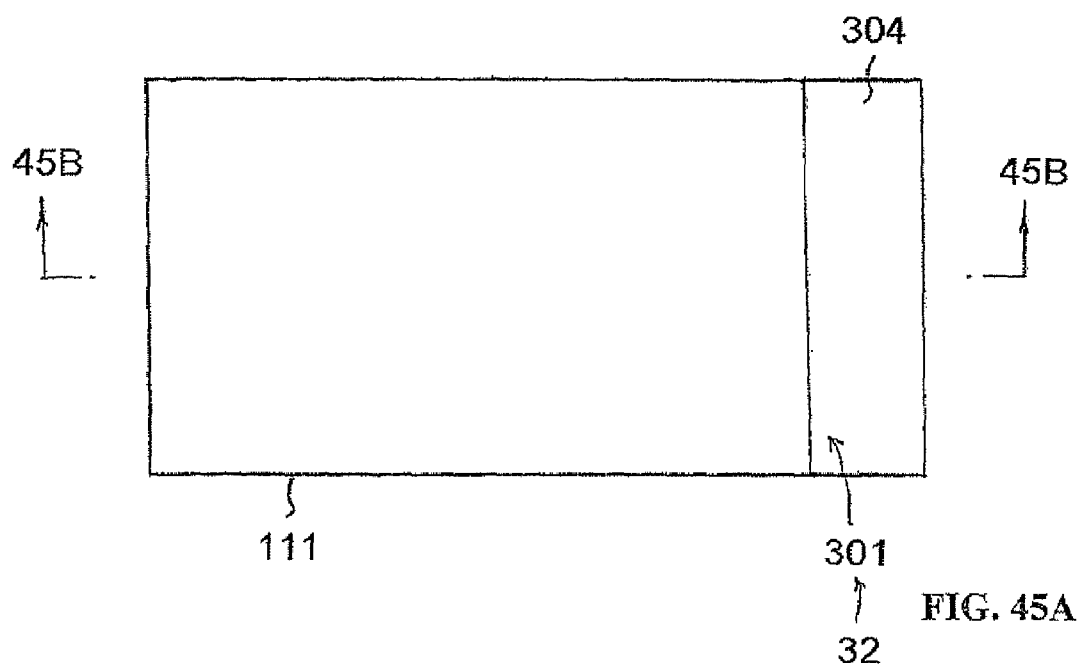
FIG. 45A is a plan view explaining a collector pre-treating (exhaust part forming) process shown in FIG. 44.
Figure 45B:
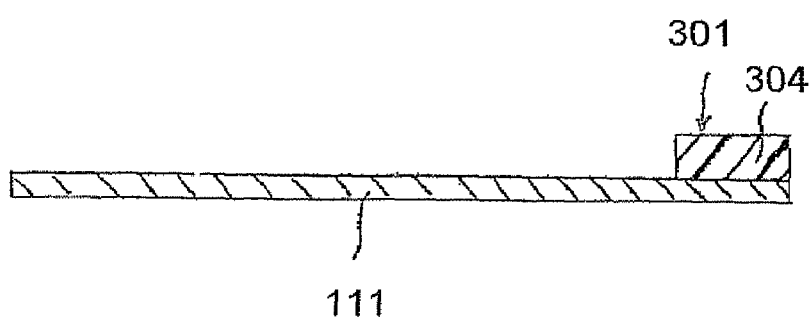
FIG. 45B is a sectional view taken along line 45B-45B in FIG. 45A.

Similar to the fifth embodiment, the method of manufacturing the bipolar battery 10 according to the sixth embodiment includes an assembly forming process, a bonded body forming process and a casing process. Referring to FIG. 44, the assembly forming process according to the sixth embodiment includes a collector pre-treating (exhaust part forming) process, an electrode forming process, an electrolyte arranging process, a first sealing material arranging process, a separator arranging process, a hot-melt adhesive arranging (exhaust part forming) process and a second sealing material arranging process.

In the collector pre-treating process, the exhaust part 32 configured as the hot-melt adhesive part 301 is formed. The first hot-melt adhesive 304 is coated onto a right edge of the collector 111 in FIG. 45B. Similar to the fifth embodiment, the sixth embodiment uses the collector 111 precut in a rectangular shape. The other procedures are the same as the first embodiment. For the arrangement of the first hot-melt adhesive 304, a coating method using a dispenser is applied, for example.

Figure 46A:
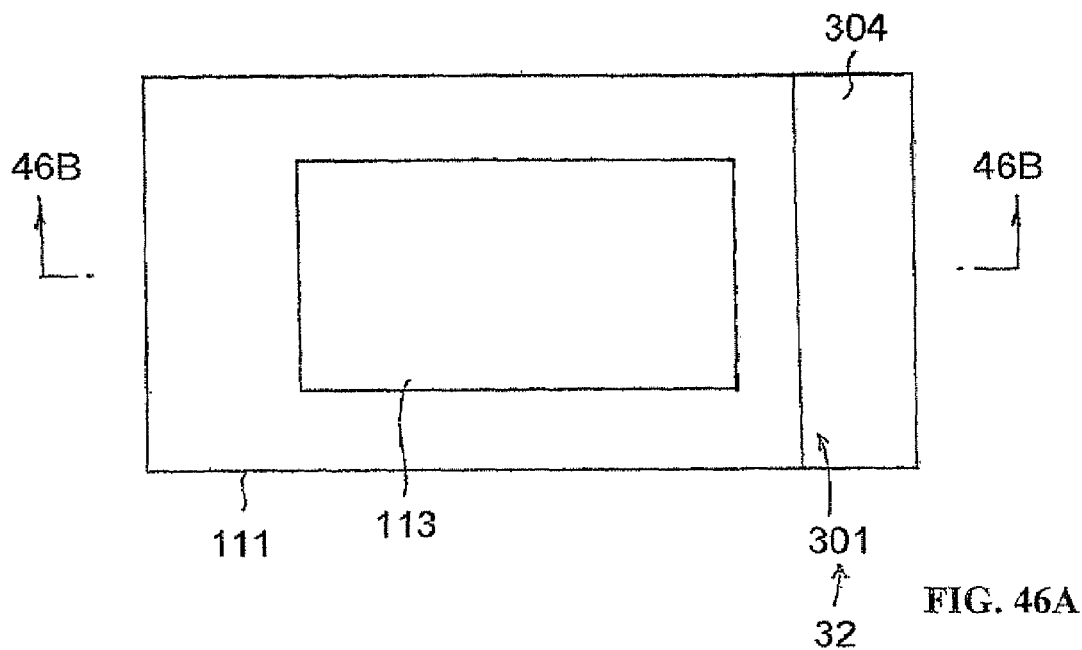
FIG. 46A is a plan view explaining an electrode forming process shown in FIG. 44.
Figure 46B:
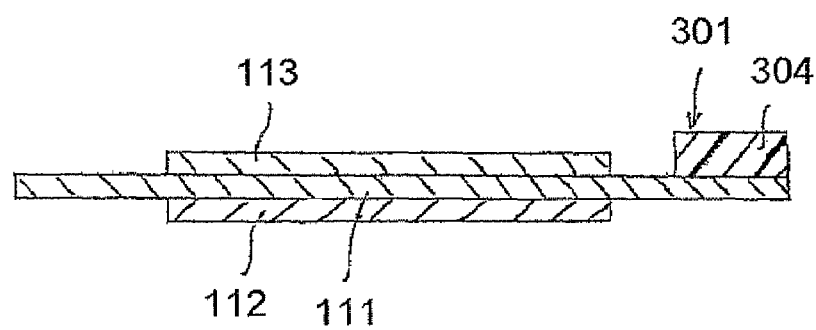
FIG. 46B is a sectional view taken along line 46B-46B in FIG. 46A.
Figure 47A:
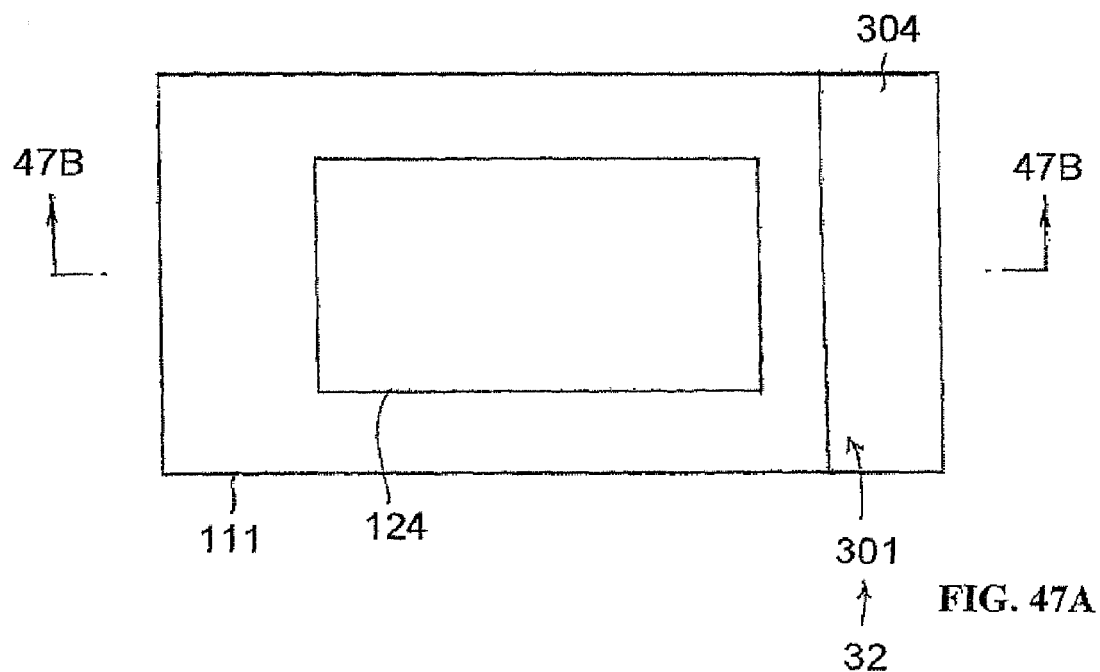
FIG. 47A is a plan view explaining an electrolyte arranging process shown in FIG. 44.
Figure 47B:
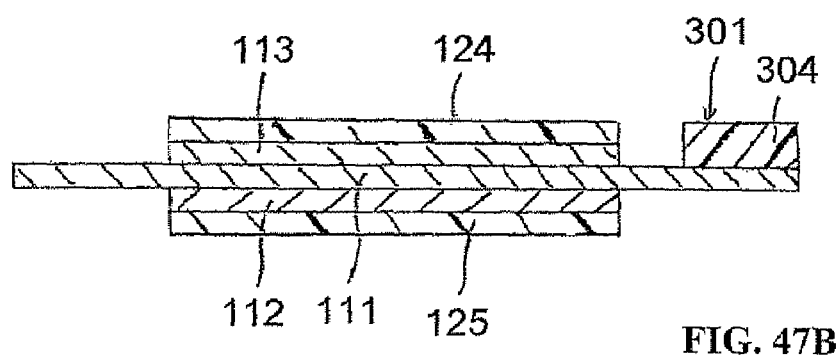
FIG. 47B is a sectional view taken along line 47B-47B in FIG. 47A.

As shown in FIG. 46, the electrode forming process is the same as the fifth embodiment except that the first hot-melt adhesive 304 has been coated on the collector 111 in advance. Also, as shown in FIG. 47, the electrolyte arranging process is the same as the fifth embodiment, except that the first hot-melt adhesive 304 has been coated on the collector 111 in advance.

In the first sealing material arranging process, the first sealing material 314 is arranged so as to extend around the outer periphery of the cathode-side surface of the collector 111 (i.e., the exposed portion of the collector 111) and to extend around the cathode 113 as shown in FIG. 48. For the arrangement of the first sealing material 314, a coating method using a dispenser is applied, for example. To surround the periphery of the cathode 113 with the first hot-melt adhesive 304, the first sealing material 314 is coated onto the upper, left and lower portions of the cathode 113 in FIG. 48A.

Figure 49A:
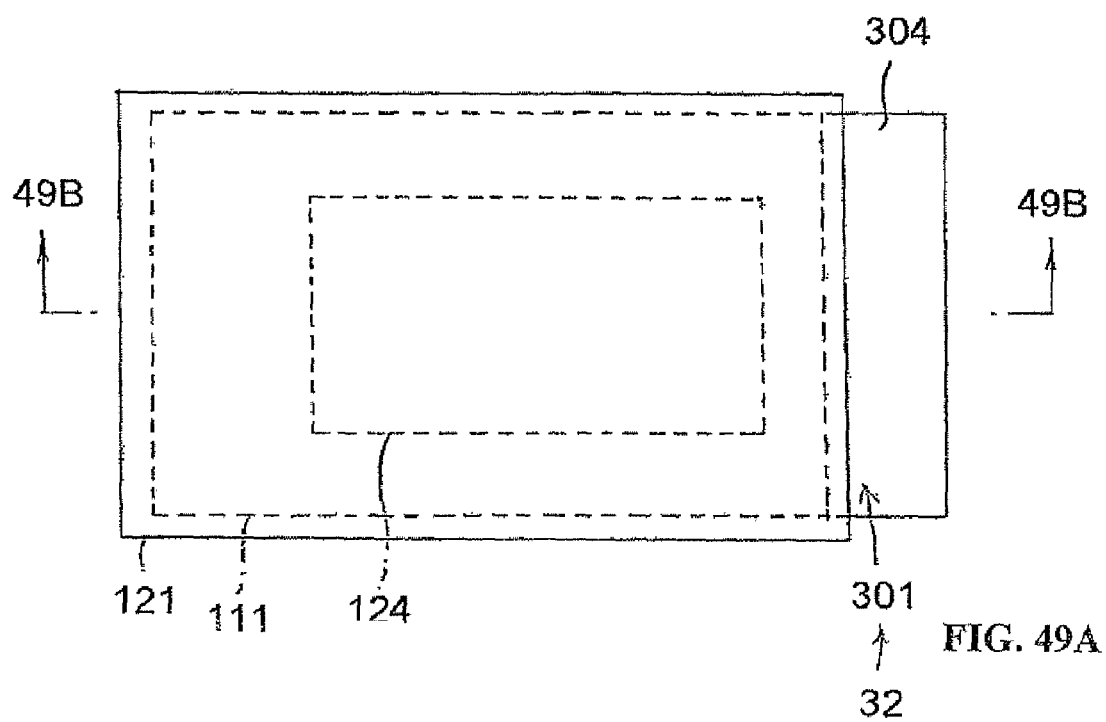
FIG. 49A is a plan view explaining a separator arranging process shown in FIG. 44.
Figure 49B:
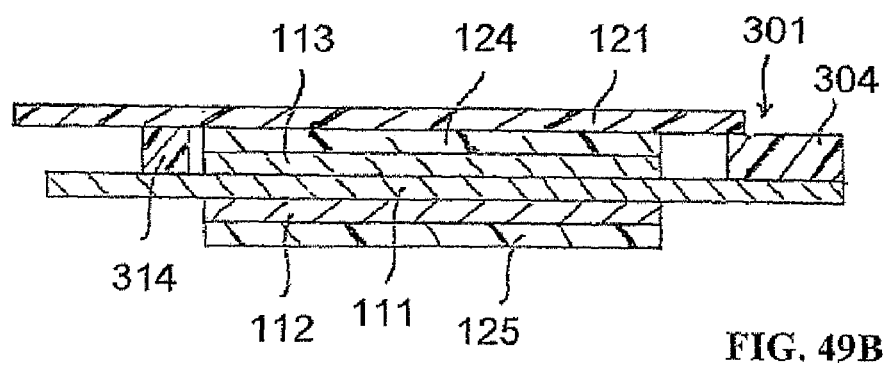
FIG. 49B is a sectional view taken along line 49B-49B in FIG. 49A.

In the separator arranging process, the separator 121 is arranged to cover the cathode-side surface of the collector 111 as shown in FIG. 49. A right edge of the separator 121 in the drawing is overlapped on the first hot-melt adhesive 304. To this end, the separator 121 is overlapped with the electrolyte 124, the first hot-melt adhesive 304 and the first sealing material 314. The separator 121 is made from porous PE.

Figure 50A:
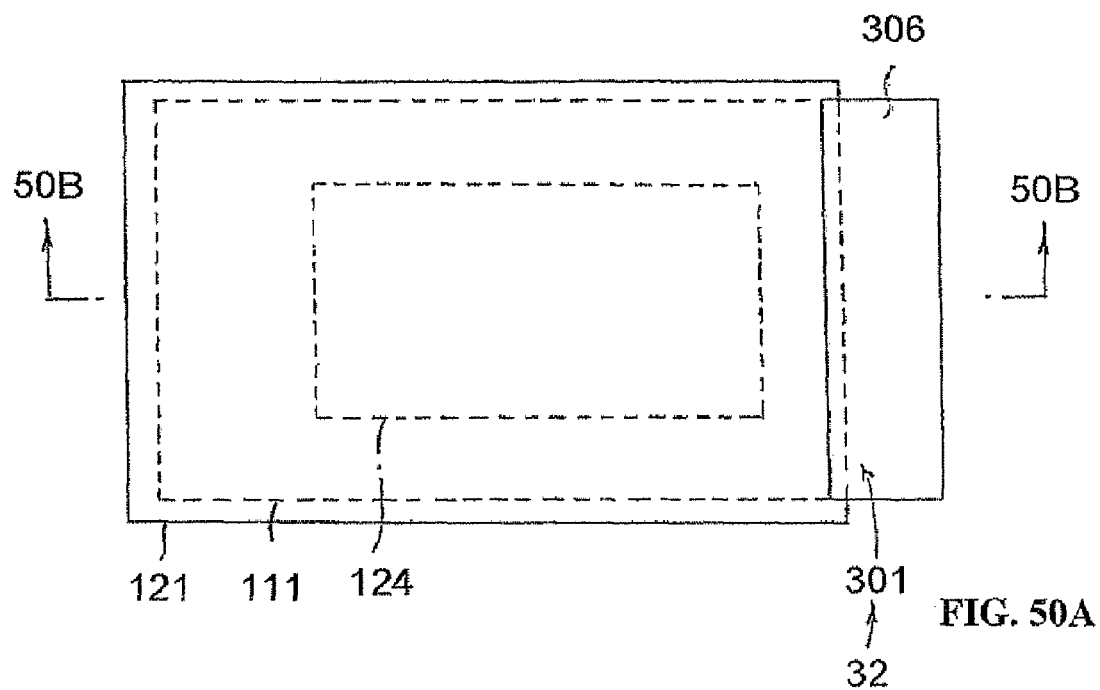
FIG. 50A is a plan view explaining a hot-melt adhesive arranging (exhaust part forming) process shown in FIG. 44.
Figure 50B:
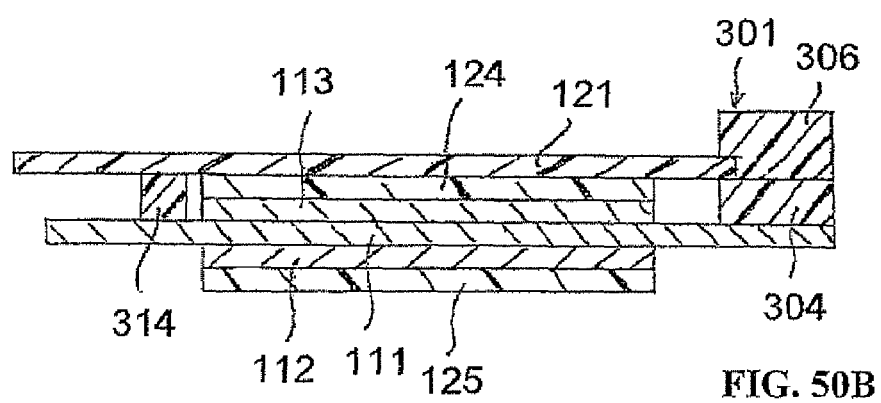
FIG. 50B is a sectional view taken along line 5013-50B in FIG. 50A.

In the hot-melt adhesive arranging process, the second hot-melt adhesive 306 is arranged on a side of the separator 121 opposite to the side contacted with the first sealing material 314 as shown in FIG. 50. At this time, the position of the second hot-melt adhesive 306 is applied so as to oppose and be overlapped with the arrangement of the position of the first hot-melt adhesive 304 on the collector 111. For the arrangement of the second hot-melt adhesive 306, a coating method using a dispenser is applied, for example. By the coating of the second hot-melt adhesive 306, the exhaust part 32 configured as the hot-melt adhesive part 301 is formed.

In the second sealing material arranging process, the second sealing material 316 is arranged on a side of the separator 121, opposite to the side contacted with the first sealing material 314, as shown in FIG. 43. At this time, the position of the second sealing material 316 is applied so as to oppose (and to be overlapped with) the position of the first sealing material 314. For the arrangement of the second sealing material 316, a coating method using a dispenser is applied, for example.

As a result, the assembly 308 is formed from the electrolyte 125 disposed on one side of the bipolar electrode 110. Further, the electrolyte 124, the first and second sealing materials 314 and 316, the first and second hot-melt adhesives 304 and 306 and the separator 121 are disposed on the other side of the bipolar electrode 110.

Similar to the first embodiment, the bonded body forming process according to the sixth embodiment includes an assembly setting process, a stacking process, a pressing process, a sealing layer forming process, an interface forming process, an initial charging process and a bubble exhausting process, previously shown in FIG. 19. The pressing process and the sealing layer forming process of the sixth embodiment are slightly different from those of the first embodiment, while the other processes of the sixth embodiment are the same as those of the first embodiment. Thus, only the pressing process and the sealing layer forming process are explained below.

Figure 51:
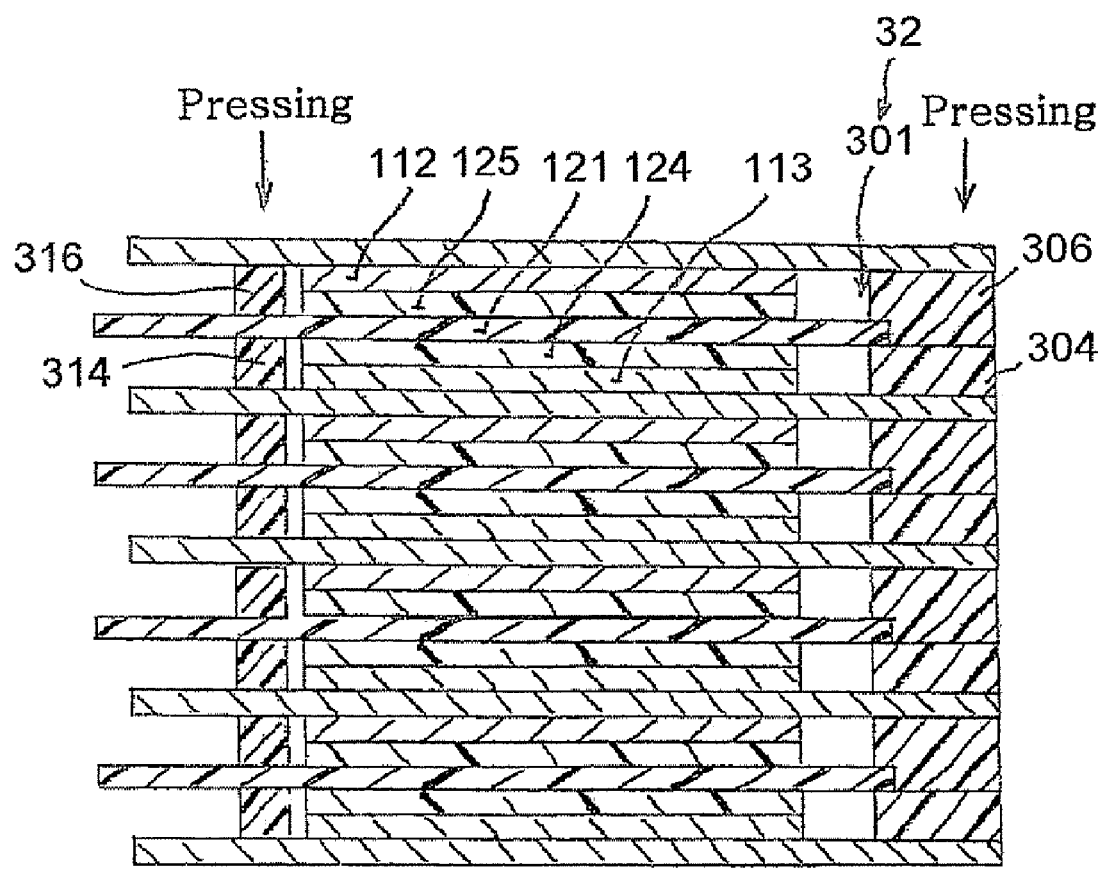
FIG. 51 is a sectional view explaining a sealing layer forming process in accordance with the sixth embodiment.

FIG. 51 is a sectional view explaining the sealing layer forming process in accordance with the sixth embodiment.

The pressing process includes the air exhausting process. In the pressing process, the battery element 100 is pressed in the stacking direction of the bipolar electrodes 110 by the press plate 173 and the base plate 171, while maintaining a vacuum state. By doing so, the residual gas in the inner space 31 surrounded by the first and second sealing materials 314 and 316 and the first and second hot-melt adhesives 304 and 306 is exhausted to the outside through the exhaust part 32 configured as the hot-melt adhesive part 301. The gas is exhausted through the first and second hot-melt adhesives 304 and 306 themselves, or through the micro gap between the first and second hot-melt adhesives 304 and 306, the collector 111 and the electrolyte layer 120.

Referring to FIG. 51, the sealing layer forming process includes the air exhausting process. In the sealing layer forming process, while pressing the battery element 100 in the stacking direction, the first and second hot-melt adhesives 304 and 306 and the first and second sealing materials 314 and 316 are heated. By doing so, the residual gas 30 in the inner space 31 is exhausted to the outside through the exhaust part 32. Further, the first and second hot-melt adhesives 304 and 306 and the first and second sealing materials 314 and 316 included in the battery element 100 are heated to be molten and are solidified by being cooled, thereby forming the first and second sealing layers 315 and 317. By hardening the first and second hot-melt adhesives 304 and 306 of the hot-melt adhesive part 301, the exhausting operation of the exhaust part 32 is stopped. Since the hot-melt adhesive part 301 is partially set, the process of stopping the exhausting operation of the exhaust part 32 can be promptly performed so as to maintain a gas free state. As a result, similar to the first embodiment, the dead space, through which the ion cannot permeate and the electron cannot move, is not generated. Thus, battery resistance is not increased.

As described in the fifth embodiment, the exhaust parts 32 may be arranged such that the positions of the exhaust parts 32 are misaligned when seen from the direction of stacking the bipolar electrodes 110. By arranging the exhaust parts 32 such that the positions are misaligned, the respective charging parts 20 can be pressed more uniformly. Accordingly, the thickness of the battery element 100 is uniform. The entire charging part 20 may be configured as the hot-melt adhesive part 301 by using only the hot-melt adhesives 304 and 306 as the charging material.

Figure 53A:
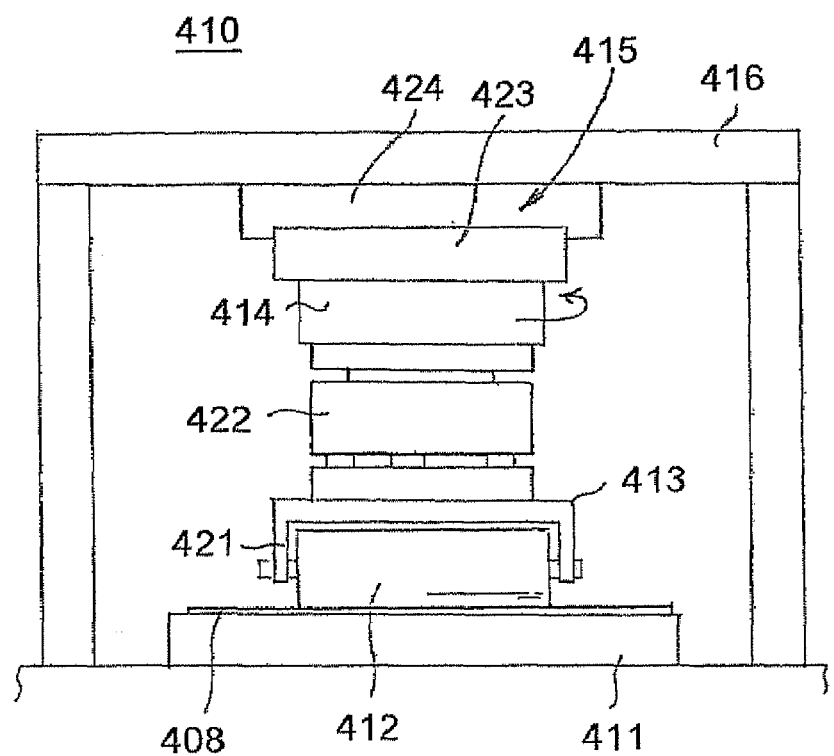
FIGS. 53A and 53B are a front view schematic of a device for performing an operation of moving the gas and a perspective view illustrating components thereof, respectively.
Figure 53B:
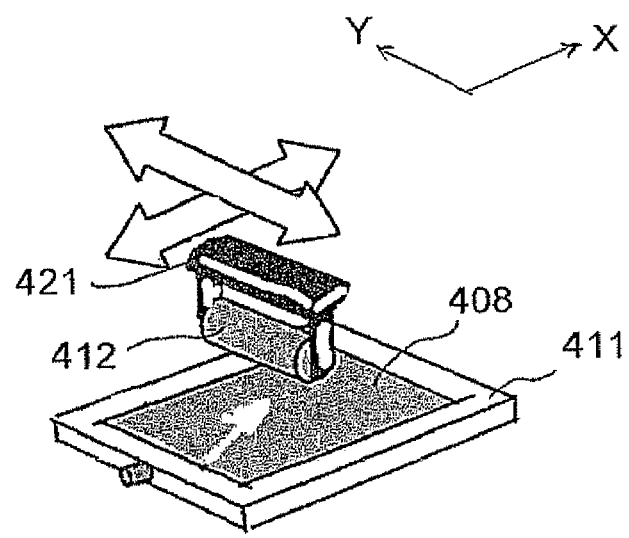

FIGS. 52A to 52C are views illustrating the residual gas 30 in the inner space 31 moving toward the exhaust part 32 in accordance with a seventh embodiment. FIGS. 53A and 53B are a front view illustrating a schematic of a device 410 that operates to move the gas and a perspective view illustrating components thereof respectively. The seventh embodiment includes a modified example for easily exhausting the residual gas 30 in the inner space 31 to the outside.

Referring to FIGS. 52A to 52C, the seventh embodiment includes performing the movement of the residual gas 30 in the inner space 31 toward the exhaust parts 32 by moving roller members 401 and 402 while pressing the same. This is done prior to the actual exhausting of the residual gas 30. As illustrated, the exhaust parts 32 are formed at two points of the charging part 20. However, a particular shape of the exhaust part 32 is certainly not restricted, and the exhaust part 32 may be formed by the gap portion 21 described in the first embodiment, for example. In such a case, the gas moving operation is performed, for example, after the separator arranging process shown in FIGS. 11 and 18. The roller members 401 and 402 are pressed toward the bipolar electrode 110 from the separator 121.

Referring to FIGS. 53A and 53B, a device 410 for performing the gas moving operation has a pallet 411 for loading an assembly 408, a roller unit 413 provided with a roller member 412 pressed toward the separator 121, a rotating unit 414 to rotate the roller unit 413 and a slide unit 415 that is mounted with the rotating unit 414 and can slide in an X-axis direction and a Y-axis direction. A portal shaped frame 416 is provided over the pallet 411, and the slide unit 415 is slidably mounted to the frame 416.

The pallet 411 is formed with a plurality of suction holes, which communicate with a suction device (not shown). By sucking the assembly 408 through the suction holes, the assembly 408 is attracted and held on the pallet 411. The roller unit 413 includes a frame 421 for rotatably supporting the roller member 412 and a press cylinder 422 connected to the frame 421. The press cylinder 422 is configured as a fluid pressure cylinder, which operates by a fluid pressure of compression air or the like. By controlling the pressure supplied to the fluid pressure cylinder, the pressing force of the roller member 412 on the separator 121 is adjusted.

The rotating unit 414 supports the roller unit 413 to rotate the roller unit 413 on a vertical axis and includes a servo motor therein to rotate the roller unit 413. By the rotation of the servo motor, the roller unit 413 rotates between a position in which a rotational axis of the roller member 412 is parallel with the X-axis and a position in which the rotational axis of the roller member 412 is parallel with the Y-axis. In the former rotating position, the roller member 412 can move in the Y-axis direction. In the latter rotating position, the roller member 412 can move in the X-axis direction.

The slide unit 415 has a slider 423 mounted movably in the X-axis direction and a slider 424 mounted movably in the Y-axis direction. Each of the sliders 423 and 424 is provided with a slide mechanism (not shown), which includes a ball screw, a guide rail, a driving motor etc.

The length in the axis direction of the roller member 412 is smaller than the dimensions in the X-axis and Y-axis directions of the pressing region, which dimensions are substantially equal to a size of the electrolyte 124. When moving the gas 30 in the X-axis direction, the roller member 412 moves in the X-axis direction several times while turning the roller member 412 to the Y-axis direction. Also, when moving the gas 30 in the Y-axis direction, the roller member 412 moves in the Y-axis direction several times while turning the roller member 412 to the X-axis direction.

The operation of the seventh embodiment is described with reference to FIGS. 52A to 52C. For convenience of understanding, FIG. 52B illustrates the use of two roller members 401 and 402 having different lengths in the axis direction from each other.

As shown in FIG. 52A, when arranging the separator 121, the bubble shaped gas 30 may be introduced between the separator 121 and the electrolyte 124.

As shown in FIG. 523, the roller member 401 is pressed and moves toward the separator 121 from a substantially center position in one of the directions of the arrow 431. Then, the roller member 401 is separated from the separator 121 and is returned to the substantially center position. The roller member 401 is pressed again and moves toward the separator 121 from the substantially center position in the other direction of arrow 432. Then, the roller member 401 is separated from the separator 121. As shown by an arrow 433, the roller member 402 is pressed and moves toward the separator 121 from a substantially center position in one of the width directions of arrow 433. Then, the roller member 402 is separated from the separator 121 and is returned to the substantially center position in the width direction. As shown by an arrow 434, the roller member 402 is pressed again and moves toward the separator 121 from the substantially center position in the other width direction of arrow 433. Then, the roller member 402 is separated from the separator 121.

FIG. 52(C) illustrates the residual gas 30 in the inner space 31 moving to a front of the gap portion 21 of the exhaust part 32 by this operation of the roller members 401 and 402.

Thereafter, in the stacking process and the pressing process of the bonded body forming process shown in FIGS. 19 and 21, the residual gas 30 in the inner space 31 is exhausted to the outside through the gap portion 21. Further, since the gas 30 has already moved to the front of the gap portion 21, the gas 30 can be easily exhausted to the outside through the gap portion 21. As a result, a bipolar battery 10 capable of further minimizing the introduction of the gas 30 can be obtained. Since battery resistance is not increased, high power density can be achieved.

The moving direction of the roller members 401 and 402 is changed according to the position of the exhaust part 32 and is not restricted to the above described operation.

Figure 54:
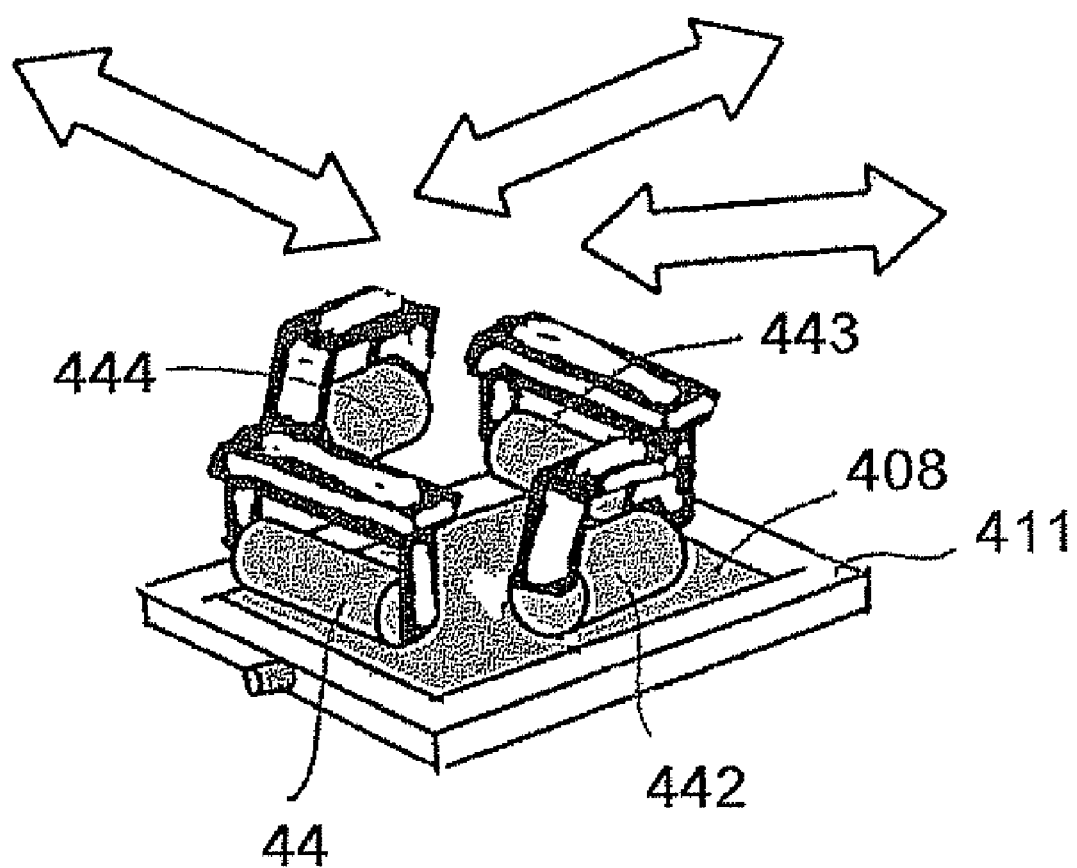
FIG. 54 is a perspective view illustrating components of a modified example of the device for performing the gas moving operation.

FIG. 54 is a perspective view illustrating components of a modified example of the device for performing the gas moving operation.

The device for performing the gas moving operation is not restricted to the use of only one roller member 412. For example, as shown in FIG. 54, the device for performing the gas moving operation may be provided with a plurality of roller members 441, 442, 443 and 444. By moving the roller members 441 to 444 in the respectively different directions, the residual gas in the inner space 31 moves toward the exhaust part 32. In this modified example, since the roller members 441 to 444 are mounted in the respective directions of moving the gas, the time needed to perform the gas moving operation is shortened.

Figure 55:
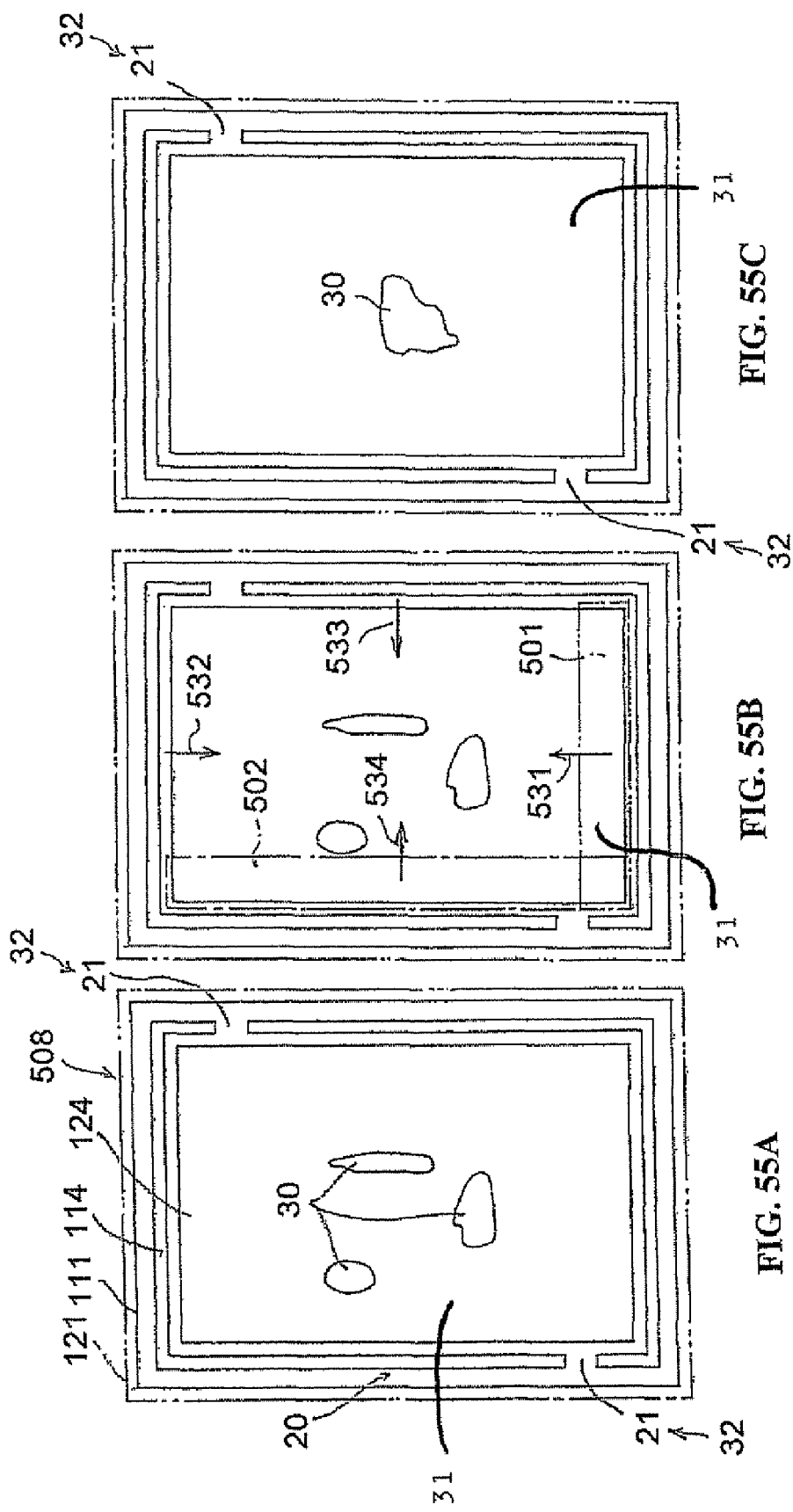
FIGS. 55A to 55C are views illustrating a state in which a residual gas in an inner space moves toward a center portion and gathers in accordance with an eighth embodiment.

The eighth embodiment includes a modified example for exhausting the residual gas in the inner space 31 to the outside by using the permeable feature of the separator 121. The eighth embodiment is described with reference to FIGS. 55A to 56.

Referring to FIGS. 55A to 55C, the eighth embodiment includes gathering the residual gas 30 in the inner space 31 by moving the roller members 501 and 502 while pressing the same. Referring to FIG. 56, the residual gas 30 in the inner space 31 is exhausted by being sucked by the suction member 550 through the separator 121. The suction member 550 has a nozzle shape.

As illustrated, the exhaust parts 32 are formed at two points of the charging part 20. However, a particular shape of the exhaust part 32 is certainly not restricted as the exhaust part 32 may be formed by the gap portion 21 described in the first embodiment, for example. In such a case, the gas gathering operation and the gas exhausting operation are performed, for example, after the separator arranging process (refer to FIGS. 11 and 18). The roller members 501 and 502 are pressed toward the bipolar electrode 110 from the separator 121. When performing the gas gathering operation, the device 410 for performing the gas moving operation described in the seventh embodiment is used as shown in FIGS. 53A and 53B.

Referring to FIG. 56, the suction member 550 constitutes a suction nozzle 551 that communicates with a suction device (not shown) through an air suction tube 552. By operating the suction device, the residual gas 30 in the inner space 31 is sucked by the suction nozzle 551 through the permeable separator 121.

As shown in FIG. 55A, when arranging the separator 121 the bubble shaped gas 30 may be introduced between the separator 121 and the electrolyte 124. As shown in FIG. 55B, the roller member 501 is pressed and moves toward the separator 121 in the direction of arrow 531 from a lower end edge of the electrolyte 124 to a substantially center position in a height direction of the electrolyte 124 in the drawing. Then, the roller member 501 is separated from the separator 121 and moves to an upper end edge. As shown by an arrow 532, the roller member 501 is pressed and moves toward the separator 121 from the upper end edge of the electrolyte 124 to the substantially center position. Then, the roller member 501 is separated from the separator 121. As shown by an arrow 533, the roller member 502 is pressed and moves toward the separator 121 from a right end edge of the electrolyte 124 to a substantially center position in a width direction of the electrolyte 124 in the drawing. Then, the roller member 502 is separated from the separator 121 and moves to a left end edge in the drawing. As shown by an arrow 534, the roller member 502 is pressed and moves toward the separator 121 from the left end edge of the electrolyte 124 to the substantially center position. The roller member 502 is separated from the separator 121 again.

As shown in FIG. 55C, by the above operation of the roller members 501 and 502 the residual gas 30 in the inner space 31 gathers in the substantially center region. The moving direction of the roller members 501 and 502 when gathering the gas 30 is not restricted to the above described operation, and other directions are contemplated.

Subsequently, as shown in FIG. 56, the suction nozzle 551 is disposed at a position opposite the gathered gas 30 through the separator 121. The residual gas 30 in the inner space 31 is sucked by the suction nozzle 551 through the permeable separator 121 and is exhausted to the outside.

Thereafter, in the stacking process and the pressing process of the bonded body forming process previously shown in FIGS. 19 and 21, the residual gas 30 in the inner space 31 is exhausted to the outside of the inner space 31 through the gap portion 21. Here, since the gas 30 introduced between the separator 121 and the electrolyte 124 when arranging the separator 121 is sucked by the suction nozzle 551 and is discharged, the gas 30 exhausted through the gap portion 21 is mainly the gas 30 introduced between the overlying bipolar electrode 110 and the underlying electrolyte layer 120 when stacking the assembly 508 (refer to FIG. 7B). Since the amount of the gas 30 to be exhausted through the gap portion 21 is decreased, the amount of the residual gas 30 in the inner space 31 is also decreased. As a result, the bipolar battery 10 is produced with minimal gas or air. Accordingly, the battery resistance is not increased, and high power density is achieved.

FIGS. 57A and 57B illustrate modified examples of moving the residual gas 30 in the inner space 31 to the center portion and gathering the gas. As shown in FIG. 57A, the gas gathering operation may be performed by using a plurality of roller members 541 to 548. Eight are shown in the figure, but other numbers are contemplated. The independent eight roller members 541 to 548 roll from the periphery to the center portion by turns, thereby gathering the residual gas 30 in the inner space 31 at the center portion. As shown in FIG. 57(B), the movement of the roller members is not restricted to a linear direction. For example, a roller member 549 rolls in a spiral direction from the periphery to the center portion to gather the residual gas 30 in the inner space 31 at the center portion.

Figure 58A:
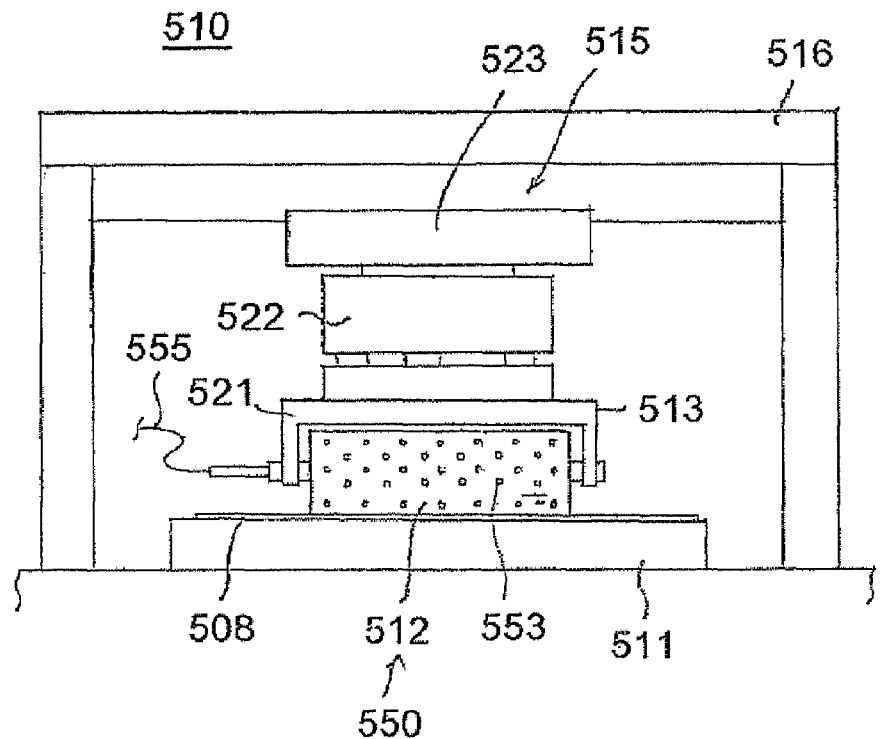
FIGS. 58A and 58B are a front view schematic of a device for performing a gas exhausting operation through the separator and a perspective view illustrating components thereof, respectively.
Figure 58B:
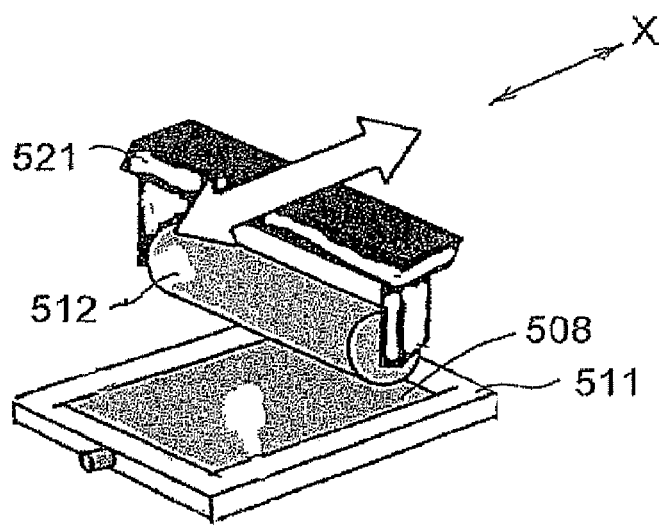
Figure 59:
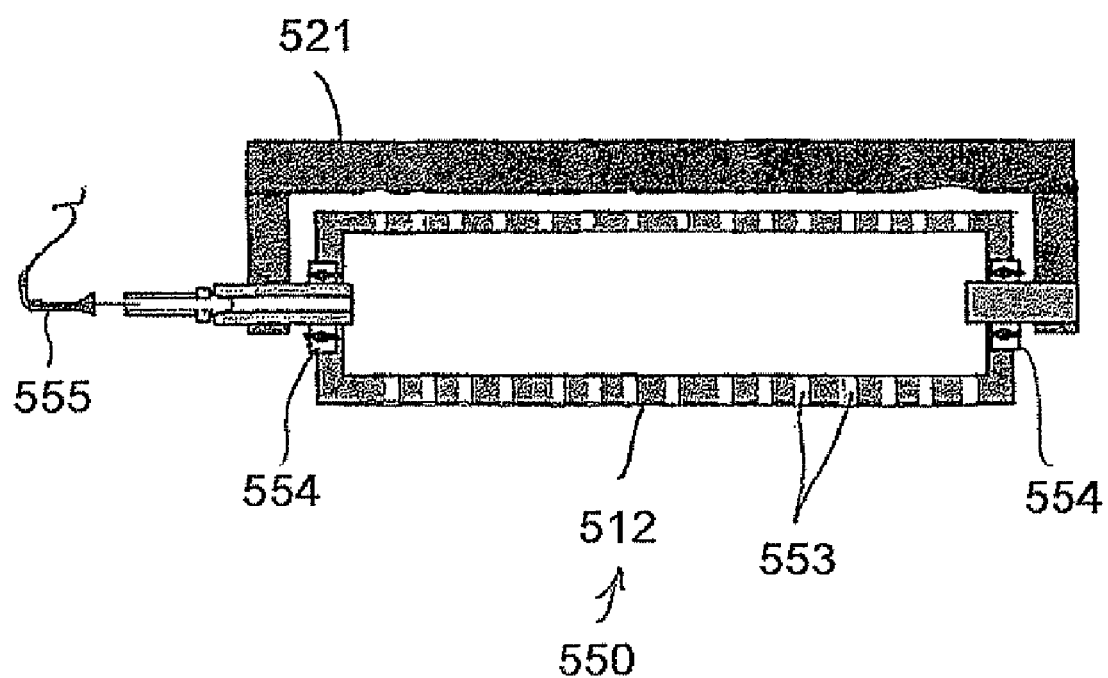
FIG. 59 is a sectional view illustrating a suction roller.

FIGS. 58A and 58B are a front view schematic of a device 510 for performing the gas exhausting operation through the separator 121 and a perspective view illustrating components thereof, respectively. FIG. 59 is a sectional view illustrating a suction roller 512.

Referring to FIGS. 58A and 58B, the device 510 for performing the gas exhausting operation through the separator 121 includes a pallet 511 for loading the assembly 508, a roller unit 513 provided with the suction roller 512 as the suction member 550 and pressed toward the separator 121 and a slide unit 515. The slide unit 515 is mounted with the roller unit 513 and can slide in the X-axis direction. A portal shaped frame 516 is provided over the pallet 511, and the slide unit 515 is slidably mounted to the frame. The suction member 550 is not restricted to the nozzle shape and may have a roller shape.

The pallet 511 is formed with a plurality of suction holes that communicate with a suction device (not shown). By sucking the assembly 508 through the suction holes, the assembly 508 is attracted and held on the pallet 511.

The roller unit 513 includes a frame 521 for rotatably supporting the suction roller 512 and a press cylinder 522 connected to the frame 521. The press cylinder 522 is configured as a fluid pressure cylinder that operates by a fluid pressure of compression air or the like. By controlling the pressure supplied to the fluid pressure cylinder, the pressing force of the suction roller 512 on the separator 121 is adjusted.

The slide unit 515 has a slider 523 mounted movably in the X-axis direction. The slider 523 is provided with a slide mechanism (not shown), which includes a ball screw, a guide rail, a driving motor, etc.

As shown in FIG. 59, the suction roller 512 is configured as a hollow roller with a plurality of air holes 553. The suction roller 512 is rotatably supported by the frame 521 through bearings 554. The interior of the suction roller 512 communicates with the suction device (not shown) through an air suction tube 555. By moving the suction roller 512 while operating the suction device, the residual gas 30 in the inner space 31 is sucked by the suction roller 512 through the permeable separator 121. When the suction roller 512 is used, since the suction roller 512 sucks the gas 30 while rolling, the gas gathering operation is not required.

While the embodiment of sucking the gas 30 through the separator 121 is described above, the operation of exhausting the gas 30 through the separator 121 is not restricted thereto. By using the permeability of the separator 121, the embodiment can be modified while maintaining the scope of the invention. By applying the pressing force from above the separator 121, it is possible to exhaust the gas 30 through the separator 121. Alternatively, by leaving the assembly 508 as it is, it is possible to exhaust the gas 30 through the separator 121.

Accordingly, the above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method of manufacturing a bipolar battery, comprising:
    preparing a bipolar electrode by forming a cathode on one surface of a collector and forming an anode on a opposite surface of the collector;
    forming a charging pail on the bipolar electrode by disposing a charging material on each side of the collector to surround a periphery of the cathode and a periphery of the anode, the charging part including an exhaust part;
    alternately stacking a plurality of the bipolar electrodes each having the charging part with a plurality of separators such that the charging part is disposed between the collector and an adjacent separator; and
    exhausting a gas bubble from an inner space surrounded by the collector, the separator, and the charging part through the exhaust part to an outside during stacking.

2. The method according to claim 1 wherein the exhaust part is a gap portion configured within the charging pail, the method further comprising:
    pressing the charging part in a stacking direction, wherein the gap portion is blocked by the pressing.

3. The method according to claim 2, wherein the gap portion comprises a material storage at opposite ends of the gap portion, the method further comprising:
    releasing the charging material stored in each material storage part into the gap portion to block the gap portion when pressing the charging pail in the stacking direction.

4. The method according to claim 2, further comprising:
    forming the gap portion in the charging material during forming of the charging part by coating the collector with the charging material in different directions to leave a gap by moving at least one coating head.

5. The method according to claim 1 wherein the charging material is a thermoset and wherein forming the charging part comprises forming the exhaust part as an uncured part of the charging material of the charging pail, the method further comprising:
    curing the uncured part of the charging material after exhausting the gas bubble.

6. The method according to claim 5 wherein curing the uncured pail comprises performing induction heating or laser heating.

7. The method according to claim 1 wherein the charging material is thermoplastic and wherein forming the charging part comprises forming the exhaust part as a softened part of the charging material of the charging part, the method further comprising:
    hardening the softened pail of the charging material.

8. The method according to claim 1 wherein the charging material is a hot-melt adhesive that is not adhesive prior to treatment and wherein forming the charging part comprises forming the exhaust part as an untreated hot-melt adhesive part of the charging material, the method further comprising:
    treating the charging material of the untreated hot-melt adhesive part so it becomes adhesive.

9. The method according to claim 1 wherein a position of the exhaust part of one bipolar electrode is misaligned with a position of an adjacent exhaust part of another bipolar electrode when seen from a stacking direction.

10. The method according to claim 1, further comprising:
    moving the gas bubble in the inner space toward the exhaust part by moving a roller member while pressing the roller member prior to exhausting the gas bubble.

11. The method according to claim 1 wherein the bipolar battery comprises a plurality of electrolyte layers, each of the electrolyte layers comprising one of the separators and an electrolyte, the electrolyte permeating the separator and forming a layer on opposing sides of the separator, the method further comprising:
    exhausting the gas bubble in the inner space through the separator prior to exhausting the gas bubble in the inner space using the exhaust part.

12. The method according to claim 11, further comprising:
    gathering the gas bubble in a center of the inner space by moving a roller member while pressing the roller member, the gathering being performed prior to exhausting the gas bubble through the separator.

13. The method according to claim 11 wherein exhausting the gas bubble in the inner space through the separator comprises:
    sucking the gas bubble by a suction member through the separator.

14. The method of claim 13 wherein the suction member has a roller shape or a nozzle shape.

15. The method according to claim 1 wherein the bipolar battery comprises a plurality of electrolyte layers, each of the electrolyte layers comprising one of the separators and the electrolyte permeating the separator and forming a layer on opposite sides of the separator for conducting an ion between the separator and the cathode or the anode of the adjacent bipolar electrode.

16. The method according to claim 1 wherein the bipolar battery comprises a plurality of electrolyte layers, each of the electrolyte layers comprising one of the separators and a liquid type or gel type electrolyte; and wherein the charging material is a sealing material preventing leakage of the electrolyte.

17. A bipolar battery made according to the method of claim 1.

* * * * *